US012748026B2

(12) United States Patent
McIntyre et al.

(10) Patent No.: US 12,748,026 B2
(45) Date of Patent: Sep. 29, 2026

(54) NON-DESTRUCTIVE MEASUREMENT, DISPENSE, AND REPLICATION OF DENSITY GRADIENTS

(71) Applicant: Beckman Coulter, Inc., Brea, CA (US)

(72) Inventors: Larry Wayne McIntyre, Carmel, IN (US); Matthew Aaron Halsmer, Brownsburg, IN (US); Steven Adam Kibler, Noblesville, IN (US)

(73) Assignee: Beckman Coulter, Inc., Brea, CA (US)

( * ) Notice: Subject to any disclaimer, the term of this patent is extended or adjusted under 35 U.S.C. 154(b) by 51 days.

(21) Appl. No.: 18/997,791

(22) PCT Filed: Jul. 21, 2023

(86) PCT No.: PCT/US2023/028403
§ 371 (c)(1),
(2) Date: Jan. 22, 2025

(87) PCT Pub. No.: WO2024/025807
PCT Pub. Date: Feb. 1, 2024

(65) Prior Publication Data

US 2026/0092849 A1 Apr. 2, 2026

Related U.S. Application Data

(60) Provisional application No. 63/375,564, filed on Sep. 14, 2022, provisional application No. 63/375,558,
(Continued)

(51) Int. Cl.
*G01N 9/30* (2006.01)
*B01F 25/4314* (2022.01)
*G01N 9/24* (2006.01)

(52) U.S. Cl.
CPC ......... *G01N 9/30* (2013.01); *B01F 25/43141* (2022.01); *G01N 9/24* (2013.01)

(58) Field of Classification Search
CPC ..... B01F 25/43141; B01F 35/81; G01N 9/24; G01N 9/30
See application file for complete search history.

(56) References Cited

U.S. PATENT DOCUMENTS

2008/0233553 A1* 9/2008 Aparicio ............. G01N 33/491 435/286.4
2020/0269238 A1* 8/2020 DelVecchio ...... B01L 3/502715

FOREIGN PATENT DOCUMENTS

CN 111397841 A 7/2020
JP H10-311775 A 11/1998
WO WO-2022102258 A1 * 5/2022 .............. G01N 9/30

OTHER PUBLICATIONS

Yamaguchi (WO-2022102258-A1) English Translation (Year: 2026).*
(Continued)

*Primary Examiner* — Jennifer Wecker
*Assistant Examiner* — Jonathan Bortoli
(74) *Attorney, Agent, or Firm* — Merchant & Gould P.C.

(57) ABSTRACT

A system performs a non-destructive measurement of a density gradient to automatically replicate and dispense the density gradient. The system obtains measurements at points along a length of the density gradient and generates a profile of the density gradient based on the measurements. The system uses the profile to replicate the density gradient of components in a second container. The system inserts a distal end of a probe into the second container, and pumps separate components into a manifold and mixing chamber connected to a proximal end of the probe to automatically dispense the density gradient in the second container.

19 Claims, 52 Drawing Sheets

Related U.S. Application Data filed on Sep. 14, 2022, provisional application No. 63/375,563, filed on Sep. 14, 2022, provisional application No. 63/369,306, filed on Jul. 25, 2022, provisional application No. 63/369,318, filed on Jul. 25, 2022, provisional application No. 63/369,299, filed on Jul. 25, 2022.

(56) References Cited

OTHER PUBLICATIONS

Verheul Ross: "How can I prepare consistent density gradients for reproducibly purifying samples via ultracentrifugation?", beckman.com/ Spinsights, 005, Beckman Coulter Life Sciences (2020); 2 pages.

Robert C. Leif: "Density gradient system—II. A 50 channel programmable undulating diphragm peristaltic pump", Analytical Biochemistry 25: 283-296 (1968).

Anne K Engmann et al., "Neuronal subtype-specific growth cone and soma purification from mammalian CNS via fractionation and fluorescent sorting for subcellular analyses and spatial mapping of local transcriptomes and proteomes", Nature Protocols vol. 17, No. 2: 222-251 (2022).

International Search Report and Written Opinion for PCT/US2023/028403 (Feb. 27, 2024); 19 pages.

* cited by examiner

1500

Clone 5-40 lin 2 - Notepad

File Edit Format View Help

| | |
|---|---|
| 80.00, | 2006 |
| 79.75, | 2008 |
| 79.50, | 2011 |
| 79.25, | 2015 |
| 79.00, | 2019 |
| 78.75, | 2017 |
| 78.50, | 2024 |
| 78.25, | 2028 |
| 78.00, | 2023 |
| 77.75, | 2025 |
| ⋮ | ⋮ |

5102 5104

*FIG. 51*

NON-DESTRUCTIVE MEASUREMENT, DISPENSE, AND REPLICATION OF DENSITY GRADIENTS

This application is a U.S. National Stage Application of PCT International Patent Application No. PCT/US2023/028403, filed Jul. 21, 2023, which claims the benefit of and priority to U.S. Provisional Patent Application No. 63/369,299, filed Jul. 25, 2022, U.S. Provisional Patent Application No. 63/375,558, filed Sep. 14, 2022, U.S. Provisional Patent Application No. 63/369,306, filed Jul. 25, 2022, U.S. Provisional Patent Application No. 63/375,563, filed Sep. 14, 2022, U.S. Provisional Patent Application No. 63/369,318, filed Jul. 25, 2022, and U.S. Provisional Patent Application No. 63/375,564, filed Sep. 14, 2022, the entire disclosures of which are incorporated by reference herein in their entirety. To the extent appropriate, a claim of priority is made to each of the above-disclosed applications.

BACKGROUND

Proteins have a variety of cellular functions, structures, and mechanisms of action. Routinely, proteins bind with other biomolecules, called ligands, in order to complete a task. Researchers can gain valuable knowledge on how proteins work in a cellular environment by purification of proteins bound to ligands, also called protein-ligand complexes. For example, purified protein-ligand complexes are often used in downstream analyses such as high-resolution imaging, sequencing, or crystallography for discovery of protein-based therapeutics.

Protein-ligand complexes can be purified using density gradients, which are typically layered in steps using an underlay or overlay approach, where solutions are added in order of increasing or decreasing density. A step gradient may be used directly or allowed to diffuse in a controlled manner to create a continuous or linear gradient. A step gradient has sharp interfaces between layers having different densities, whereas a continuous or linear gradient has layers that gradually increase in density moving from top to bottom. In some instances, a step gradient is spun in a centrifuge which causes the layers to diffuse into a continuous or linear gradient.

The underlay technique for generating a density gradient includes adding a first layer having a low density into a tube, and then adding successively denser layers to the bottom of the tube by a long syringe so as to not disturb the previous layers. The overlay technique for generating a density gradient includes using a pipette to dispense decreasingly dense layers sequentially on top of denser layers. These layering techniques for generating density gradients can be tedious and time-consuming, and are difficult to replicate among researchers.

SUMMARY

In general terms, the present disclosure relates to a system that measures and dispenses a density gradient of components. In one configuration, the system measures a density gradient without touching or disturbing the density gradient. In another configuration, the system automatically dispenses a density gradient of components having a plurality of steps using a probe. In another configuration, the system measures a density gradient of components dispensed in a first container to create a profile of the density gradient, and uses the profile to replicate the density gradient of components in a second container. Various aspects are described in this disclosure, which include, but are not limited to, the following aspects.

One aspect relates to a system for non-destructively measuring a density gradient of components for use in centrifugation, the system comprising: a measurement apparatus including: a sensor assembly; a motor coupled to the sensor assembly; and a processing circuitry having a memory for storing instructions which, when executed by the processing circuitry, cause the processing circuitry to: move the sensor assembly along a length of the density gradient of components using the motor; obtain measurements from the sensor assembly while the sensor assembly is moved along the length of the density gradient of components; and generate a profile of the density gradient of components based on the measurements.

Another aspect relates to a system for measuring a density gradient of components for use in centrifugation dispensed in a container, the system comprising: a processing circuitry having memory for storing instructions which, when executed by the processing circuitry, cause the processing circuitry to: obtain measurements at points along a length of the density gradient of components; generate a profile of the density gradient of components based on the measurements; and store the profile of the density gradient of components.

Another aspect relates to a method for non-destructively measuring a density gradient of components, the method comprising: obtaining measurements at points along a length of the density gradient of components; generating a profile of the density gradient of components based on the measurements; and storing the profile of the density gradient of components.

Another aspect relates to a system for automatically dispensing a density gradient of components for use in centrifugation, the system comprising: a processing circuitry having a memory for storing instructions which, when executed by the processing circuitry, cause the processing circuitry to: insert a distal end of a probe into a container; pump separate components into a mixing chamber connected to a proximal end of the probe, the mixing chamber generating a mixture of the separate components; dispense a plurality of steps into the container, each step of the plurality of steps having a density based on relative concentrations of the separate components in the mixture generated by the mixing chamber, and each step of the plurality of steps pushing a previously dispensed step away from the distal end of the probe; and remove the probe from the container without disturbing the plurality of steps.

Another aspect relates to a system for dispensing a density gradient of components for use in centrifugation, the system comprising: a processing circuitry having a memory for storing instructions which, when executed by the processing circuitry, cause the processing circuitry to: insert a distal end of a probe into a container; dispense a first step of a plurality of steps into the container, the first step being dispensed at a maximum dispense speed; dispense additional steps of the plurality of steps into the container, each additional step being dispensed starting at a minimum dispense speed, and then increasing from the minimum dispense speed to the maximum dispense speed, each additional step of the plurality of steps having a density higher than densities of previously dispensed steps of the plurality of steps causing the previously dispensed steps of the plurality of steps to move away from the distal end of the probe; and remove the probe from the container without disturbing the plurality of steps.

Another aspect relates to a method for automatically dispensing a density gradient of components for use in centrifugation, the method comprising: inserting a distal end of a probe into a container; dispensing a first step of a plurality of steps into the container, the first step being dispensed at a maximum dispense speed; dispensing additional steps of the plurality of steps into the container, each additional step being dispensed starting at a minimum dispense speed, and then increasing from the minimum dispense speed to the maximum dispense speed, each additional step of the plurality of steps having a density higher than densities of previously dispensed steps of the plurality of steps causing the previously dispensed steps to move away from the distal end of the probe; and removing the probe from the container without disturbing the plurality of steps.

Another aspect relates to a system for replicating a density gradient, the system comprising: at least one processing device; and a memory device storing instructions which, when executed by the at least one processing device, cause the at least one processing device to: obtain measurement values of the density gradient dispensed in a first tube; store a profile of the measurement values; and use the profile to replicate the density gradient in a second tube.

Another aspect relates to a method of replicating a density gradient, the method comprising: obtaining measurement values of the density gradient dispensed in a first tube; replacing the measurement values at interfaces between steps of the density gradient; replacing the measurement values from a bottom portion of the first tube; removing measurement values from a location of a meniscus of the density gradient; storing a profile of the density gradient; and replicating the density gradient in a second tube based on the profile.

Another aspect relates to a system for replicating a density gradient, the system comprising: at least one processing device; and a memory device storing instructions which, when executed by the at least one processing device, cause the at least one processing device to: obtain measurement values of the density gradient dispensed in a first tube; process the measurement values by: replacing the measurement values at interfaces between steps of the density gradient; replacing the measurement values from a location of a bottom portion of the first tube; and removing measurement values from a location of a meniscus of the density gradient dispensed in the first tube; store a profile of the density gradient based on the processed measurement values; and use the profile to replicate the density gradient in a second tube.

Another aspect relates to a method of replicating a density gradient of components, the method comprising: creating a first profile by obtaining measurement values of the density gradient of components dispensed in a first container; creating a second profile by replacing measurement values of the first profile; storing the second profile; and replicating the density gradient of components in a second container based on the second profile.

Another aspect relates to a system for replicating a density gradient of components for use in centrifugation, the system comprising: a first density gradient of components; a sensor assembly; a dispensing probe; a processing circuitry having a memory for storing instructions which, when executed by the processing circuitry, cause the processing circuitry to: obtain measurement values of the first density gradient of components contained in a first container with the sensor assembly; store a first profile of the measurement values in the memory; create a second profile based on the stored first profile; and replicate the first density gradient of components by dispensing with the dispensing probe into a second container a second density gradient of components based on the second profile.

Another aspect relates to a system for replicating a density gradient of components for use in centrifugation, the system comprising: a processing circuitry having a memory for storing instructions which, when executed by the processing circuitry, cause the processing circuitry to: obtain measurement values of the density gradient of components dispensed in a first container, the density gradient of components including a meniscus; process the measurement values by: replacing the measurement values at interfaces between steps of the density gradient of components; replacing the measurement values from a location of a bottom portion of the first container; and replacing measurement values based on a location of the meniscus of the density gradient of components dispensed in the first container; store a profile of the density gradient of components based on the processed measurement values; and use the profile to replicate the density gradient of components in a second container.

DESCRIPTION OF THE FIGURES

The following drawing figures, which form a part of this application, are illustrative of the described technology and are not meant to limit the scope of the disclosure in any manner.

FIG. 51 shows an example of a text file that is executable by a processing device of the system of FIG. 1 to dispense a density gradient into a container.

DETAILED DESCRIPTION

Figure 1:
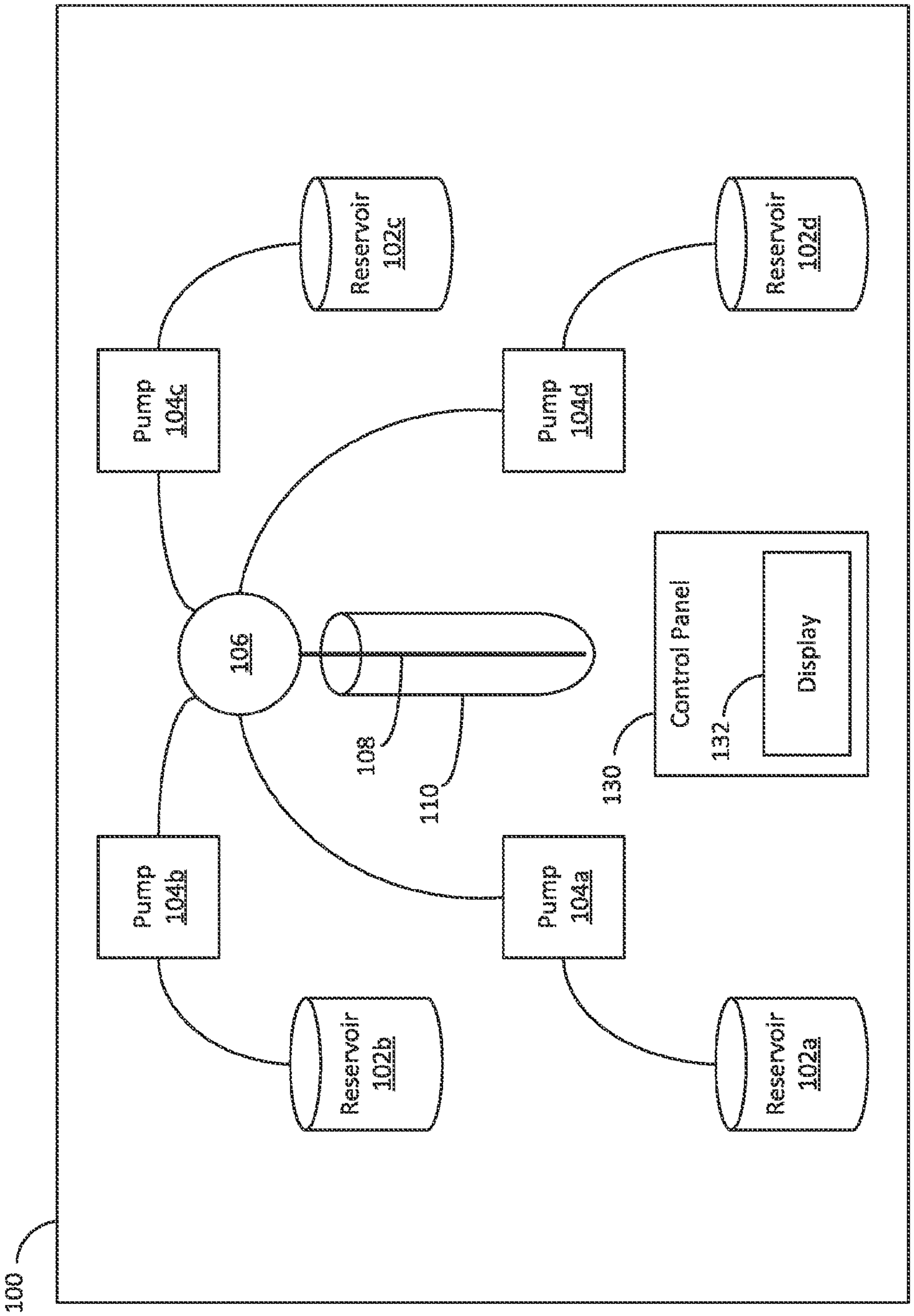
FIG. 1 schematically illustrates an example of a system for generating density gradients for centrifugation.

FIG. 1 schematically illustrates an example of a system 100 that can generate density gradients for centrifugation. The system 100 is a computer controlled to precisely dispense a gradient of any type, slope, or shape. The system 100 can be used to generate linear density gradients, which have densities that gradually increase from top to bottom, and step density gradients, which have at least two discrete steps of different densities.

Additionally, the system 100 can measure a density gradient dispensed inside a container 110 without touching or disturbing the density gradient. These measurements can be used by the system 100 to replicate the density gradient inside another container. In some examples, the container 110 is a tube for use in a centrifuge rotor for centrifugation.

The system 100 includes reservoirs 102 that each hold a separate component for generating a density gradient inside the container 110. Each reservoir 102 is connected to a pump 104 for pumping the component held in the reservoir 102 into a manifold and mixing chamber 106. Each of the pumps 104 is programmed to pump the components from the reservoirs 102 at a given volume and speed for mixing inside the manifold and mixing chamber 106.

In the example shown in FIG. 1, the system 100 includes four reservoirs such as a first reservoir 102*a* connected to a first pump 104*a* for pumping a first component into the manifold and mixing chamber 106, a second reservoir 102*b* connected to a second pump 104*b* for pumping a second component into the manifold and mixing chamber 106, a third reservoir 102*c* connected to a third pump 104*c* for pumping a third component into the manifold and mixing chamber 106, and a fourth reservoir 102*d* connected to a fourth pump 104*d* for pumping a fourth component into the manifold and mixing chamber 106. The system 100 can include more than four reservoirs for holding more than four separate components for generating a density gradient, or can include fewer than four reservoirs for holding fewer than four separate components for generating a density gradient in the container 110.

The components held in the reservoirs 102 are liquids pumped into the manifold and mixing chamber 106 for dispensing homogenous streams of fluid into the container 110. As an illustrative example, the first reservoir 102*a* can hold deionized (DI) water, the second reservoir 102*b* can hold a density modifier such as sucrose, glycerol, or iodixanol, the third reservoir 102*c* can hold a buffer solution, and the fourth reservoir 102*d* can hold additives such as amino acids, proteins, chelators, stabilizers, detergents, salts, and biological sample material. Illustrative examples of the buffer solutions can include, without limitation, a phosphate-buffered saline (PBS), a tris buffer concentration (e.g., tris(hydroxymethyl)aminomethane, also known as tromethamine or THAM), and HEPES (4-(2-hydroxyethyl)-1-piperazineethanesulfonic acid).

All four component liquids are introduced into a single stream that goes through the manifold and mixing chamber 106. The DI water and density modifier make up a majority of the volume in the stream, while the buffer solution and additives have smaller concentrations.

As an illustrative example, the DI water and density modifier are pumped into the manifold and mixing chamber 106 from the respective first and second reservoirs 102*a*, 102*b* using the first and second pumps 104*a*, 104*b*, respectively. The first and second pumps 104*a*, 104*b* can include peristaltic pumps for providing a smooth pumping flow for the DI water and density modifier components. The buffer solution and additives from the respective third and fourth reservoirs 102*c*, 102*d* are pumped by the third and fourth pumps 104*c*, 104*d*, respectively. In some examples, the third and fourth pumps 104*c*, 104*d* include peristaltic pumps. In other examples, the third and fourth pumps 104*c*, 104*d* can include syringe pumps, which can be used when higher precision pumping is desirable for the buffer solution and additives.

Figure 2:
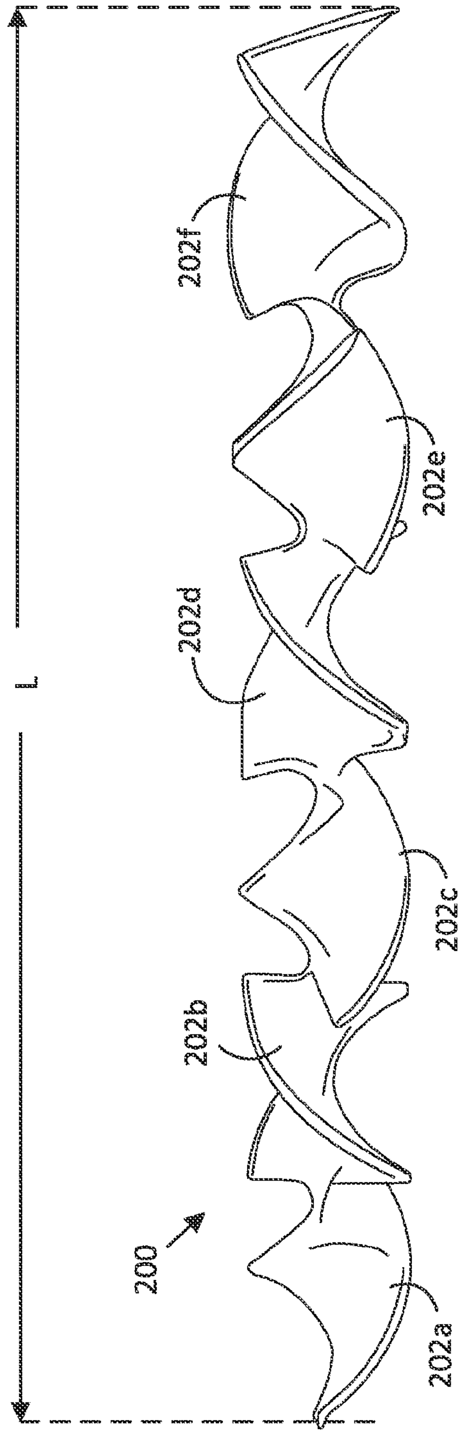
FIG. 2 illustrates an example of a mixer housed inside a manifold and mixing chamber of the system of FIG. 1.

FIG. 2 illustrates an example of a mixer 200 housed inside the manifold and mixing chamber 106 of the system 100. Referring now to FIGS. 1 and 2, the DI water, density modifier, buffer solution, and additives are introduced into a single stream that goes through the manifold and mixing chamber 106. Inside the manifold and mixing chamber 106, the mixer 200 includes mixing elements 202*a*-202*f* that mix the components together as they pass through the mixing elements. The mixer 200 mixes the components together to generate a homogenous stream of fluid for a probe 108 to dispense a step of a density gradient into the container 110, the step having a predetermined density based on the relative concentrations of the components.

In some examples, the mixer 200 is a static mixer and the mixing elements 202*a*-202*f* include alternating helical elements. In some examples, each helical element is set 90° to an adjacent helical element to provide thorough blending of the components over a length L of the mixer 200 inside the manifold and mixing chamber 106. The mixing elements 202*a*-202*f* mix the components together to eliminate pockets of low and/or high-density material. The mixing elements 202*a*-202*f* slice and rotate the DI water and density modifier multiple times together to produce a substantially homogenous stream for the probe 108 to dispense a step of the density gradient into the container 110. In alternative examples, the manifold and mixing chamber 106 can include alternative types of mixers and mixing elements.

Figure 3:
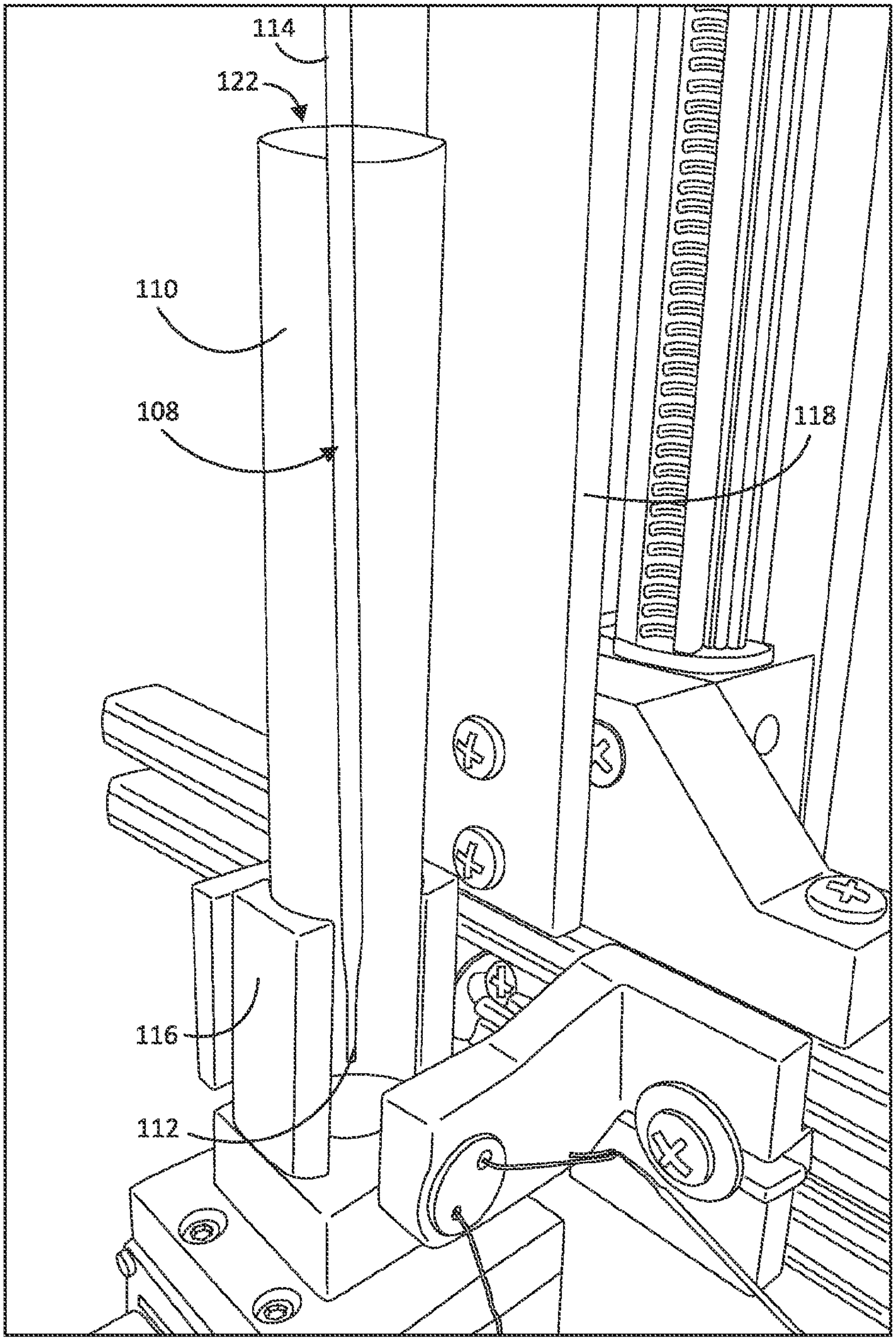
FIG. 3 is an isometric view of a probe of the system of FIG. 1, the probe having a distal end inserted into a container, and a proximal end connected to the manifold and mixing chamber.

FIG. 3 is an isometric view of the probe 108 having a distal end 112 inserted into the container 110, and a proximal end 114 that connects to the manifold and mixing chamber 106. As shown in FIG. 3, the distal end 112 is positioned toward a bottom of an interior volume 122 of the container 110 such that the probe 108 is ready for dispensing a density gradient inside the interior volume of the container. In some examples, the probe 108 remains fixed in the same position when dispensing the density gradient inside the interior volume 122 of the container.

As shown in FIG. 3, the container 110 is fixedly positioned by a holder 116 relative to the probe 108 during dispensing of the density gradient. In the example of FIG. 3, the holder 116 includes a clamp for securely fixing the container 110 to a frame 118 of the system 100.

Figure 4:
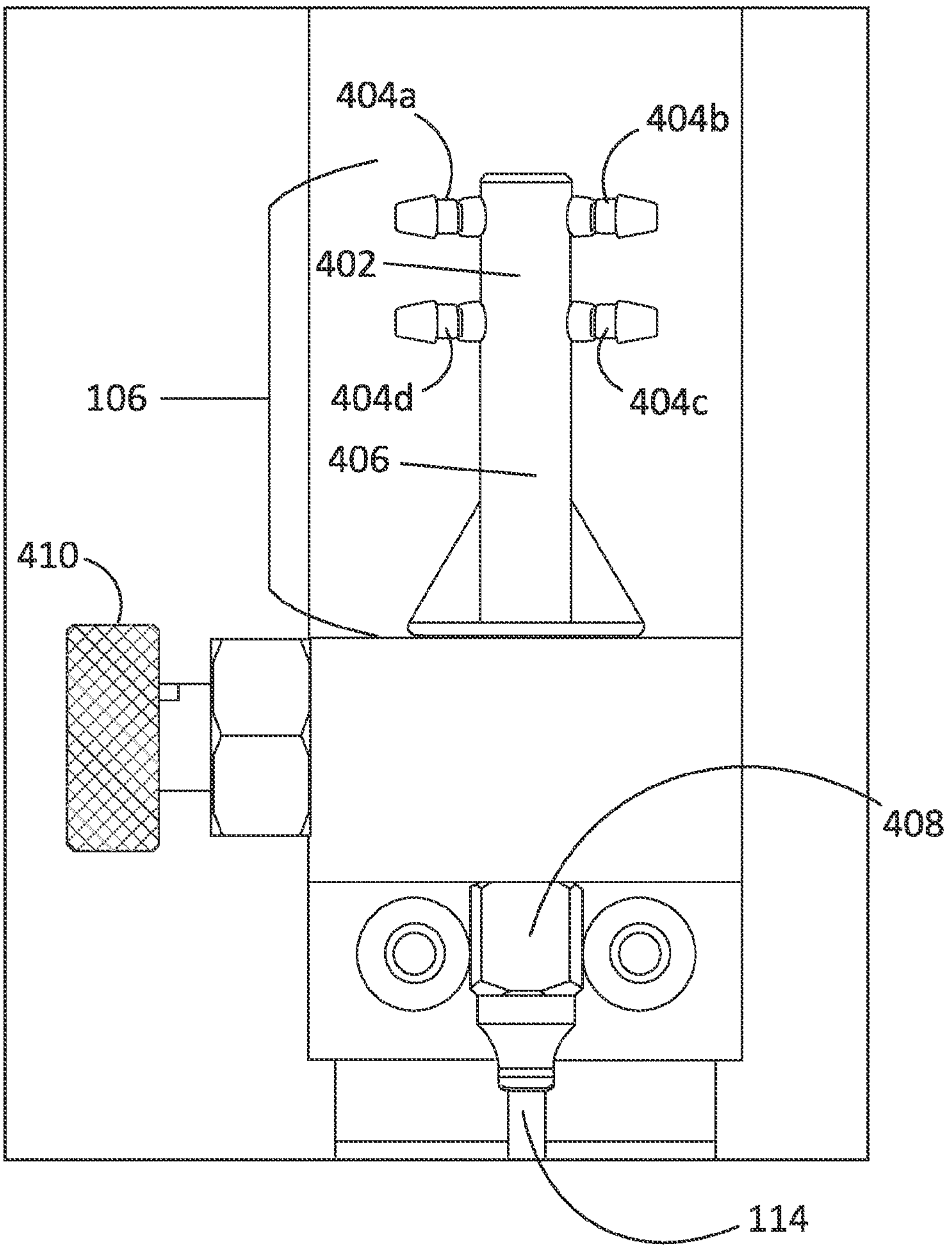
FIG. 4 illustrates an example of the proximal end of the probe of FIG. 3 connected to the manifold and mixing chamber.

FIG. 4 illustrates an example of the proximal end 114 of the probe 108 connected to the manifold and mixing chamber 106. The manifold and mixing chamber 106 includes a manifold portion 402 having inputs 404*a*-404*b* that each receive a component pumped from a reservoir 102*a*-102*d* by a pump 104*a*-104*d*, respectively. The manifold and mixing chamber 106 further includes a mixing portion 406 housing the mixer 200 for mixing the components pumped from the reservoirs together before they reach the proximal end 114 of the probe 108.

In FIG. 4, the proximal end 114 of the probe 108 is shown fixed by a set screw 408 that can be tightened or loosened around the proximal end 114 by using a rotatable handle 410. The manifold and mixing chamber 106 is attached to a motor driven mechanism that moves the probe 108 up and down to a desired position inside the container 110. In other examples, the probe 108 can be manually lowered into a desired position inside the container 110.

The probe 108 is coated with a non-stick material. In some examples, the probe 108 is coated with a non-stick material such as Teflon, or similar materials. The non-stick material coating on the probe 108 minimizes the density gradient dispensed into the container 110 from sticking to or building-up on the probe 108. Thus, the non-stick material coating allows the probe 108 to be removed while mitigating mixture between discrete steps of the density gradient.

Referring back to FIG. 1, the system 100 can include a control panel 130 for receiving inputs from a user to generate a desired density gradient. In some examples, the control panel 130 includes a display 132 such as a touch-screen that can be used by the user to create the desired density gradient, make measurements thereof, and store a profile of the density gradient. In further examples, the control panel 130 can include additional input devices such as one or more physical buttons that can be selected to control operation of the system 100.

Figure 5:
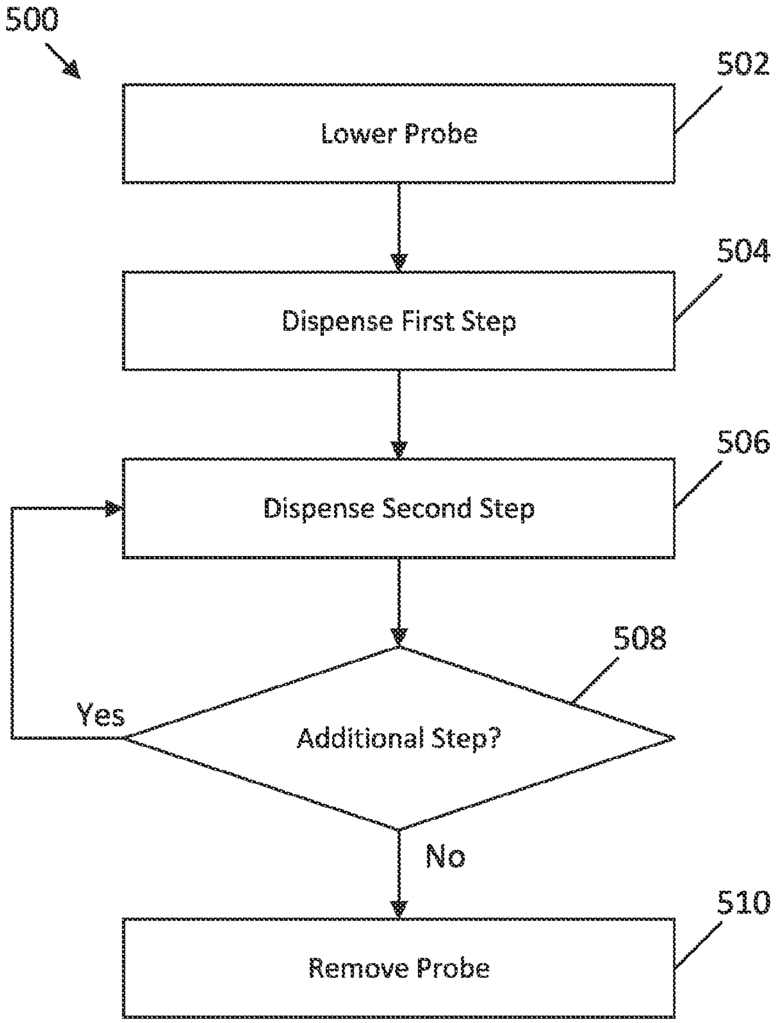
FIG. 5 schematically illustrates an example of a method of generating a density gradient inside a container using the system of FIG. 1.

FIG. 5 schematically illustrates an example of a method 500 of generating a density gradient inside the container 110 using the system 100. The method 500 includes an operation 502 of lowering the probe 108 close to a bottom of the container 110. An example of the probe 108 positioned close to the bottom of the container 110 is shown in FIGS. 1 and 3. In some examples, the distal end 112 of the probe 108 will remain positioned close to the bottom of the container 110 while the probe 108 dispenses the density gradient.

The method includes an operation 504 of dispensing into the container 110 a first step made of the components held in the reservoirs 102 (e.g., a first step of the DI water, density modifier, buffer solution, and additives). The first step has a first density based on the relative concentrations of the components. For example, increasing an amount of the density modifier mixed by the manifold and mixing chamber 106 increases the density of the first step dispensed by the probe 108, while decreasing the amount of the density modifier mixed by the manifold and mixing chamber 106 decreases the density of the first step dispensed by the probe 108.

Next, the method 500 includes an operation 506 of dispensing into the container 110 a second step made of the components held in the reservoirs 102 (e.g., a second step of the DI water, density modifier, buffer solution, and additives). The second step has a second density based on the relative concentrations of the components pumped from the reservoirs 102. The second density is heavier than the first density such that the second step pushes up the first step, and the second step remains below the first step at the bottom of the container 110.

Next, the method 500 includes an operation 508 of determining whether the density gradient includes an additional step. When the density gradient includes an additional step (i.e., "Yes" in operation 508), the method 500 repeats the operation 506 to dispense an additional step made of the components held in the reservoirs 102 (e.g., an additional step of the DI water, density modifier, buffer solution, and additives). The additional step has a density based on the relative concentrations of the components that is heavier than the densities of the previously dispensed steps such that the additional step pushes up the previously dispensed steps and remains below the previously dispensed steps. The operation 506 can be repeated based on the desired number of steps for the density gradient. Each time the operation 506 is performed, the probe 108 remains in the same position (i.e., close to the bottom of the container 110).

When the density gradient does not include an additional step (i.e., "No" in operation 508), the method 500 proceeds to an operation 510 of removing the probe 108 from the container 110. Operation 510 can include removing the probe 108 slowly to not disturb the steps of the density gradient. As discussed above, the probe 108 can be coated with a non-stick material to minimize the steps in the density gradient from sticking to the probe 108 during its removal.

In the method 500, each of the pumps 104*a*-104*d* is programmed to control the flow of each liquid component into the manifold and mixing chamber 106 to have a given volume and/or speed for generating each step of the density gradient. This allows the system 100 to precisely control the concentration of each liquid component in each step of the density gradient dispensed by the probe 108 into the container 110 for generating the density gradient.

Figure 6:
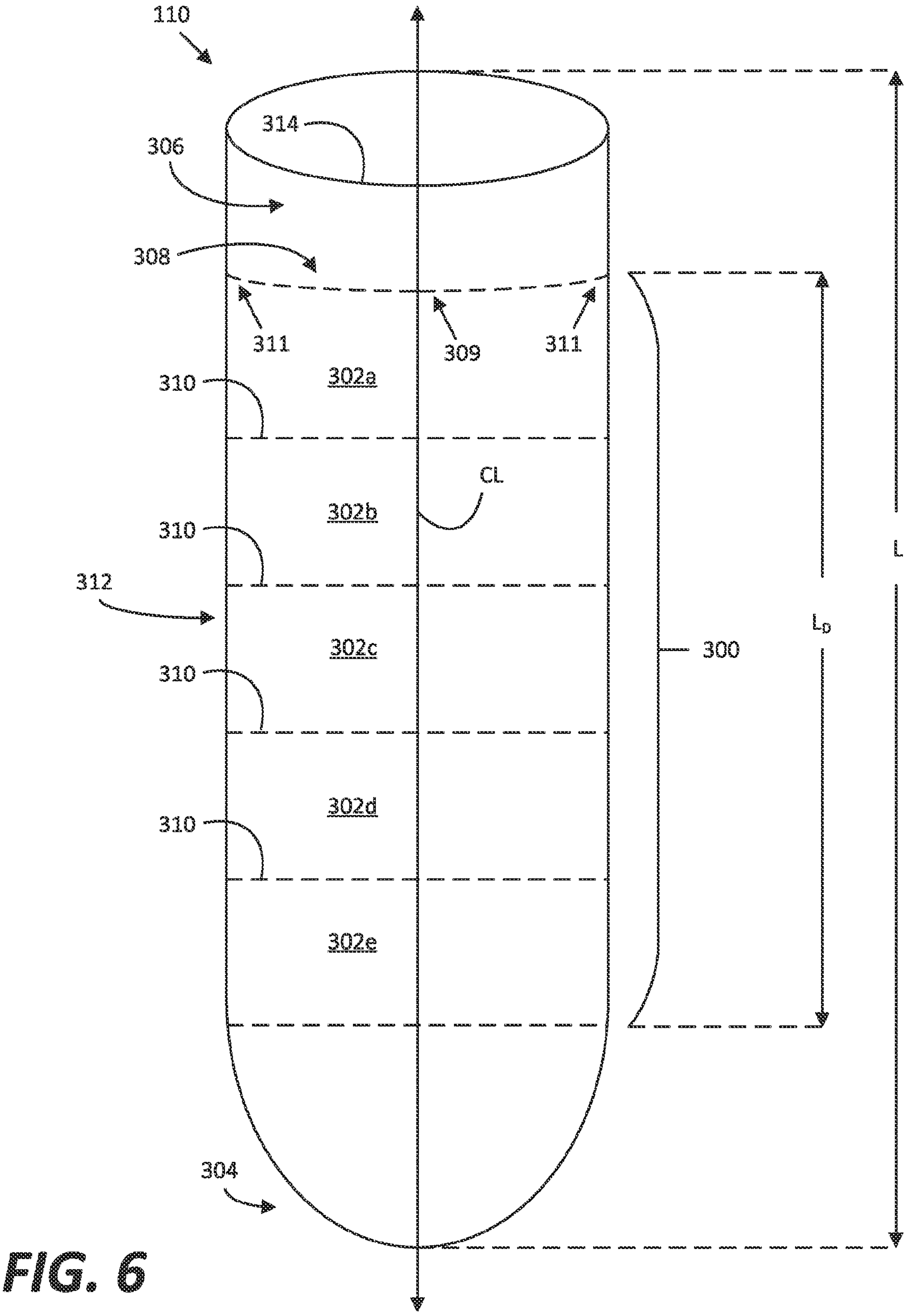
FIG. 6 schematically illustrates an example of a density gradient formed inside the container after completion of the method of FIG. 5.

FIG. 6 schematically illustrates an example of a density gradient 300 formed by the system 100 in the container 110 after completion of the method 500. The density gradient 300 is a medium created for the separation of particles in ultracentrifugation. In this example, the density gradient 300 is a step gradient, such that the density gradient 300 includes discrete steps having different densities. In this example, the density gradient includes five discrete steps. In alternative examples, the method 500 can be performed to form a continuous or linear gradient.

In the example of FIG. 6, the density gradient 300 includes steps 302*a*-302*e*. Each of the steps 302*a*-302*e* has a unique density based on the relative compositions of the components mixed in the manifold and mixing chamber 106. In this illustrative example, the density gradient 300 includes a first step 302*a* having a first density, a second step 302*b* having a second density, a third step 302*c* having a third density, a fourth step 302*d* having a fourth density, and a fifth step 302*e* having a fifth density. In accordance with the above description, the fifth density of the fifth step 302*e* is the heaviest and the first density of the first step 302*a* is the lightest, such that the densities of the steps 302*a*-302*e* increase from top to bottom inside the container 110. Each of the steps that form part of the density gradient 300 is shown separated by boundaries 310.

The system 100 and/or the method 500 can form density gradients having more than five separate steps, and/or to form density gradients having fewer than five separate steps. Also, the system 100 can form step gradients, such as the one shown in FIG. 6, and also continuous or linear gradients having layers of gradually increasing density from top to bottom. Thus, the density gradient 300 is shown by way of illustrative example only.

As further shown in FIG. 6, the container 110 includes several features. For example, the container 110 includes a bottom portion 304, a cylindrical portion 312 that extends from the bottom portion, and an opening 314 that allows liquid to be dispensed into an interior volume of the container 110. The container 110 includes a centerline CL that runs down the middle of the container 110. In some examples, the container 110 can include a seam between the bottom portion 304 of the container 110 and the cylindrical portion 312 of the container 110. In some examples, the boundary between the bottom portion 304 and the cylindrical portion 312 is used to establish an origin for positioning a sensor to start measuring the density gradient 300. As will be described in more detail, the bottom portion 304 of the container 110 can include a curved surface that interferes with measurements of the density gradient 300 such that measurements are filtered and/or removed from this portion of the container 110.

In FIG. 6, the density gradient 300 exhibits characteristics such as a meniscus 308, which is located at the top of the density gradient 300. The meniscus 308 is caused by surface tension between the density gradient 300 and an interior surface of the walls of the container 110. The meniscus 308 includes a bottom edge 309 where the centerline CL of the container 110 is located. The meniscus 308 further includes top edges 311 near the walls of the container 110. The meniscus 308 can interfere with measurements of the density gradient 300 such that measurements are not obtained or are filtered from this portion of the density gradient 300.

The container 110 includes a volume 306 above the meniscus 308 of the density gradient 300 and below the opening 314. The volume 306 can be filled with air or an inert gas. Measurement data can be obtained from the volume 306 to determine a type of material from which the container 110 is made. As an illustrative example, the container 110 can be made from polypropylene, polycarbonate, co-polyester resins such as polyethylene terephthalate glycol (PETG), and other materials. Each type of material can exhibit unique characteristics when light is transmitted through an empty portion of the container (e.g., the volume 306). The measurement data from the volume 306 can be used to standardize the measurements of the density gradient 300 for different types of containers made from different types of materials.

As further shown in FIG. 6, the container 110 has a length L that extends from the bottom portion 304 to the opening 314 of the container. The density gradient 300 has a length $L_D$. In this illustrative example, the length $L_D$ of the density gradient 300 is less than the length L of the container 110 such that the density gradient 300 occupies a portion of the length of the container. In some examples, the length $L_D$ of the density gradient 300 can be about 80 mm.

As will now be described in more detail, the system 100 performs a non-destructive density gradient measurement over the length L of the container 110. The density gradient measurement can be used to verify that the density gradient 300 conforms to a desired profile or meets a desired quality control. Additionally, the density gradient measurement can be stored in a memory for replicating the density gradient 300 inside another container.

Figure 7:
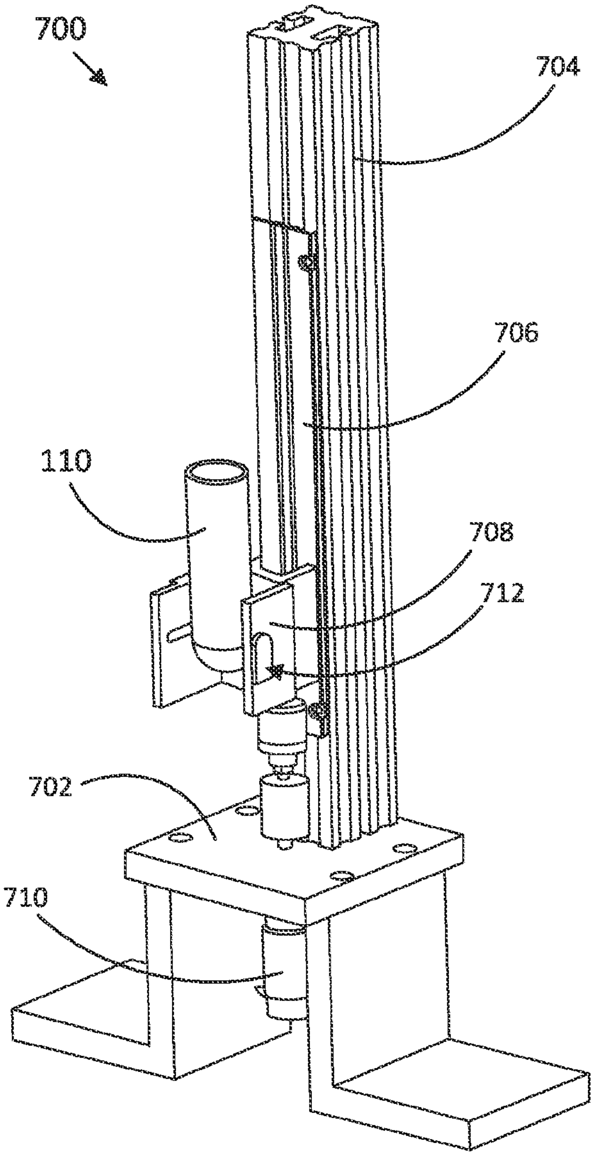
FIG. 7 is an isometric view of a measurement apparatus in the system of FIG. 1 for measuring a density gradient.
Figure 8:
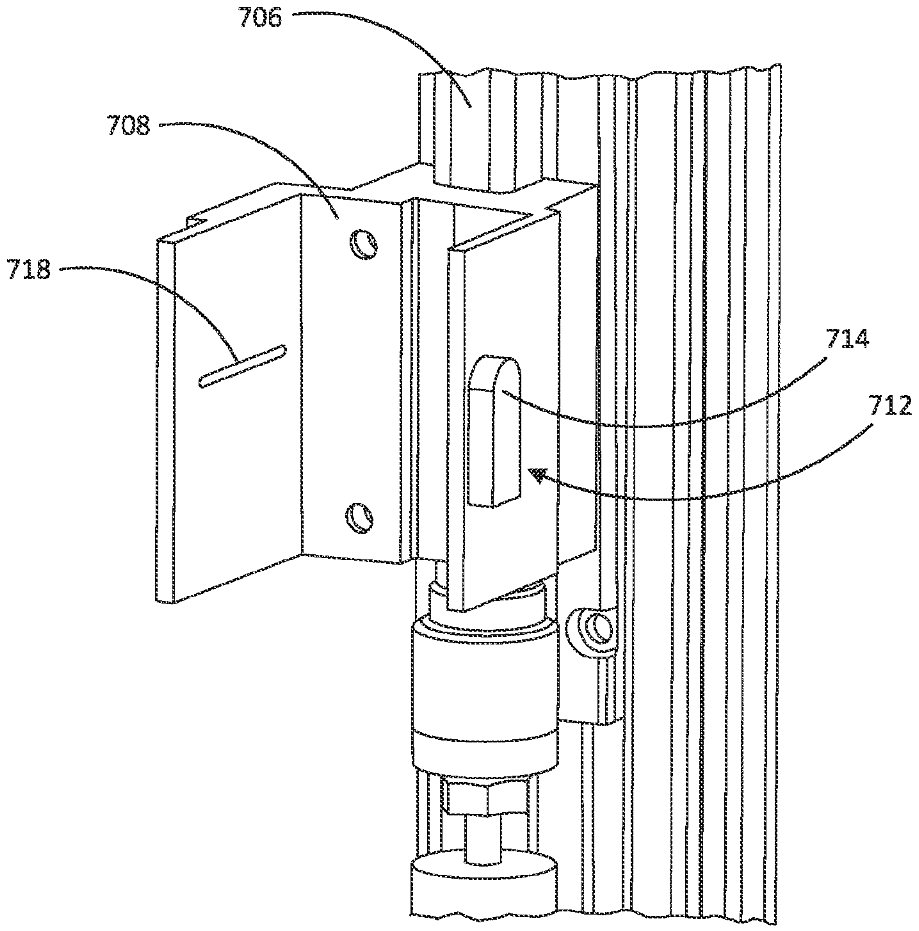
FIG. 8 is a detailed isometric view of the measurement apparatus of FIG. 7.
Figure 9:
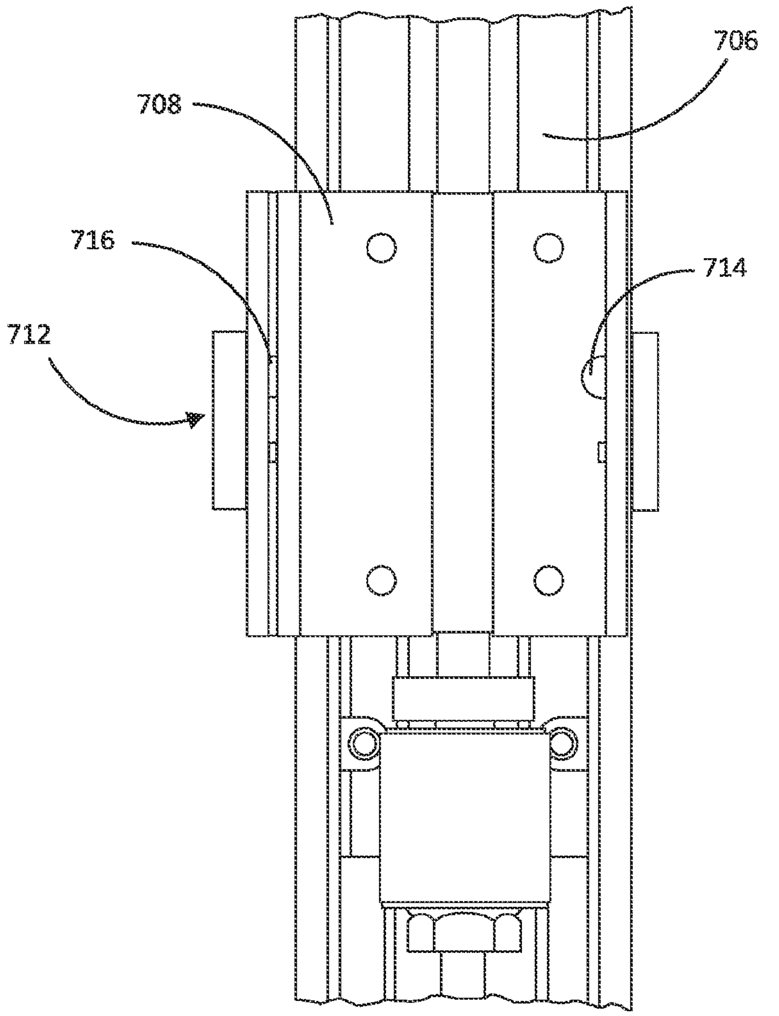
FIG. 9 is a front view of the measurement apparatus of FIG. 7.

FIG. 7 is an isometric view of an example of a measurement apparatus 700 in the system 100 for performing a non-destructive density gradient measurement over the length L of the container 110. For example, the measurement apparatus 700 can measure the density gradient 300 without touching or disturbing the density gradient. FIG. 8 is a detailed isometric view of the measurement apparatus 700. FIG. 9 is a front view of the measurement apparatus 700.

Referring now to FIGS. 7-9, in this example, the measurement apparatus 700 includes a platform 702 that supports a frame 704 that includes rails 706. In some examples, the rails 706 include a screw rail. The measurement apparatus 700 further includes a sensor assembly 712 mounted on a carriage 708 powered by a motor 710 to move up and down the rails 706 while the container 110 remains in a fixed position. In some examples, the motor 710 is a step motor or other similar type of electric motor. The rails 706 and the motor 710 provide precise vertical movement of the sensor assembly 712 relative to the container 110. The container 110 can be held relative to the measurement apparatus 700 by a holder (see FIG. 27) such as a clamp.

Alternative examples for moving the sensor assembly 712 along the length L of the container 110 and/or the length $L_D$ of a density gradient are possible. For example, gantry and pully system could be used to move the sensor assembly 712 along the length L of the container 110 and/or the length $L_D$ of a density gradient dispensed within the container 110. Additional structures for moving the sensor assembly 712 along the length L of the container 110 and/or the length $L_D$ of a density gradient dispensed within the container 110 are contemplated such that the structure shown in FIGS. 7-9 is provided by way of illustrative example.

The sensor assembly 712 is used for measuring density across the length $L_D$ of the density gradient 300 dispensed in the container 110. As shown in FIGS. 8 and 9, the sensor assembly 712 includes an emitter 714 that emits a signal such as light, and a detector 716 that measures the signal from the emitter 714 after transmission through the density gradient dispensed in the container 110. The emitter 714 and the detector 716 are fixed in relationship to each other when mounted on the carriage 708, which allows these components of the sensor assembly 712 to be moved up and down the rails 706 together. The carriage 708 allows coordinated movement of the emitter 714 and the detector 716 up and down the length L of the container 110, and can be used to provide a precise alignment of the emitter 714, the detector 716, and the centerline CL of the container 110.

In the example illustrated in FIGS. 7-9, the emitter 714 is mounted on one side of the carriage 708, and the detector 716 is mounted on an opposite side of the carriage 708. The container 110 with a density gradient dispensed therein is fixedly positioned relative to a center axis of the carriage 708 such that the signal (e.g., light) emitted by the emitter 714 passes through the container 110, and is received by the detector 716 on an opposite side of the container 110.

In alternative examples, the emitter 714 and detector 716 can be mounted on the same side of the carriage 708. For example, the emitter 714 can emit the signal from a first side of the carriage 708 that passes through the density gradient dispensed in the container 110 and that is reflected by a mirror mounted on a second side of the carriage 708 for reflection back toward the first side of the carriage 708 where the detector 716 is mounted together with the detector 716. Further alternative arrangements for the sensor assembly 712 are contemplated.

In one example embodiment, the emitter 714 emits light, and the detector 716 includes a photodiode that detects a current that results from the transmission of the light through the container 110. In some examples, the emitter 714 emits light within the infrared spectrum (e.g., light having a wavelength of about 700 nm to about 1000 nm). In some further examples, the emitter 714 emits light having a wavelength of about 880 nm. In alternative examples, the emitter 714 emits light within the visible spectrum (e.g., from about 380 nm to about 750 nm).

A current is generated on the detector 716 when the light from the emitter 714 that passes through the container 110 strikes the detector 716. The sensor assembly 712 can further includes an amplifier circuit that converts the current into a voltage. Thus, the sensor assembly 712 measures and records voltages at multiple points along the length L of the container 110 for measuring a density gradient dispensed in the container 110. As an example, the sensor assembly 712 can measure and record voltages at 320 points over a length of about 80 mm.

The voltage measurements recorded by the sensor assembly 712 correlate to refractive indices along the length of a density gradient dispensed in the container 110, and can be used to compute densities along the length of the density gradient. This is because density affects the transmission of the light from the emitter 714 through the density gradient. Thus, the voltage measurements recorded by the sensor assembly 712 can be used to measure density values at given points along the length of the density gradient dispensed in the container 110.

As shown in FIG. 8, the carriage 708 includes a slot 718 that is positioned in front of the detector 716. The slot 718 focuses light emitted from the emitter 714 that passes through a narrow slice of the density gradient dispensed in the container 110. The slot 718 allows the measurement apparatus 700 to measure narrow slices along the length of the density gradient dispensed in the container 110. Additionally, multiple measurements can be taken for each slice of the density gradient (e.g., 100 measurements per slice), and the measurements can be averaged to reduce variation in the measurements made along the entire length of the density gradient.

To further reduce sensitivity due to positional errors between the container 110, the emitter 714, and the detector 716, the detector 716 is provided with a large surface area. In some examples, the detector 716 includes a photodiode having a surface area of about 8.5 $mm^2$.

Figure 10:
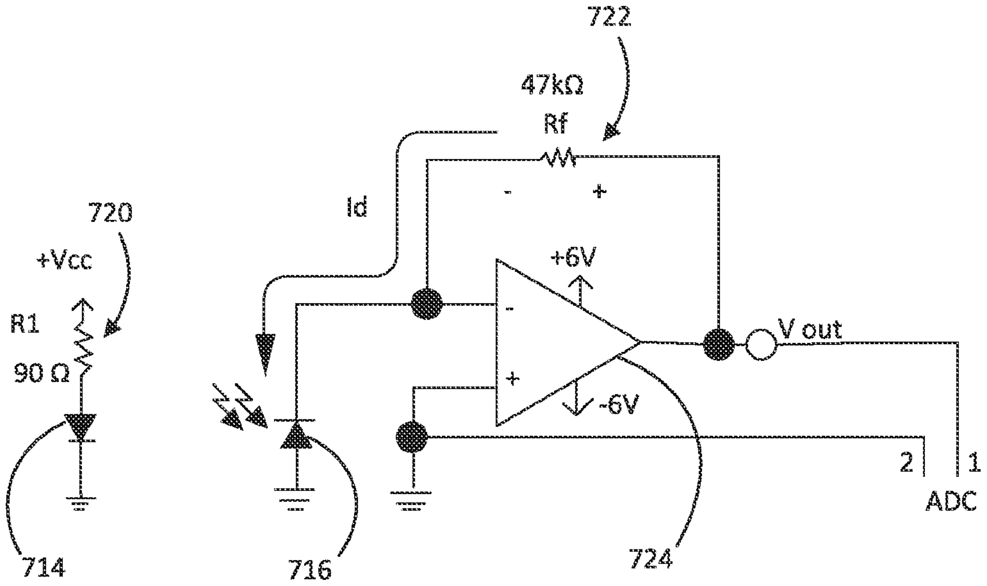
FIG. 10 schematically illustrates an example of an electrical configuration for a sensor assembly mounted on the measurement apparatus of FIG. 7.

FIG. 10 schematically illustrates an example of an electrical configuration for the sensor assembly 712. As shown in FIG. 10, a resistor 720 sets the current for the emitter 714. As an illustrative example, the resistor 720 can set the current for the emitter 714 to be in a range of about 19 mA to about 33 mA. In some examples, the resistor 720 can have an electrical resistance of about 90Ω. The emitter 714 can be powered by a stable, high precision DC power supply to maintain a steady level of infrared (IR) radiance. In an alternative example, the DC power supply for the emitter 714 can be replaced with a constant current source, which can reduce variation due to power supply drift. Additional examples for powering the emitter 714 are possible.

A transimpedance amplifier design is used to convert a detected current ($I_d$) of the detector 716 into a voltage across a feedback resistor 722. In some examples, the feedback resistor 722 has an electrical resistance of about 47 kΩ. An operational amplifier 724 having precision input current is used for its ability to operate with very low current. A second DC power supply can provide +/−6 VDC for the operational amplifier 724.

When the density gradient is dispensed in the container 110, the container becomes a cylindrical lens such that the spacing between the emitter 714, the container 110, and the detector 716 can affect the voltage measurements obtained from the sensor assembly 712. For example, a spacing of about 1.10 inches (28 mm) between the emitter 714 and the detector 716 can be used for a container having a 9⁄16 inch diameter, and a spacing of about 2.44 inches (62 mm) between the emitter 714 and the detector 716 can be used for a container having a 1 inch diameter.

Also, the voltage of the emitter 714 can be adjusted based on the distance between the emitter 714 and the detector 716 to optimize the level of infrared (IR) radiance for transmission through the container. Table 1 provides illustrative examples of optimal voltages for the emitter 714, and optimal distances between the emitter 714 and detector 716 based on different container sizes and material types. Table 1 shows voltage measurements recorded by the detector 716 for a density gradient having a first step of 0% density modifier (e.g., sucrose), and a second step of 40% density modifier (e.g., sucrose), and the differences between these measurements.

TABLE 1

| | Emitter Voltage | Emitter-Detector Distance (IN) | 0% Density Modifier | 40% Density Modifier | Difference |
|---|---|---|---|---|---|
| Material Type 1; 9⁄16 inches | 1.8 | 1.10 | 2.356 | 3.117 | 0.761 |
| Material Type 2; 9⁄16 inches | 1.7 | 1.10 | 2.224 | 2.875 | 0.651 |
| Material Type 1; 1 inch | 2.7 | 2.44 | 2.076 | 2.945 | 0.869 |
| Material Type 3; 1 inch | 2.7 | 2.44 | 1.825 | 2.703 | 0.878 |
| Material Type 2; 1 inch | 2.5 | 2.44 | 1.985 | 2.990 | 1.005 |

As shown in Table 1, the sensor assembly 712 measures voltages to determine concentration levels of density modifiers such as sucrose, glycerol, and iodixanol in containers having different diameters (e.g., 9⁄16 inches or 1 inch), and made of different materials (e.g., Material Type 1=polypropylene, Material Type 2=polyethylene terephthalate glycol (PETG), and Material Type 3=polycarbonate). The concentration levels of the density modifiers are used to determine the density of particular locations along the length of the density gradient.

Figure 11:
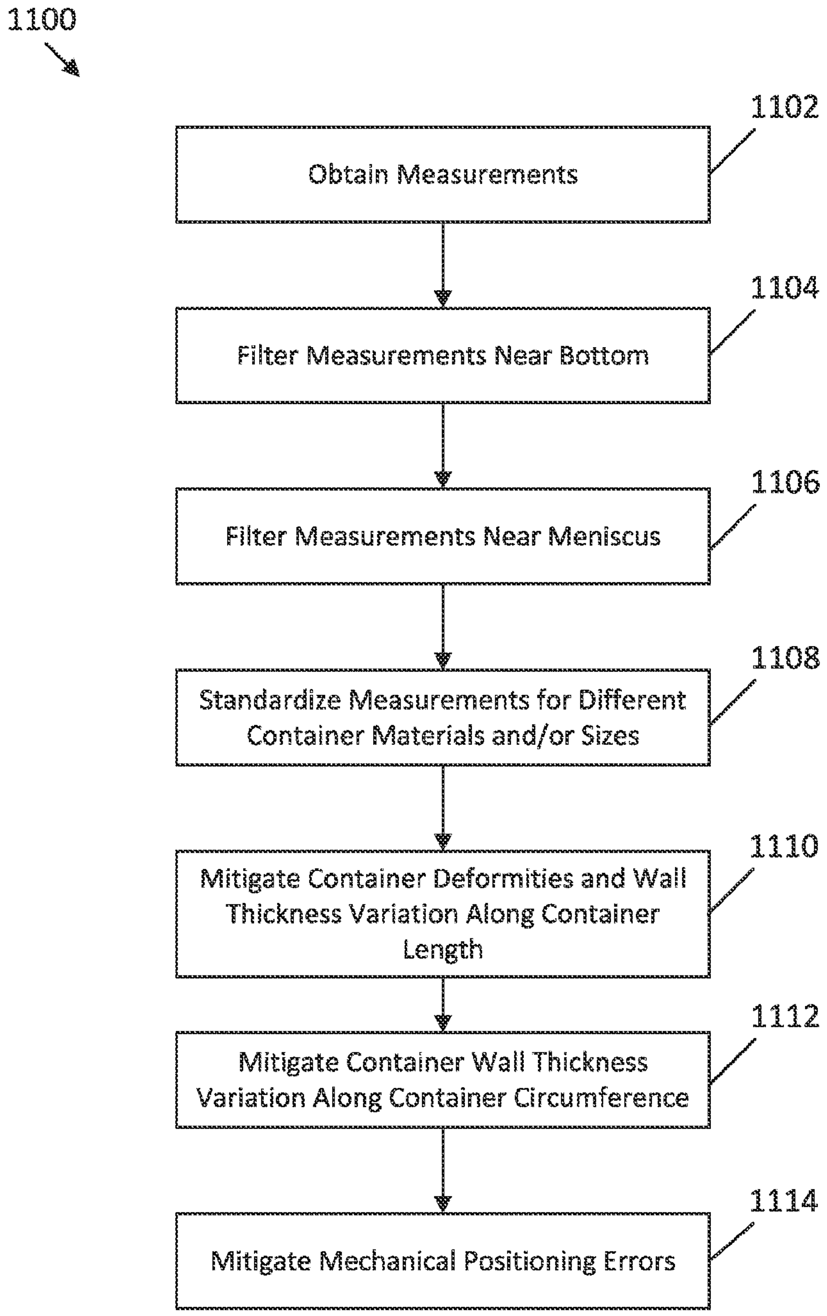
FIG. 11 schematically illustrates an example of a method of measuring a density gradient dispensed in the container of FIG. 6.

FIG. 11 schematically illustrates an example of a method 1100 of measuring a density gradient dispensed in a container, such as the density gradient 300 dispensed in the container 110 shown in FIG. 6. The method 1100 can be performed by the measurement apparatus 700 of the system 100. The method 1100 can measure the density gradient non-destructively such that the density gradient is not disturbed or altered by the method 1100.

The method 1100 includes an operation 1102 of obtaining measurements from the density gradient, which will be described in more detail with reference to FIGS. 7-9 and 12. The method 1100 includes additional operations for improving the density gradient measurement such as an operation 1104 of filtering or removing measurements from the bottom portion 304 of the container 110, an operation 1106 of filtering or removing measurements where the meniscus 308 of the density gradient 300 is located, an operation 1108 of standardizing the measurements based on container material and/or size, an operation 1110 of mitigating effects of container defects and wall thickness variation along the length L of the container 110, an operation 1112 of mitigating the effects of wall thickness variation along a circumference of the container 110 on density gradient measurements, and an operation 1114 of the mitigating mechanical positioning errors. Each of these additional operations will be described in more detail below.

Figure 12:
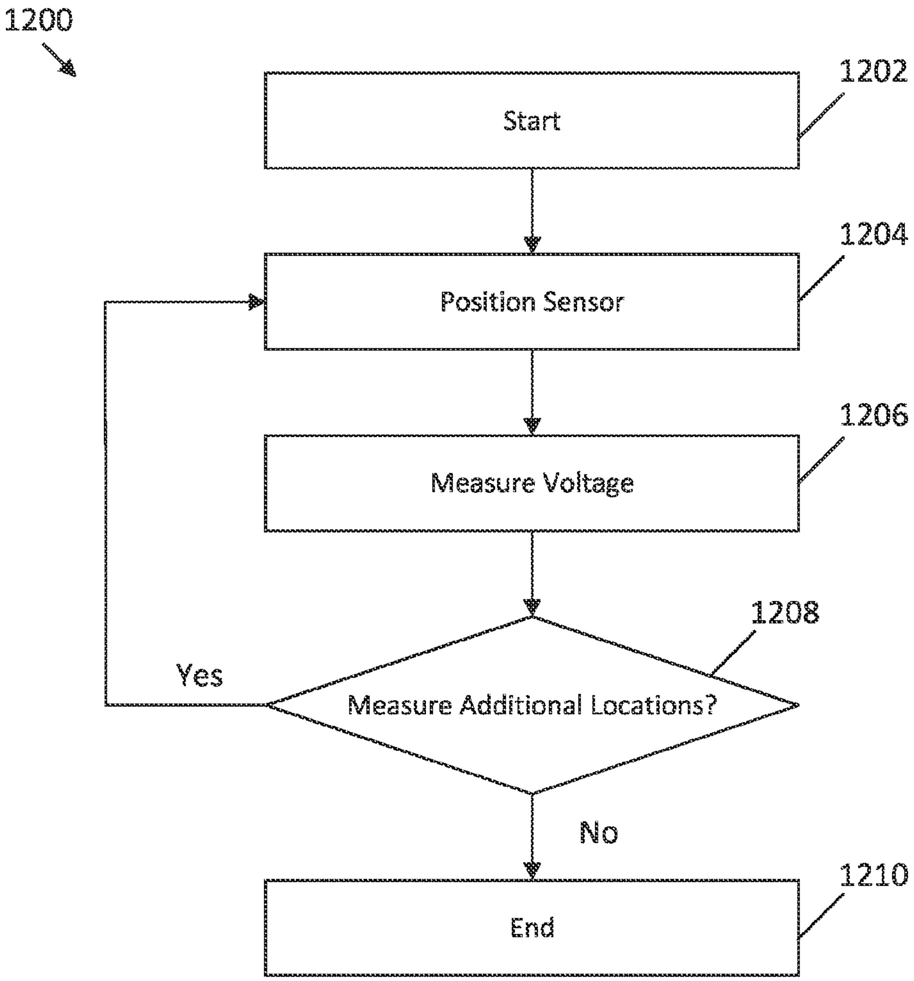
FIG. 12 schematically illustrates another example of a method of measuring a density gradient dispensed in the container of FIG. 6.

FIG. 12 schematically illustrates an example of a method 1200 of obtaining the measurements from the density gradient dispensed in the container 110. In some examples, the method 1200 forms part of the operation 1102 in the method 1100. The method 1200 can be performed by the system 100 using the measurement apparatus 700 shown in FIGS. 7-9.

As shown in FIG. 12, the method 1200 includes a step 1202 of starting a measurement of the density gradient dispensed in the container 110. Step 1202 can occur following receipt of a user input/command on the control panel 130 of the system 100.

Next, the method 1200 includes a step 1204 of positioning the sensor assembly 712 relative to the container 110 to take a measurement. The sensor assembly 712 can be positioned by the motor 710 while the container 110 remains fixed. The motor 710 can move the sensor assembly 712 up and down the entire length L of container 110 in precise steps.

In some examples, the sensor assembly 712 is initially positioned in step 1204 toward the bottom of the container 110. In alternative examples, the sensor assembly 712 is initially positioned in step 1204 toward the top of the container 110. In further examples, the sensor assembly 712 is positioned in step 1204 between the top and bottom of the container 110.

The method 1200 includes a step 1206 of measuring a voltage at the location where the sensor assembly 712 is positioned in step 1204. The voltage is measured by emitting light from the emitter 714 that passes through the container 110, and is received by the detector 716 on the opposite side of the container 110. Step 1206 can include measuring the voltage multiple times, and computing an average voltage at the location of the sensor assembly 712.

The method 1200 includes a step 1208 of determining whether additional locations along the length L of the container 110 require measurement. When it is determined that no additional locations require measurement (i.e., "No" in step 1208), the method 1200 can terminate at step 1210. When it is determined that additional locations require measurement (i.e., "Yes" in step 1208), the method 1200 can repeat the steps 1204-1208 to move the sensor assembly 712 to a new location along the length L of the container 110, take a measurement at the new location, and determine whether there are additional locations that require measurement.

In some examples, the new location is upward relative to the prior location when the measurements of the density gradient are obtained starting at the bottom of the container 110. In alternative examples, the new location is downward relative to the prior location when the measurements of the density gradient are obtained starting at the top of the container 110. The length L of the container 110 can be divided into a distinct number of locations, and steps 1204-1208 are repeated for each location to generate a profile for the density gradient. As an example, the method can obtain measurements across 320 points over a length of 80 mm.

Figure 13:
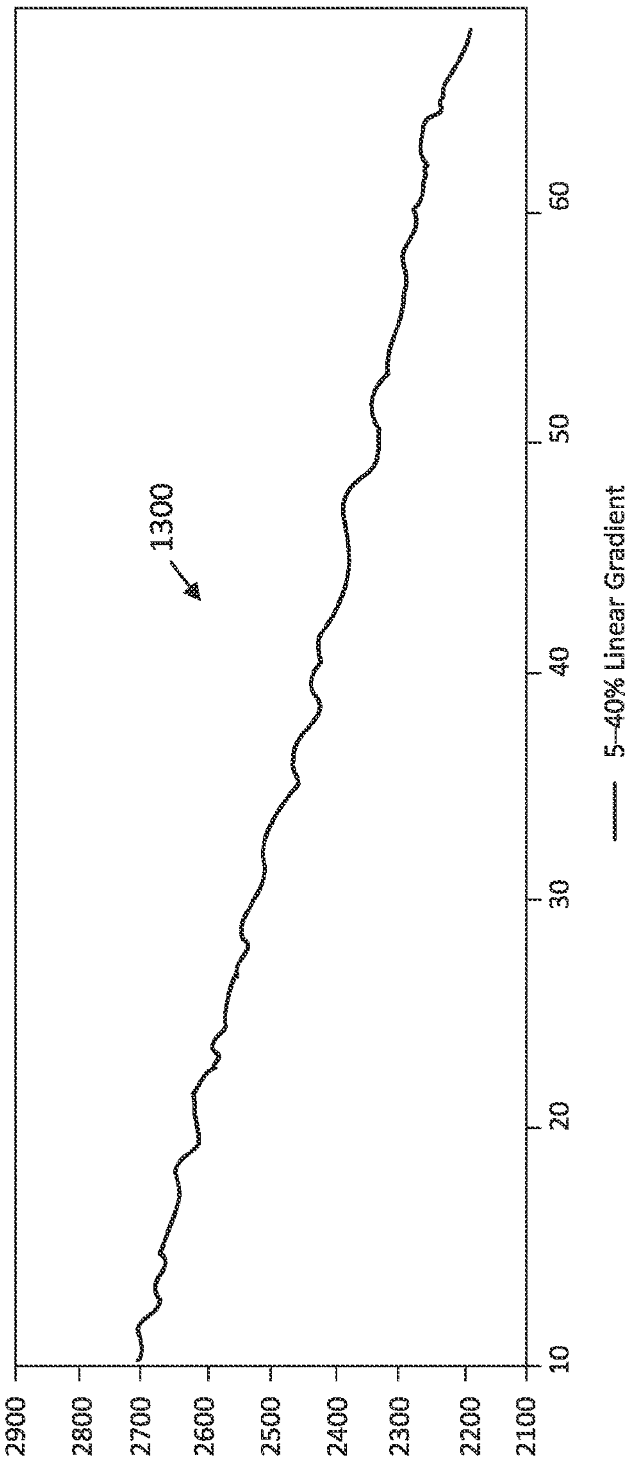
FIG. 13 graphically illustrates an example of a profile for a density gradient generated in accordance with the methods of FIG. 11 or 12.

FIG. 13 graphically illustrates an example of a profile 1300 for a density gradient measured in accordance with the method 1100. In this illustrative example, the profile 1300 shows voltages recorded by the detector 716 for a 5-40% sucrose density gradient. The voltages represent a refractive index of the density gradient dispensed in the container 110, which can be used to determine concentrations of density modifiers (e.g., sucrose) and density levels.

The bottom of the container 110 is on a left side, and the top of the container 110 is on a right side of the profile 1300. The profile 1300 excludes the bottom portion of the container 110 which can interfere with the optical path of the light from the emitter 714 (see operation 1104 of the method 1100). The profile 1300 also excludes a top portion of the density gradient (see operation 1106 of the method 1100) which can be influenced by the meniscus 308 (see FIG. 6) that forms between the density gradient and the walls of the container 110.

As shown in the example of FIG. 13, the voltage is highest near the bottom of the container 110 which is where the densest step of the density gradient is located (i.e., which has about 40% sucrose), and the voltage gradually decreases as it moves up the container 110 which is where the least dense step of the density gradient is located (i.e., which has about 5% sucrose). By scanning along the length L of the container 110, the changes in the refractive index form the profile 1300, which correlates to changes in density modifier concentration and density levels.

Figure 14:
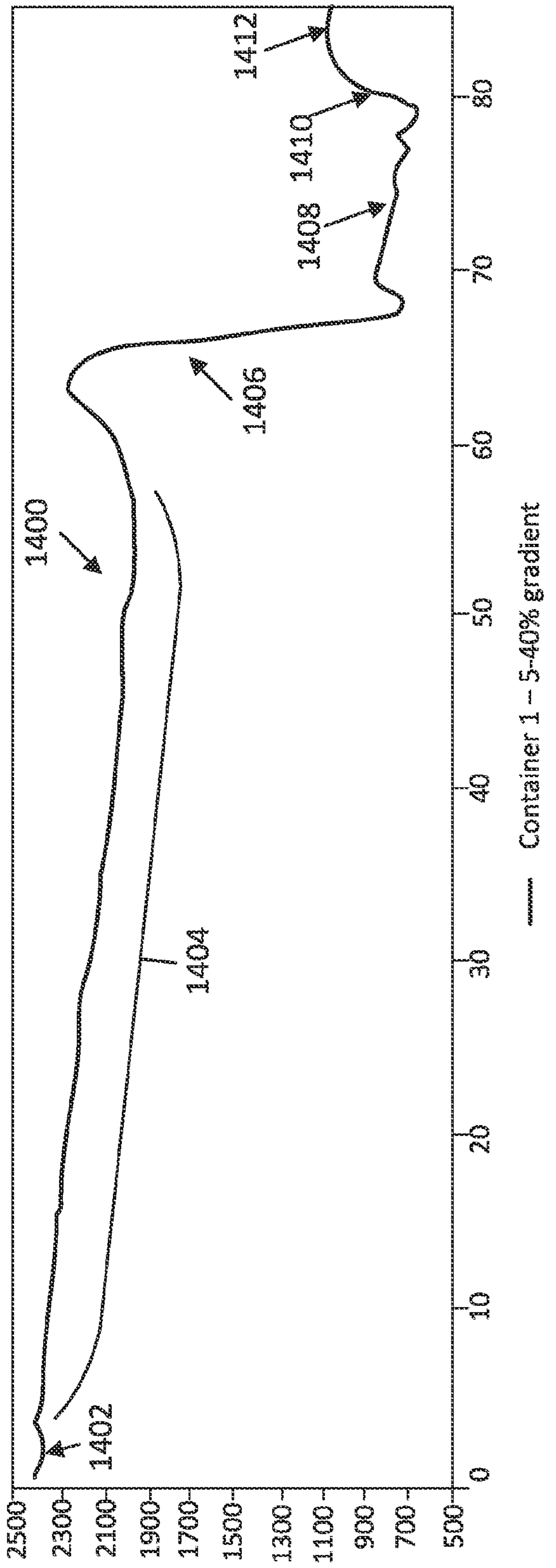
FIG. 14 graphically illustrates an example of a plot of voltage measurements identifying features of the density gradient and the container of FIG. 6.

FIG. 14 graphically illustrates an example of a plot 1400 of voltages detected by the sensor assembly 712 identifying features of the container 110 and the density gradient dispensed therein. In this example, the container 110 is a 9/16-inch diameter polypropylene container, and the voltages are taken along the entire length L of the container 110.

The plot 1400 can be used to identify the location of various features of interest on the container 110 and/or on the density gradient 300. For example, the plot 1400 shows a location 1402 of the bottom portion 304 of the container 110; a location 1404 of the cylindrical portion 312 of the container 110; a location 1406 of the meniscus 308 of the density gradient 300; a location 1408 of the volume 306 above the density gradient 300; a location 1410 of the opening 314 of the container 110; and a location 1412 of the air above the container 110.

Identification of these features of interest can help improve the measurement of the density gradient 300 by the system 100. For example, the identification in the plot 1400 of the location 1402 of the bottom portion 304 can be used to filter and/or remove the voltage measurements from this location of the container 110, in accordance with the operation 1104 in the method 1100. Similarly, the identification in the plot 1400 of the location 1406 of the meniscus 308 can be used to filter and/or remove the voltage measurements from this location of the density gradient 300, in accordance with the operation 1106 in the method 1100.

As an example, the location 1404 where the cylindrical portion 312 begins can be selected as an origin for positioning the sensor assembly 712 in step 1204 in the method 1200. As a further example, the location 1406 before the meniscus 308 can be selected as a terminal location for terminating the measurement of the density gradient by the sensor assembly 712. As another example, the location 1408 of the volume 306 above the density gradient 300 in the container 110 can be selected for obtaining a measurement to identify a material of the container 110 since each type of container can be made of material having unique characteristics when an illumination signal such as infrared light is sent through an empty portion of the container.

The height and/or locations of the meniscus 308 can be difficult to measure because the shape and/or size of the meniscus 308 can vary based on an amount of surface tension (i.e., adhesion) between the density gradient and the walls of the container 110. For example, liquids having different densities will have different surface tensions with the walls of the container 110.

The meniscus 308 can cause optical effects that can interfere with the accuracy of density measurements by the sensor assembly 712. For example, the bottom edge 309 of the meniscus 308 can cause higher voltage readings by the sensor assembly 712. Also, the top edges 311 of the meniscus can cause lower voltage readings by the sensor assembly 712. The following technique is implemented in the system 100 to identify a location of the meniscus 308, regardless of the shape and/or size of the meniscus 308. By identifying the location of the meniscus 308, measurements obtained from the sensor assembly 712 can be filtered from the location of the meniscus to improve the accuracy of density gradient measurement by the system 100.

Figure 15:
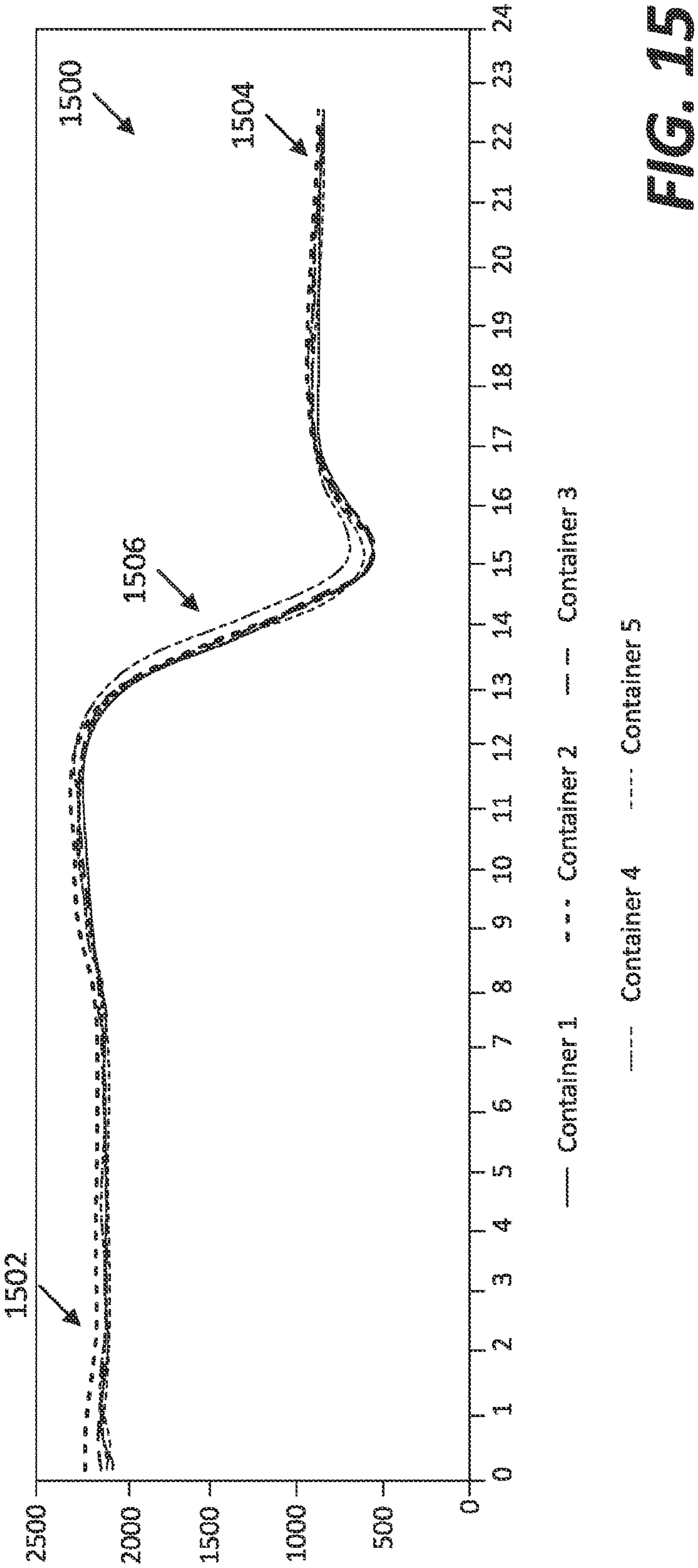
FIG. 15 graphically illustrates an example of a plot of voltage measurements for identifying locations of menisci of sample liquids dispensed in the container of FIG. 6.

FIG. 15 graphically illustrates an example of a plot 1500 of voltages for identifying locations of menisci of sample liquids dispensed in the container 110. In this example, five liquid samples are analyzed. The x-axis of the plot 1500 represents height in millimeters and the y-axis represents the voltage in millivolts detected by the sensor assembly 712. A left side 1502 of the plot 1500 shows the voltage measurements of the liquid samples in the container. A right side 1504 of the plot 1500 shows the voltage measurements of the volume 306 (e.g., air) above the samples. A transition 1506 between the left and right sides 1502, 1504 in the middle of the plot 1500 shows the menisci. An unexpected result from the plot 1500 is that although the menisci look thin to the human eye, the optical effects of the menisci are several millimeters wide.

The shape of the menisci can vary due to different surface tensions between the sample liquids and the walls of the container 110. For example, the peaks of the voltage waveforms are located near a height of about 11 mm, and the valleys of the voltage waveforms are located near a height of about 15 mm. The locations of the peaks and valleys may vary due to the different surface tensions exhibited by each of the sample liquids analyzed in the plot 1500.

Figure 16:
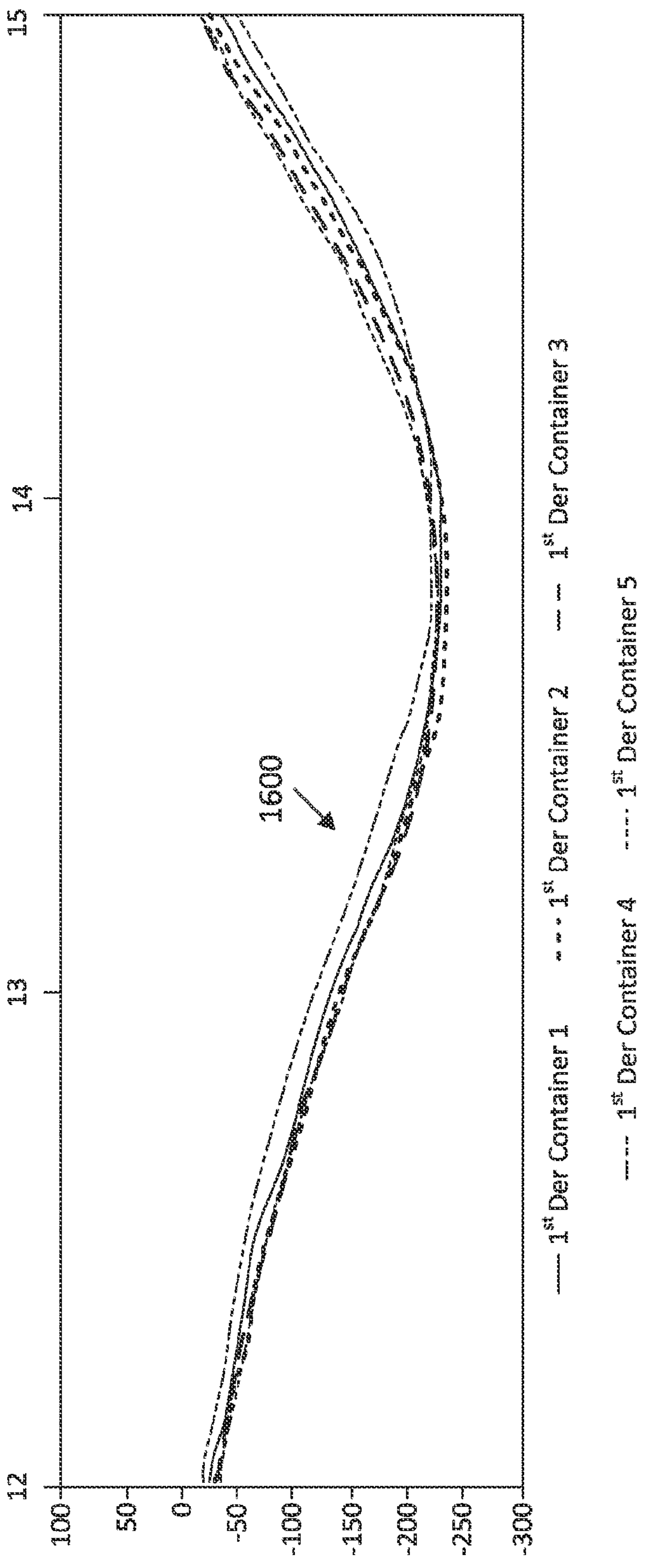
FIG. 16 graphically illustrates a magnified view of a plot of a first derivative of voltage measurements obtained from sample liquids dispensed in the container of FIG. 6.

FIG. 16 graphically illustrates a magnified view of a plot 1600 of a first derivative of voltages obtained from sample liquids dispensed in the container 110. A technique to accurately measure a height of the density gradient dispensed in the container 110 includes using a first derivative minimum of the voltages measured by the sensor assembly 712 to identify the location of the meniscus. While other features of the meniscus can be identified by the sensor assembly 712, the first derivative minimum is a consistent and reliable source for identifying the meniscus.

The minimum of the first derivative is at the point where the slope of the voltages is most negative. This point occurs at the mid-point between the bottom edge 309 and the top edges 311 of the meniscus, without regard to meniscus shape (see FIG. 6). The use of the first derivative is effective to remove the normally occurring meniscus shape variations due to surface tension. In the example of the plot 1600 shown in FIG. 16, the minimum of the first derivative is located at approximately 13.8 millimeters with about 0.25 millimeters of uncertainty.

Additional data shows in a container having a total volume of 13 mL, a volume of a liquid sample dispensed in the container can be calculated from the height identified using the first derivative minimum, and the error is about +/−37 μL. This compares favorably with other, more expensive methods for measuring a volume of a liquid sample dispensed in a container.

Figure 17:
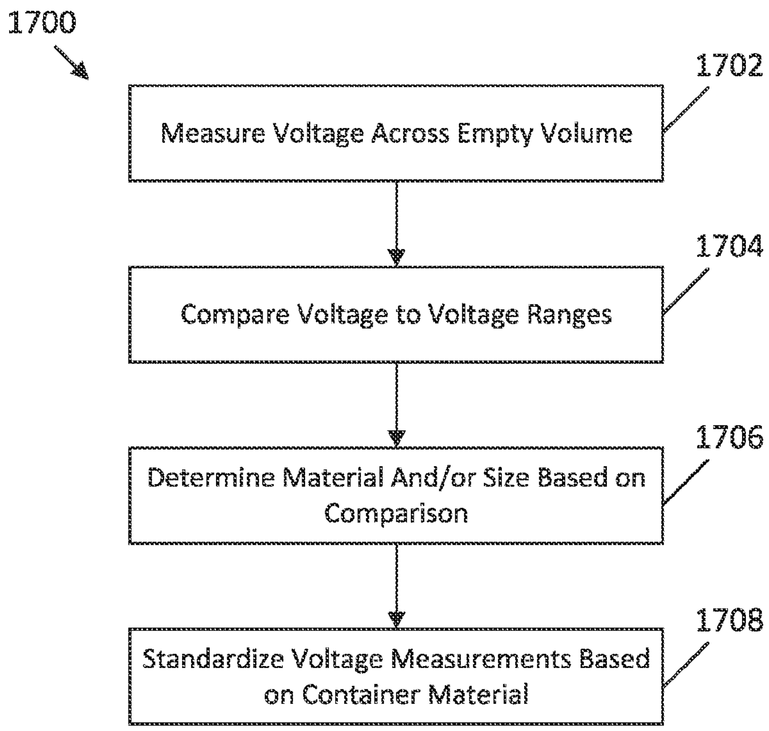
FIG. 17 schematically illustrates an example of a method of standardizing measurements based on a type of container in which the density gradient of FIG. 6 is dispensed.

FIG. 17 schematically illustrates an example of a method 1700 of standardizing measurements based on a type of container in which a density gradient is dispensed. In some examples, the method 1700 forms part of the operation 1108 in the method 1100.

The container 110 can have different sizes (e.g., 9⁄16 inch diameter, 1 inch diameter, etc.), and the container 110 can be made of different materials including, without limitation, polypropylene, polycarbonate, and co-polyester resins such as polyethylene terephthalate glycol (PETG). Each size and material can cause the container to exhibit unique characteristics when light is transmitted through causing variation in the measurements of the density gradient 300 when dispensed in different containers having different sizes and made of different materials.

The method 1700 includes an operation 1702 of measuring a voltage across an empty volume of the container 110. In some examples, operation 1702 is performed by the system 100 before the density gradient 300 is dispensed into the container 110.

In other examples, operation 1702 is performed by the system 100 after the density gradient 300 is dispensed into the container 110. In such examples, operation 1702 includes measuring the voltage across the volume 306 above the meniscus 308 of the density gradient 300 and below the opening 314. The location of the volume 306 can be determined based on the relative locations of the meniscus 308 and the opening 314, such as by identifying the characteristics of these features shown in the plot 1400 of FIG. 14. The ability to measure the voltage across an empty volume of the container 110 before or after the density gradient 300 is dispensed can provide flexibility for a user of the system 100.

The method 1700 includes an operation 1704 of comparing the voltage measured in operation 1702 with expected voltage ranges that are known for different material types and container sizes. For example, each type of material produces a unique voltage distribution that corresponds to the optical characteristics and qualities of the material. Additionally, the voltage measurements can vary based on the size or diameter of the container. Table 2 is provided below to show expected voltage ranges for a first type of material and a second type of material, and for different container sizes such as a 1 inch diameter and 9⁄16 inch diameter. As an illustrative example, the first type of material can include polyester resign such as polyethylene terephthalate glycol (PETG), and the second type of material can include polypropylene.

TABLE 2

| Container Material | Container Diameter | Expected Voltage Range |
|---|---|---|
| Type 1 | 1" | 0.6156-0.6338 V |
| Type 2 | 1" | 0.4920-0.5235 V |
| Type 2 | 9⁄16" | 0.9798-1.0423 V |
| Type 1 | 9⁄16" | 1.1966-1.2477 V |

Next, the method 1700 includes an operation 1706 of determining the material and/or the size of the container 110 based on the comparison in operation 1704. For example, when the voltage measured in operation 1702 falls within a voltage range expected for a particular material or a particular combination of material and container diameter, the container 110 is determined in operation 1706 to have that particular material and/or container diameter.

Next, the method 1700 includes an operation 1708 of standardizing voltage measurements obtained across the entire length $L_D$ of the density gradient 300. The voltage measurements can be obtained in accordance with the steps of the method 1200, described above. Operation 1708 allows the system 100 to standardize the voltage measurements obtained from the measurement apparatus 700 for different types of containers made from different types of materials and/or having different sizes.

Figure 18:
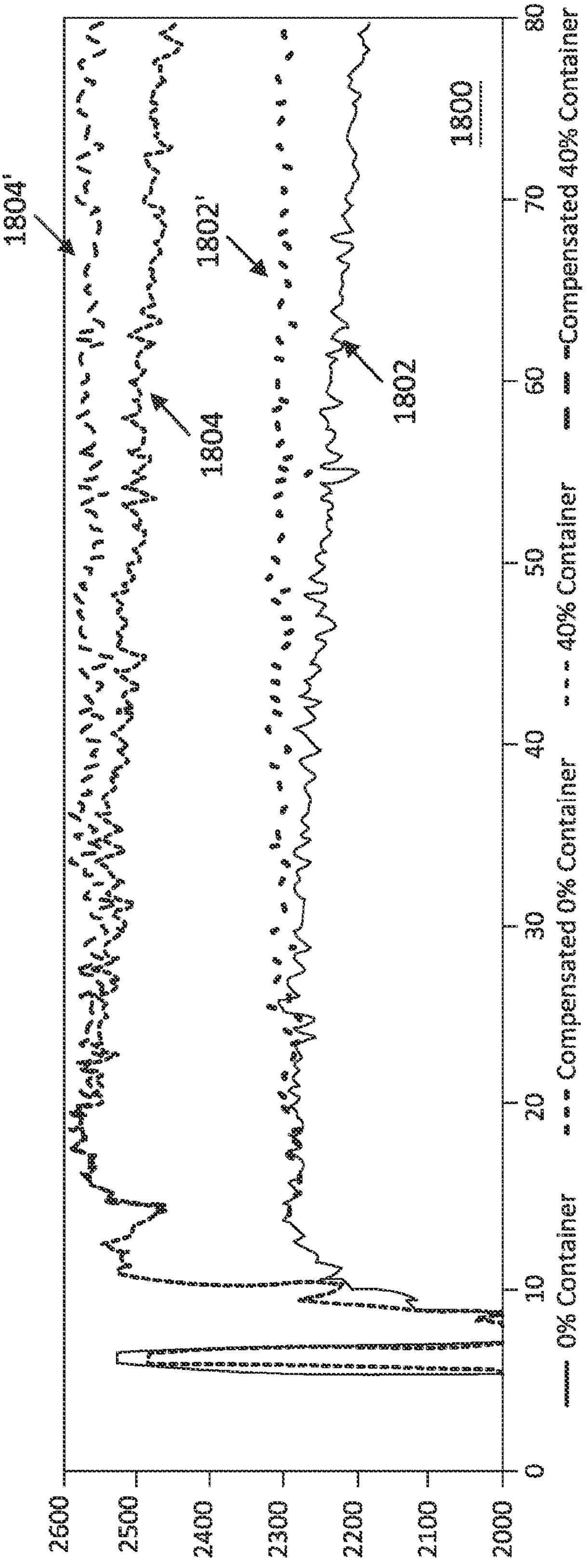
FIG. 18 illustrates an example of a chart showing standardization of measurements following completion of the method of FIG. 17.

FIG. 18 illustrates an example of a chart 1800 showing standardization of measurements following completion of the method 1700. In some instances, the process of precisely scanning a density gradient in the container 110 can be technically challenging due to the sensitivity of the measurements to variations in wall draft and/or thickness of the container. The wall draft of the container can be influenced by the type of material and process used to manufacture the container. For example, injection molding can cause containers to exhibit a wall draft along their lengths.

During injection molding, the container 110 is formed by forcing hot molten material into a die cavity under high pressure and temperature. The molten material conforms to the shape of the die and then cools off. To assist in removing the container 110 from the die, a small amount of draft is added to the die, such that the inner diameter of the container 110 is slightly larger at the top of the container 110 compared to the bottom of the container 110. The draft causes an increased wall thickness near the bottom portion 304 of the container 110 since the outer diameter of the container 110 is the same along the length L of the container 110. Although the draft is not visible to the naked eye, it is detectable by the measurement apparatus 700. For example, during a precision optical scan which measures the refractive index of a gradient sample dispensed in the container 110, the draft is revealed by a slight slope in the measurements. As described above, the measurements from the bottom portion 304 of the container 110 can be ignored or filtered out because the curved shape and increased wall thickness of the bottom portion interfere with the measurements of the density gradient.

In the example shown FIG. 18, the chart 1800 includes first and second plots 1802, 1804 of voltages measured by the detector 716 (y-axis) and container length (x-axis). Each of the first and second plots 1802, 1804 are measured for a container made of polypropylene material having a diameter of 9/16 inches. In the first plot 1802, the container is filled with a single step having 0% sucrose density modifier (e.g., the container is filled with 100% DI water). In the second plot 1804, the container is filled with a single step having 40% sucrose density modifier (e.g., the container is filled with 60% DI water and 40% sucrose). The bottom portion of the container occupies the length 0-14 mm (x-axis) such that these portions of the first and second plots 1802, 1804 can be ignored.

In both the first and second plots 1802, 1804, the container is filled with a uniform sample solution (i.e., 0% sucrose vs. 40% sucrose) such that the voltage measurements (y-axis) should be consistent (i.e., flat) across the length of the container (x-axis). However, as shown in the example of FIG. 18, the first and second plots 1802, 1804 include voltage measurements that have a slight downward slope due to the wall draft and/or thickness variation of the container.

In accordance with operation 1708 of the method 1700, the first and second plots 1802, 1804 can be standardized based on the material (e.g., polypropylene) and the size (e.g., 9/16 inches) of the container identified from operation 1706 of the method 1700. As an example, a compensation value is added based on the location where each measurement is taken above the bottom portion of the container (e.g., above 14 mm) to standardize the first and second plots 1802, 1804 based on the polypropylene material and 9/16 inch diameter of the container. In this illustrative example, the largest compensation value occurs towards the right side of the plots 1802, 1804 which is before the meniscus 308 of the density gradient 300. In this illustrative example, the largest compensation value is approximately 1.6 mV/mm.

In FIG. 18, first and second standardized plots 1802', 1804' are generated after the compensation values are added to the first and second plots 1802, 1804, such as following completion of operation 1708 of the method 1700. The first and second standardized plots 1802', 1804' are linear (e.g., flat) along the length (x-axis) of the container such that the wall draft and/or thickness variation of the container is compensated for by the compensation values.

Figure 19:
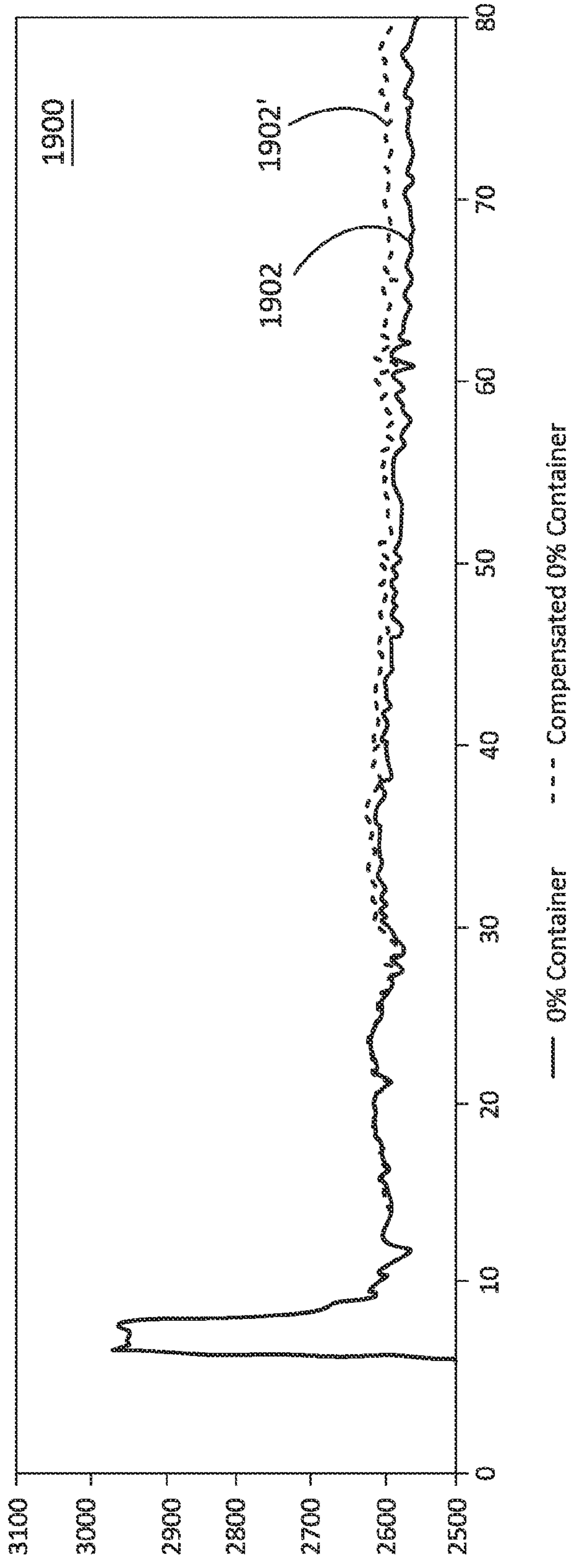
FIG. 19 illustrates another example of a chart showing standardization of measurements following completion of the method of FIG. 17.

FIG. 19 illustrates another example of a chart 1900 showing standardization of measurements following completion of the method 1700. The chart 1900 includes a plot 1902 of voltages (y-axis) and container length (x-axis) for a container made of polyethylene terephthalate glycol (PETG) material having a diameter of 9/16 inches. In this example, the container is filled with 0% sucrose density modifier (e.g., the container is filled with 100% DI water).

In the example shown in FIG. 19, the downward slope of the plot 1902 is less than the downward slope of the first plot 1802 in FIG. 18 for the container made of polypropylene material and filled with 0% sucrose density modifier. These examples illustrate that containers made of different materials can have different wall draft and/or wall thickness variation. For example, the container made of the PETG material in FIG. 19 has less draft than the container made of polypropylene material in FIG. 18. Given the foregoing, the compensation values that are used to standardize the voltage measurements can vary based on the material and/or size of the container identified in operation 1706 of the method 1700.

In FIG. 19, compensation values are added based on the location where each measurement is taken above the bottom portion of the container (e.g., above 14 mm) to standardize the plot 1902 based on the PETG material and 9/16 inch diameter of the container. In this illustrative example, the largest compensation value is on the right side of the plot 1902 such as right before the meniscus 308 of the density gradient 300 (e.g., approximately 0.5 m V/mm).

The standardized plot 1902' is generated after the compensation values are added, such as following completion of operation 1708 of the method 1700. The standardized plot 1902' is linear (e.g., flat) along the length (x-axis) of the container such that the wall draft and/or thickness variation of the container have been compensated for by the compensation values.

In view of FIGS. 18 and 19, the operation 1708 can include compensation values that are added to the voltage measurements detected by the detector 716. The compensation values are based on the length where the measurement is taken, to remove the impact of container wall draft and/or wall thickness variation. The compensation values can be based on characterization data identifying the material of the container (see operations 1702-1706). The method 1700 can be applied to open top containers, since these types of containers are typically injection molded and appear to exhibit greater wall draft than containers made by other manufacturing methods.

In addition to wall draft, the accuracy of density gradient measurements can depend on other physical attributes of the container 110. Defects including blemishes, scratches, cracks, smudges, dirt, and the like can interfere with the optical path of the light emitted from the emitter 714 as the light passes through the container 110 for detection by the detector 716. These types of defects are frequently present on containers, and even new tubes can have one or more types of defects due to a molding process used for manufacturing the containers.

Figure 20:
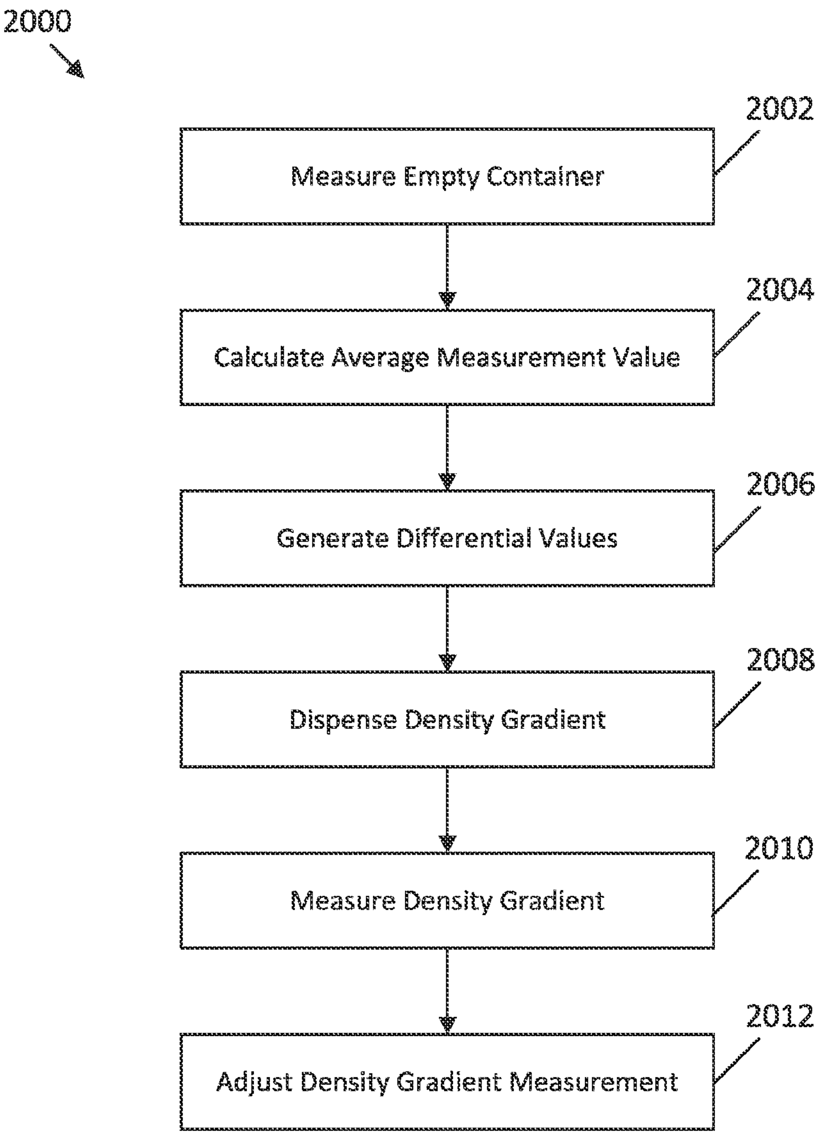
FIG. 20 schematically illustrates an example of a method of mitigating effects of defects and wall thickness variation along a length the container of FIG. 6.

FIG. 20 schematically illustrates an example of a method 2000 of mitigating effects of defects and wall thickness variation along the length L of the container on measurements obtained from the container 110 in accordance with the method 1200. Examples of defects on the container 110 can include, without limitation, blemishes, scratches, cracks, smudges, dirt, and the like. These types of defects can alter the optical path of light through the container 110, and hence affect density measurements. In some examples, the method 2000 forms part of the operation 1110 in the method 1100. The method 2000 can be performed by the system 100.

The method 2000 includes an operation 2002 of measuring the container 110 when empty (i.e., before the container 110 is filled with a density gradient). Operation 2002 is performed by the motor 710 moving the sensor assembly 712 along the length L of the container 110, while the container 110 remains fixed. In operation 2002, the emitter 714 emits light for transmission through the container 110. The light is received by the detector 716 for measuring the optical properties of the container 110 when empty. The measurements recorded by the detector 716 can include voltage measurements along the length L of the container.

Figure 21:
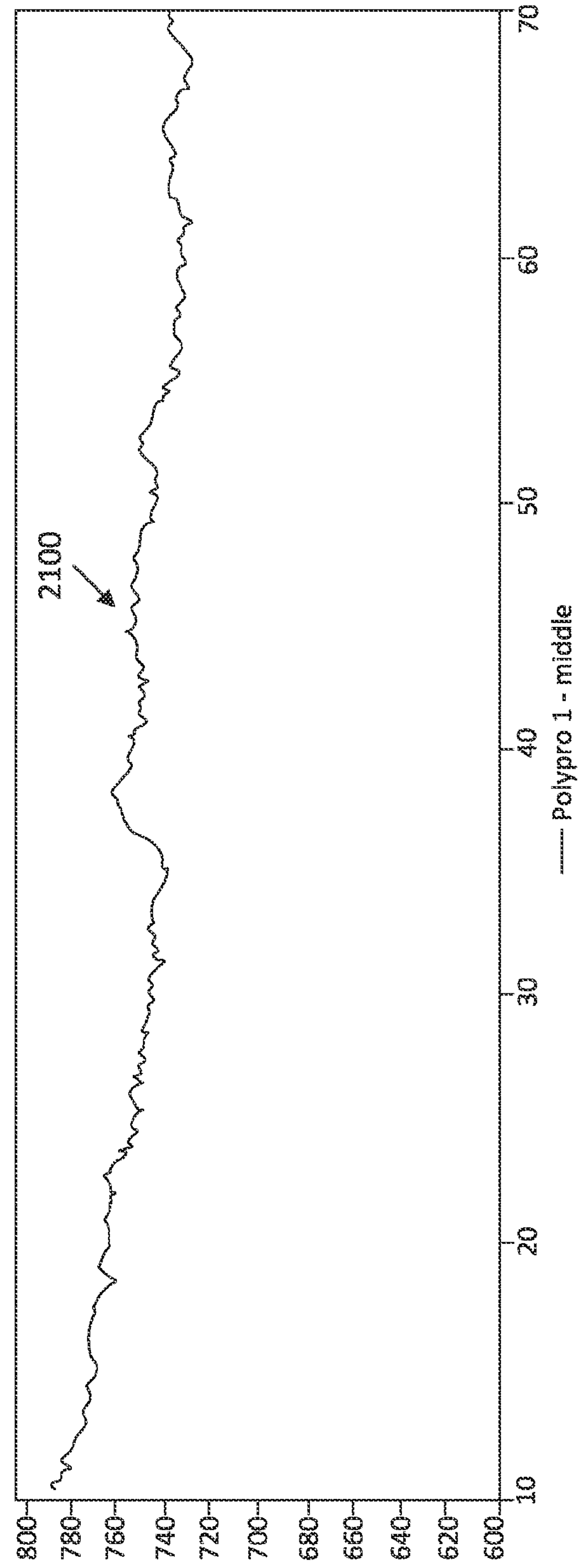
FIG. 21 graphically illustrates an example of a plot of voltage measurements from the container of FIG. 6 when empty, in accordance with an operation the method of FIG. 20.

FIG. 21 graphically illustrates an example of a plot 2100 of voltage measurements recorded by the sensor assembly 712 from the container 110 when empty, in accordance with the operation 2002. The x-axis of the plot 2100 represents the length L of the container 110 and the y-axis represents the voltage measurements in millivolts (mV). The length of the container 110 from bottom to top is represented by the voltages moving from left to right on the x-axis of the plot 2100. As shown in FIG. 21, the plot 2100 exhibits a slight downward slope in the voltages detected by the sensor assembly 712, which is likely caused by changes in the wall thickness of the container 110. The wall thickness changes are typically due to the walls being thicker near the bottom portion 304 of the container 110, and gradually becoming thinner moving towards the opening 314 of the container 110. The decrease in wall thickness from the bottom to the top of the container can help aid removal of the container 110 from a mold during manufacturing.

Referring back to FIG. 20, the method 2000 next includes an operation 2004 of calculating an average value from the measurements recorded along the length L of the container 110 in operation 2002. As an illustrative example, the average voltage measurement in the plot 2100 shown in FIG. 21 is about 751 mV for the entire length L of the container.

The method 2000 has an operation 2006 of generating differential values between the average value calculated in operation 2004 and the measurements recorded in operation 2002 along the entire length L of the container 110. Larger differential values can indicate a likelihood of a defect such as a scratch or blemish on a particular location along the length L of the container 110, since they indicate a larger deviation from the average value. Also, larger differential values can indicate that certain portions of the container 110 are particularly thick or thin relative to the thickness of the other portions of the container 110. A set of differential data values along the entire length L of the container is created after completion of operation 2006.

Next, the method 2000 includes an operation 2008 of dispensing a density gradient into the container 110. The density gradient can be dispensed in operation 2008 in accordance with the operations of the method 500, which are described above with reference to FIG. 5.

The method 2000 includes an operation 2010 measuring the density gradient dispensed in the container 110. The density gradient is measured in operation 2010 in accordance with the operations of the method 1200, which are described above with reference to FIG. 12.

The method 2000 includes an operation 2012 of adding the differential values generated in operation 2006 to the measurements of the density gradient measured in operation 2010, point by point. This adjustment can mitigate the effects of defects such as blemishes, scratches, cracks, smudges, dirt, and the like present along the length L of the container 110, and can also mitigate the effect of wall thickness variation on the density gradient measurements because the differential data takes into account these effects. In some examples, the differential values are the compensation values discussed above with respect to FIGS. 17-19.

Figure 22:
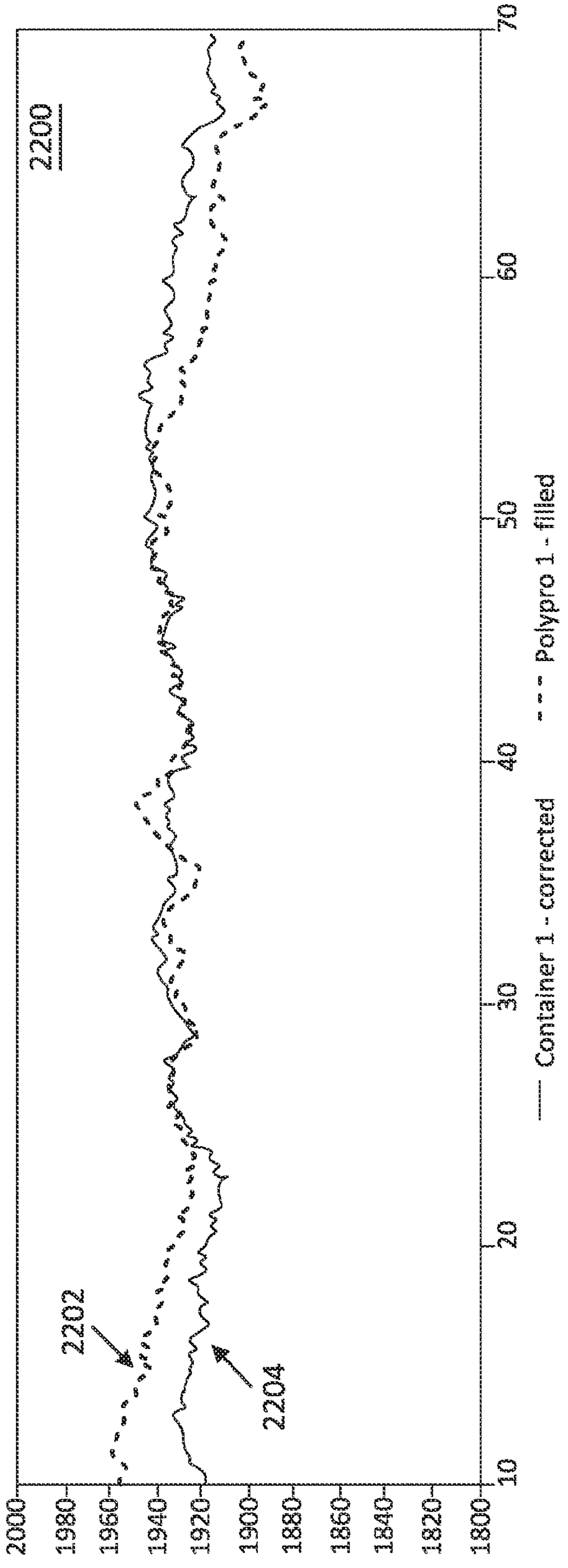
FIG. 22 graphically illustrates an example of a chart showing mitigation of container defects and/or container wall thickness variation on a sample of DI water following completion of the method of FIG. 20.

FIG. 22 graphically illustrates an example of a chart 2200 that shows how the method 2000 can mitigate and/or eliminate the effects caused by container defects and/or container wall thickness variation on a sample of DI water that is dispensed in the container 110. The x-axis of the chart 2200 represents the length L of the container 110 and the y-axis represents the voltage measurements in millivolts (mV). Since the container 110 is filled with DI water, the voltage measurements should be constant along the length of the container 110. However, changes in wall thickness of the container 110 (e.g., the wall thickness decreases from bottom to top) can cause the voltage measurements to slope downward such as in the chart 2200 shown in FIG. 22. Additionally, defects such as blemishes, scratches, cracks, smudges, dirt, and the like can affect the density measurements, as described above.

The chart 2200 includes a first plot 2202 of voltage measurements of the DI water before differential data values are added, and a second plot 2204 after the differential data values are added to the voltage measurements. As shown in FIG. 22, the second plot 2204 is flatter and has less slope than the first plot 2202, indicating that the container wall thickness variation has been normalized out of the data. Additionally, the effects of small scratches and blemishes, such as the small humps in the range of 30 mm to 37 mm, are virtually eliminated or greatly reduced in the second plot 2204. This is shown in FIG. 22 by the second plot 2204 having a more linear or smoother profile than the profile of the first plot 2202 which exhibits greater variance.

Figure 23:
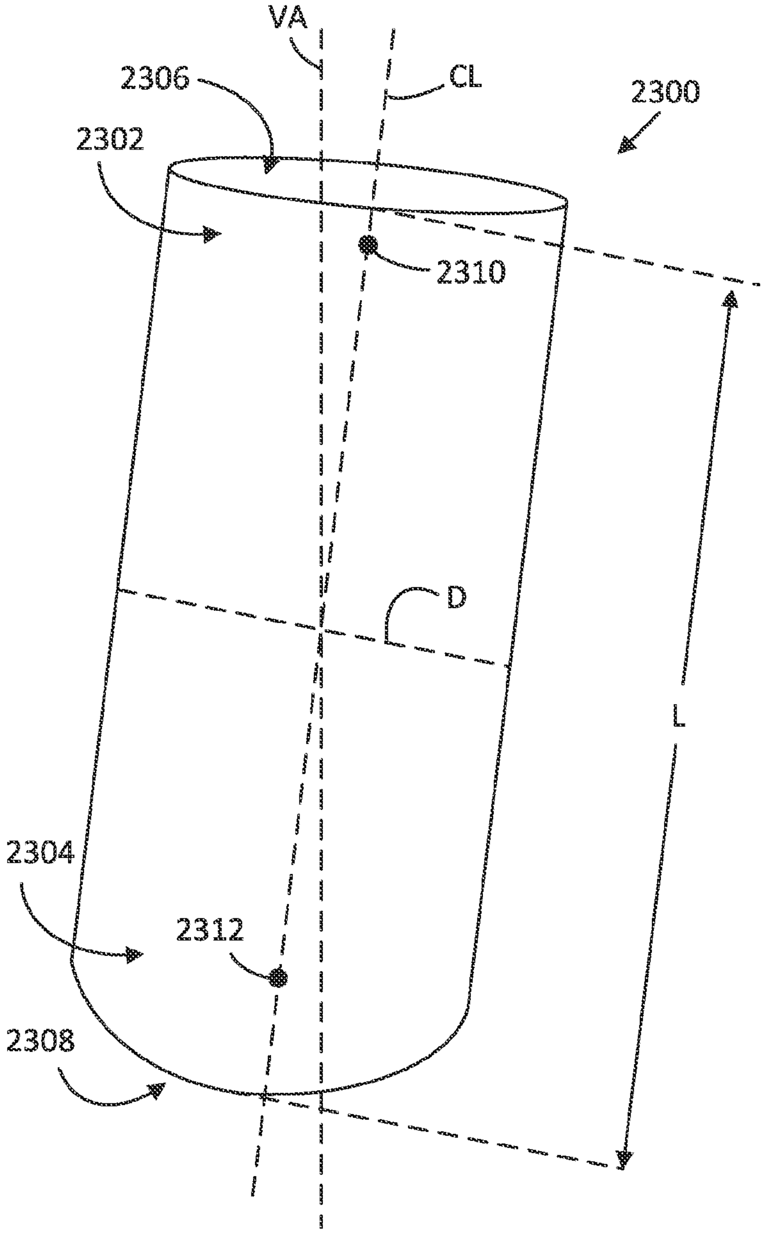
FIG. 23 illustrates an example of a container having a centerline offset with respect to a vertical axis of a sensor assembly mounted on the measurement apparatus of FIGS. 7-9.

FIG. 23 illustrates an example of a container 2300 having a centerline CL that is offset with respect to a vertical alignment VA of the sensor assembly 712 mounted on the measurement apparatus 700. The container 2300 includes a length L that extends from a proximal end 2302 to a distal end 2304. The container 2300 has an outer diameter D that is constant across the length L of the container. The outer diameter D and the length L of the container 2300 are perpendicular with one another.

The process of precisely measuring a density gradient dispensed in the container 2300 is technically challenging due to sensitivity of the density gradient measurements to the round surface of the container 2300. For example, the container 2300 when filled with a fluid exhibits optical properties such that the amount of light received by the detector 716 after the light emits from the emitter 714 and passes through the container 2300 is influenced by the alignment of the container 2300 relative to the emitter 714 and the detector 716 of the sensor assembly 712.

Figure 24:
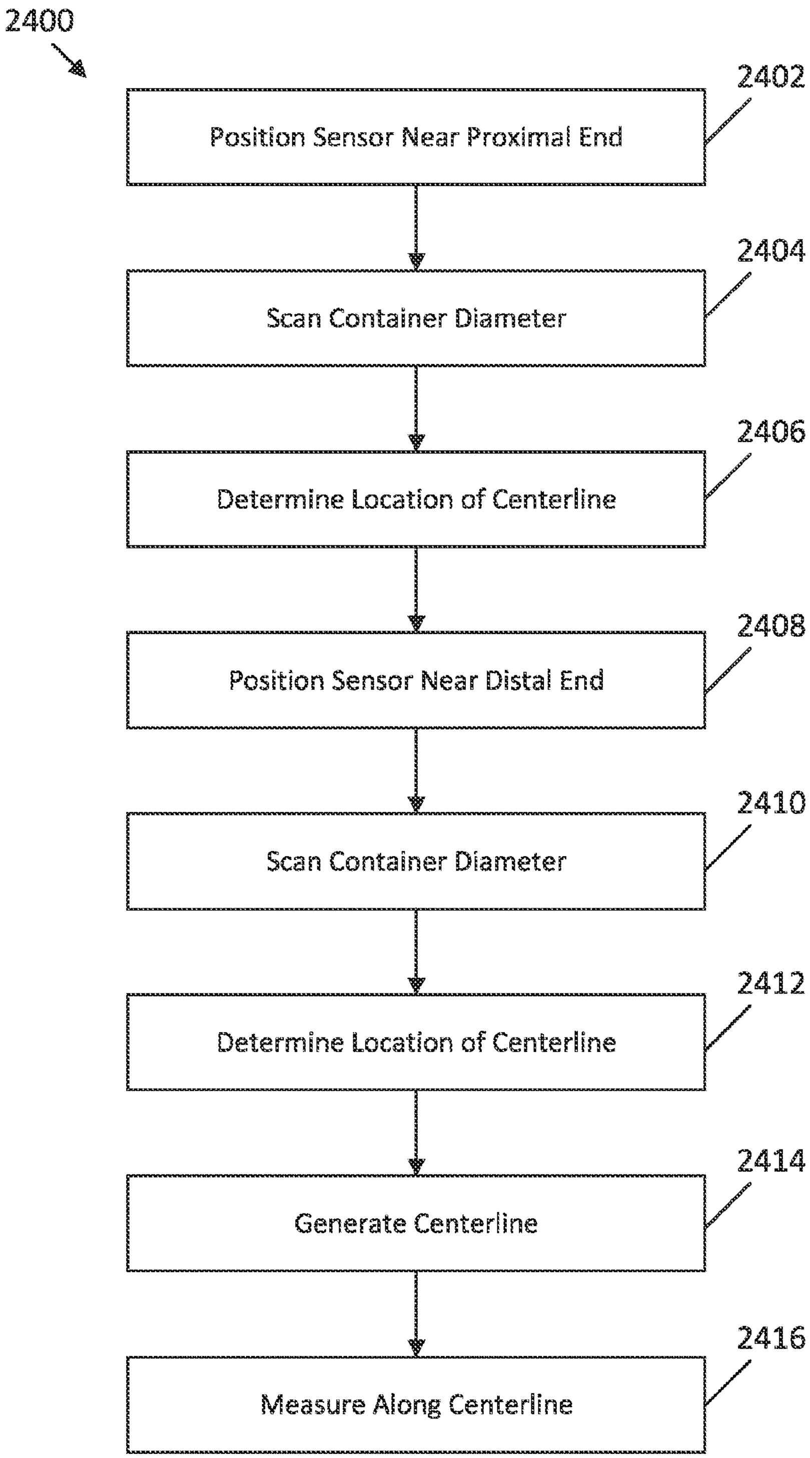
FIG. 24 schematically illustrates an example of a method of mitigating mechanical positioning errors on density gradient measurements obtained from the container of FIG. 23.

FIG. 24 schematically illustrates an example of a method 2400 of mitigating mechanical positioning errors of the container 2300 on density gradient measurements. For example, the method 2400 can mitigate and/or eliminate errors that can result from the misalignment between the centerline CL of the container 2300 with respect to the vertical alignment VA of the emitter 714 and the detector 716 of the sensor assembly 712. In some examples, the method 2400 forms part of the operation 1114 in the method 1100. The method 2400 can be performed by the system 100 using the measurement apparatus 700.

The method 2400 includes an operation 2402 of positioning the sensor assembly 712 near the proximal end 2302 of the container 2300. As shown in FIG. 23, the proximal end 2302 includes an opening 2306 where a probe can be inserted for dispensing a density gradient into the container 2300. Operation 2402 can include positioning the sensor assembly 712 below the opening 2306 by using the motor 710 to move the carriage 708 on which the sensor assembly 712 is mounted along the rails 706 while the container 2300 remains fixed.

The method 2400 includes an operation 2404 of scanning across the outer diameter D of the container 2300 near the proximal end 2302. The carriage 708 can include one or more additional motors that move the sensor assembly 712 in a radial direction perpendicular to the length L of the container 2300, allowing the sensor assembly 712 to scan across at least a portion of the outer diameter D of the container 2300. In some examples, operation 2404 includes scanning a central portion of the outer diameter D of the container 2300 such that the entirety of the outer diameter D of the container 2300 is not scanned. In some further examples, a motor moves the container 110 perpendicular to the length L of the container 2300 allowing the sensor assembly 712 to scan across at least a portion of the outer diameter D of the container 2300.

The method 2400 further includes an operation 2406 of determining a location 2310 of the centerline CL of the container 2300 near the proximal end 2302 (see FIG. 23). The location 2310 of the centerline CL is determined in operation 2406 based on the measurements taken across the outer diameter D of the container 2300 in operation 2404.

Figure 25:
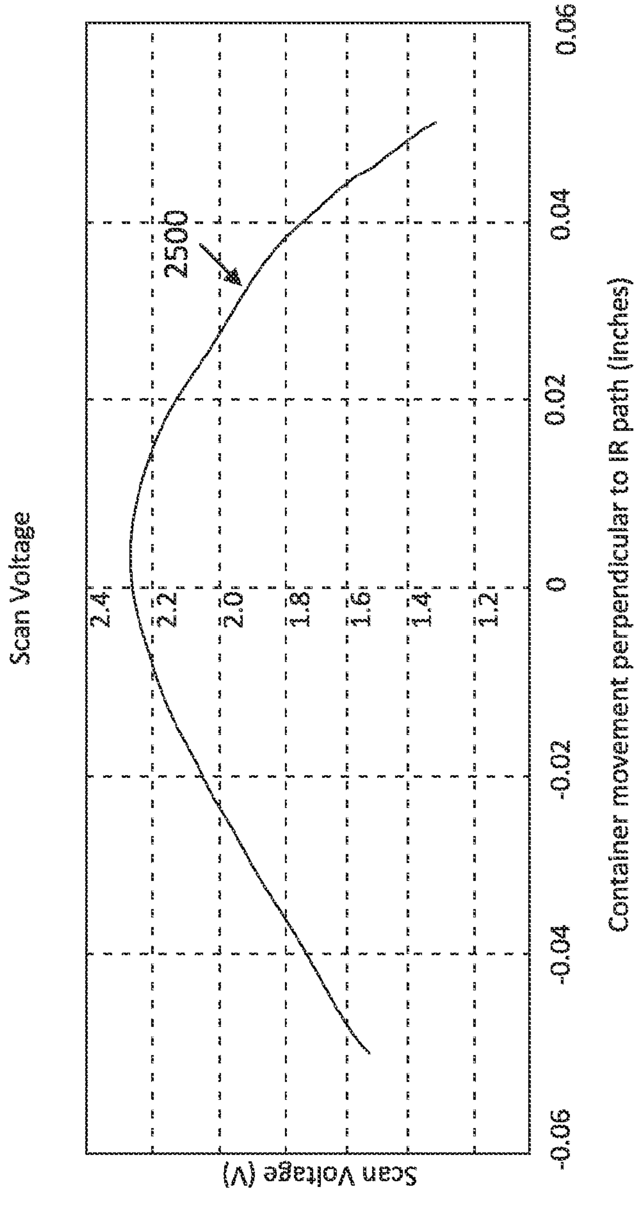
FIG. 25 graphically illustrates an example of a plot of voltage measurements taken across an outer diameter near a proximal end of the container of FIG. 23.

FIG. 25 graphically illustrates an example of a plot 2500 of voltage measurements taken across the outer diameter D near the proximal end 2302 of the container 2300. Referring now to FIGS. 23-25, when the emitter 714 hits the centerline CL of the container 2300, the detector 716 detects a maximum voltage at a given position along the length L of the container 2300. Any misalignment to the left or right of the centerline CL results in a lower voltage detected by the detector 716. The location 2310 of the centerline CL is determined in operation 2406 by identifying a location of a peak voltage measurement. In the example illustrated in FIG. 25, a peak voltage of about 2.3 V occurs at a position of about +0.01 inches.

In some examples, the method 2400 includes measuring voltage across at least a portion of the outer diameter D at each measurement position along the length L of the container 2300, and using the maximum voltage detected at each measurement position for determining the density at the given measurement position. This technique, while time consuming, can eliminate errors from misalignment and blemishes on the container 2300.

Referring back to FIG. 24, the method 2400 includes an operation 2408 of positioning the sensor assembly 712 near the distal end 2304 of the container 2300. As shown in FIG. 23, the distal end 2304 includes a bottom portion 2308. Operation 2408 can include positioning the sensor assembly 712 above the bottom portion 2308. Operation 2408 can include using the motor 710 to move the carriage 708 along the rails 706 while the container 2300 remains fixed.

Next, the method 2400 includes an operation 2410 of scanning across the outer diameter D of the container 2300 near the distal end 2304. In some examples, operation 2410 includes scanning a central portion of the outer diameter D of the container 2300 such that the entirety of the outer diameter D of the container 2300 is not scanned in operation 2410.

Next, the method 2400 further includes an operation 2412 of determining a location 2312 of the centerline CL of the container 2300 near the distal end 2304 (see FIG. 23). The location 2312 of the centerline CL is determined in operation 2412 based on the measurements taken across the outer diameter D of the container 2300 in operation 2410.

Figure 26:
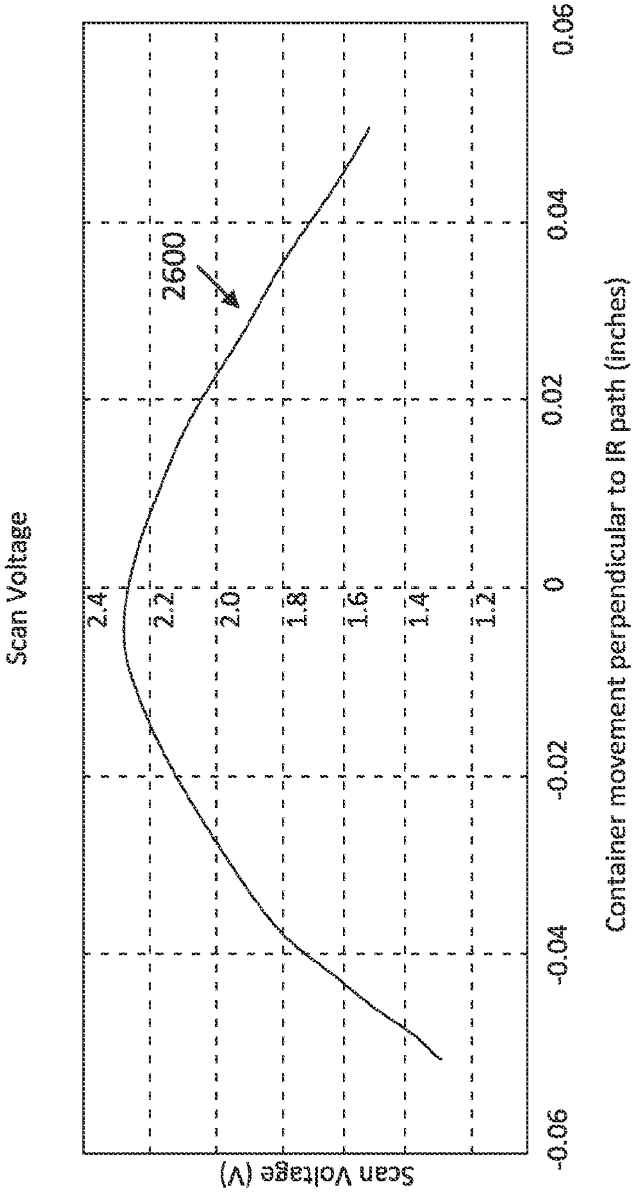
FIG. 26 graphically illustrates an example of a plot of voltage measurements taken across the outer diameter near a distal end of the container of FIG. 23.

FIG. 26 graphically illustrates an example of a plot 2600 of voltage measurements taken across the outer diameter D near the distal end 2304 of the container 2300. Like in the operation 2406, the location 2312 of the centerline CL near the distal end 2304 is determined in operation 2412 by identifying a location of a peak voltage measurement. In example illustrated in FIG. 26, a peak voltage of about 2.3 V occurs at an offset position of about −0.01 inches.

Referring back to FIG. 24, the method 2400 has an operation 2414 of generating the centerline CL of the container 2300 by connecting the location 2310 of the centerline CL near the proximal end 2302 (determined in operation 2406) with the location 2312 of the centerline CL near the distal end 2304 (determined in operation 2412). The centerline CL generated in operation 2414 is shown in FIG. 23 as extending between the proximal end 2302 and the distal end 2304, and as being offset with respect the vertical axis VA of the sensor assembly 712.

The method 2400 includes an operation 2416 of measuring a density gradient dispensed in the container 2300 by following the centerline CL generated in operation 2414. The operation 2416 can include moving the sensor assembly 712 in two dimensions such as in a vertical dimension along the length L of the container 2300 and a horizontal dimension along the outer diameter D of the container 2300. In some examples, operation 2416 includes moving the sensor assembly 712 starting from the location 2312 of the centerline CL near the distal end 2304 to the location 2310 of the centerline CL near the proximal end 2302 of the container 2300.

An advantage of the method 2400 is that performance of the method 2400 can eliminate the need for a precise alignment of the carriage 708 supporting the sensor assembly 712 with a holder (see FIG. 27) of the container 2300, and the need to maintain the alignment over the entirety of the length L of the container 2300 for each density gradient measurement. For example, use of the centerline CL generated in the method 2400 can counter the effects of any misalignment of the container 2300 with the sensor assembly 712, and can simplify the mechanical complexity and sensitivity of the measurement apparatus 700. Also, the method 2400 can simplify manufacturing and field service requirements for the measurement apparatus 700 such as by eliminating the need to periodically calibrate the measurement apparatus 700, and improve long term reliability of the measurement apparatus 700. Also, wear on the carriage 708 for the sensor assembly 712 and/or holder of the container 2300 can be less impactful to accuracy of the density gradient measurements over long term use.

Further advantages of the method 2400 include mitigating the influence of blemishes on the density gradient measurements. Blemishes typically degrade the amount of light focused by the container 2300, such that blemishes on the container 2300 result in lower voltage measurements. In some examples, the method 2400 can include scanning along the outer diameter D at each measurement point along the length L of the container 2300 such that lower voltage measurements that can result from blemishes are ignored because the width of the scan along the outer diameter D is likely to be greater than the width of a blemish. In some further examples, a best fit polynomial can be performed to match the curvature of the horizontal scan across the outer diameter D to replace error data inputs, which can further reduce the effects of blemishes, scratches, cracks, smudges, dirt, and the like on the container 2300.

In some further examples, the entire surface area of the container 2300 is scanned with a solid state array device to capture all points in two dimensions at one time. Such a technique can reduce the amount of time for measuring a density gradient along the length L of the container 2300, and also mitigate the effects of misalignment and blemishes on the container.

Figure 27:
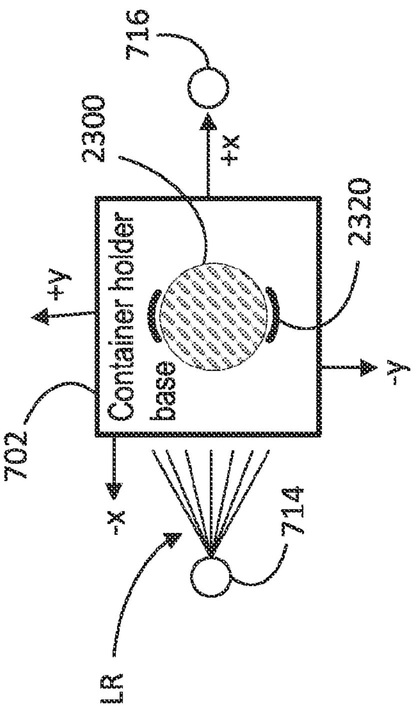
FIG. 27 shows a cross-sectional view of the container of FIG. 23 held by a holder of the measurement apparatus of FIGS. 7-9 from a perspective looking down into the container.

FIG. 27 shows a cross-sectional view of the container 2300 held by a holder 2320 of the system 100 from a perspective looking down into the container 2300. As shown in FIG. 27, the emitter 714 emits light rays LR toward the container 2300, and the light rays LR after passing through the container 2300 are received by the detector 716 at an opposite side of the container 2300. In this example, the container 2300 has a $\frac{9}{16}$ inch diameter. In some examples, the light rays LR are infrared. The container 2300 can be tilted in +y and −y directions along a y-axis relative to the emitter 714 and detector 716 of the sensor assembly 712, and the container 2300 can be tilted in +x and −x directions along an x-axis relative to the emitter 714 and detector 716.

Table 3 shows voltage measurements detected by the detector 716 when the container 2300 is tilted along the y-axis in the +y and −y directions, and when the container 2300 is tilted along the x-axis in the +x and −x directions. As shown in Table 3, the voltage measurements have greater variance along the y-axis than the x-axis such that the voltage measurements (i.e., density gradient measurements) are much more sensitive to container position error in the y-axis (perpendicular to the light rays LR) than in the x-axis (parallel with the light rays LR).

TABLE 3

0.050" = 1.27 mm

| | | x (inches) | | | | | | | | |
|---|---|---|---|---|---|---|---|---|---|---|
| | | −.050 | −.0375 | −.025 | −.0125 | 0 | +.0125 | +.025 | +.0375 | +.050 |
| y (inches) | +.050 | | | | | 1.3234 | | | | |
| | +.0375 | | | | | 1.7801 | | | | |
| | +.025 | | | | | 2.0283 | | | | |
| | +.0125 | | | | | 2.2242 | | | | |
| | 0 | 2.2781 | 2.2802 | 2.2796 | 2.2767 | 2.2720 | 2.2649 | 2.2555 | 2.2448 | 2.2331 |
| | −.0125 | | | | | 2.1642 | | | | |
| | −.025 | | | | | 1.9709 | | | | |
| | −.0375 | | | | | 1.7651 | | | | |
| | −.050 | | | | | 1.5256 | | | | |

Figure 28:
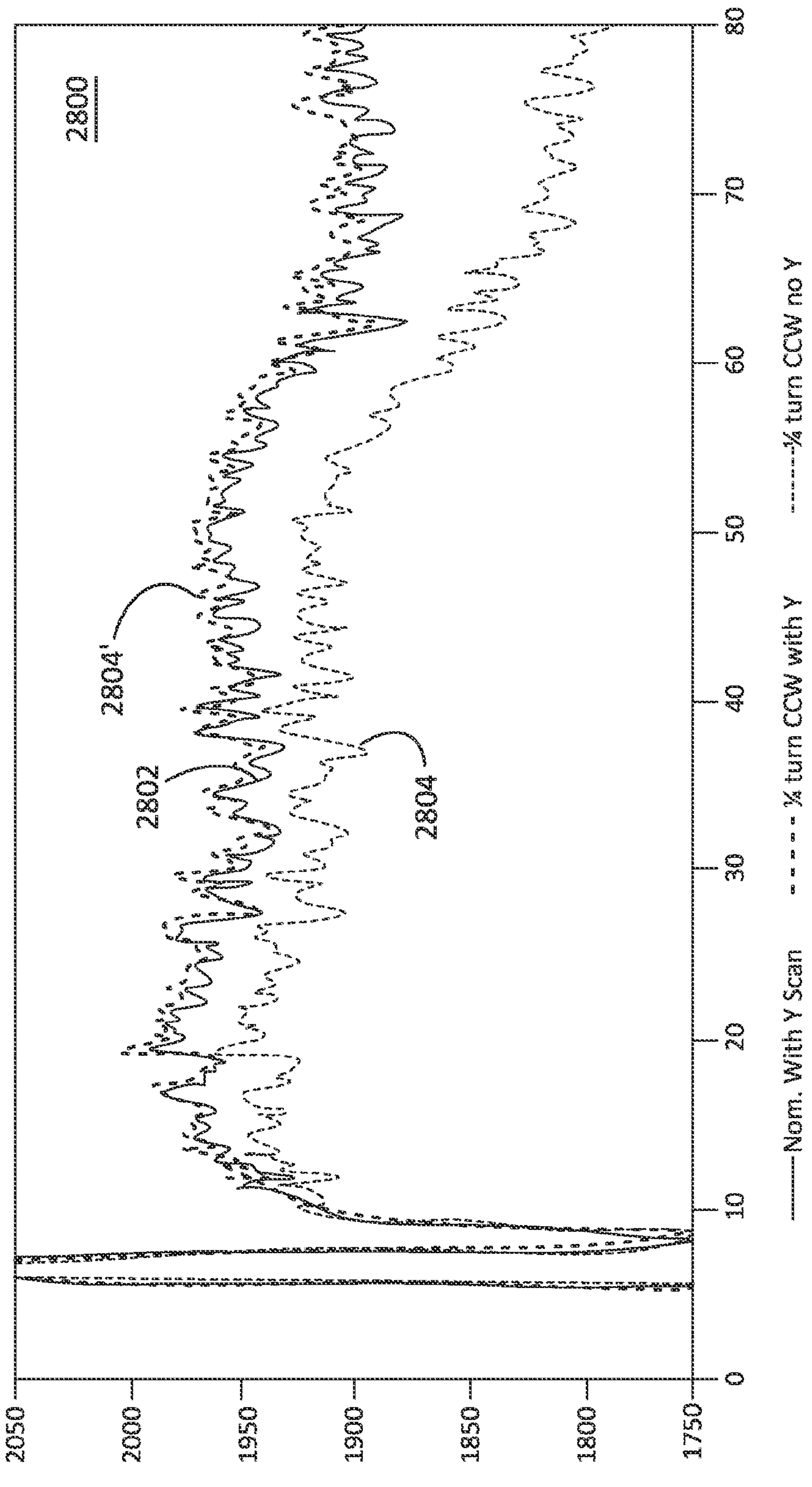
FIG. 28 graphically illustrates an example of a chart showing mitigation of mechanical positioning errors in accordance with the method of FIG. 24.

FIG. 28 graphically illustrates an example of a chart 2800 showing mitigation of mechanical positioning errors. In this illustrative example, the chart 2800 includes first, second, and third plots 2802, 2804, 2804' of voltages (y-axis) and container length (x-axis). Each of the first, second, and third plots 2802, 2804, 2804' are measured for a container made of polypropylene material having a diameter of 9⁄16 inches, and filled with 100% DI water.

In the first plot 2802, the container is properly positioned such that the centerline CL of the container is aligned with the vertical axis VA of the sensor assembly 712. In the second plot 2804, the container is purposely tilted along the y-axis such that the centerline CL of the container is misaligned with the vertical axis VA of the sensor assembly 712 (see FIG. 23). In the third plot 2804', the container is purposely tilted along the y-axis like in the second plot 2804, however, the density gradient measurements are taken along the centerline CL of the container in accordance with the operations of the method 2400. In FIG. 28, the bottom portion of the container occupies a portion of about 0-14 mm such that this portion of the first, second, and third plots 2802, 2804, 2804' can be ignored.

As shown in FIG. 28, the second plot 2804 has a larger downward slope than the slope of the first plot 2802. This can be due to the misalignment between the centerline CL of the container and the vertical axis VA of the sensor assembly 712 along the y-axis. As an illustrative example, the difference in the slope between the first and second plots 2802, 2804 is greatest near the top of the container (i.e., on the right of the x-axis) due to a greater displacement between the centerline CL of the container and the vertical axis VA of the sensor assembly 712 at the top of the container for the second plot 2804. The third plot 2804' substantially corresponds with the first plot 2802 showing mitigation of the mechanical positioning errors present in the second plot 2804 by the method 2400 causing the sensor assembly 712 to take measurements along the centerline CL of the container by moving the sensor assembly 712 in two dimensions such as in a vertical dimension along the length L of the container and a horizontal dimension along the outer diameter D of the container.

Figure 29:
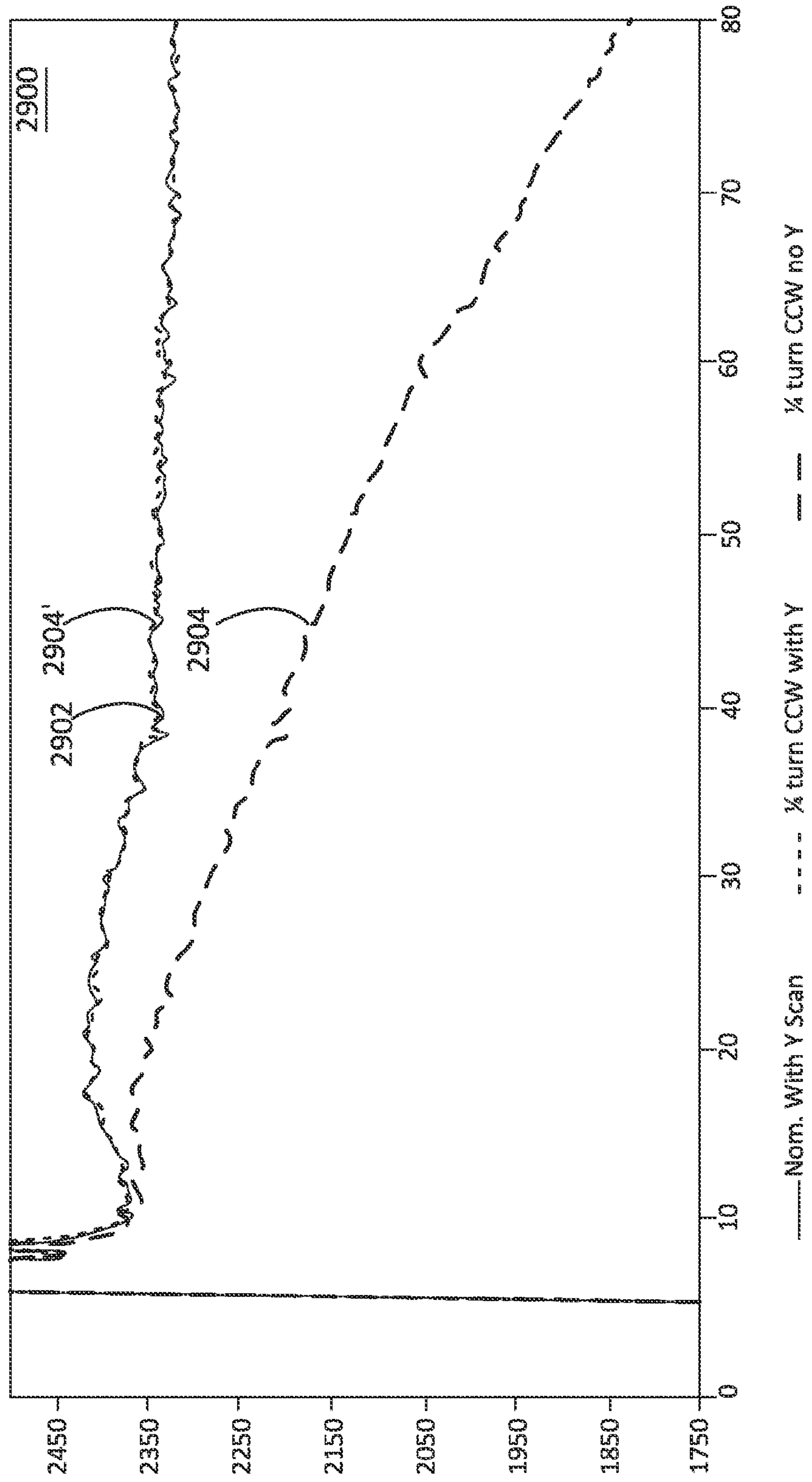
FIG. 29 graphically illustrates another example of a chart showing mitigation of mechanical positioning errors in accordance with the method of FIG. 24.

FIG. 29 graphically illustrates another example of a chart 2900 showing mitigation of mechanical positioning errors in accordance with the method 2400. In this example, the chart 2900 includes first, second, and third plots 2902, 2904, 2904' of voltages (y-axis) and container length (x-axis). Each of the first, second, and third plots 2902, 2904, 2904' are measured for a container made of PETG material having a diameter of 9⁄16 inches, and filled with 100% DI water. In the first plot 2902, the container is properly positioned such that the centerline CL of the container is aligned with the vertical axis VA of the sensor assembly 712. In the second plot 2904, the container is purposely tilted along the y-axis such that the centerline CL of the container is misaligned with the vertical axis VA of the sensor assembly 712 (see FIG. 23). In the third plot 2904', the container is purposely tilted along the y-axis like in the second plot 2904, however, the density gradient measurements are taken along the centerline CL of the container in accordance with the operations of the method 2400. In FIG. 29, the bottom portion of the container occupies a length of about 0-14 mm such that this portion of the first, second, and third plots 2902, 2904, 2904' can be ignored.

Like in the chart 2800 described above, the second plot 2904 has a larger downward slope than the slope of the first plot 2902. This can be due to the misalignment between the centerline CL of the container and the vertical axis VA of the sensor assembly 712. In this example, the difference in the slope between the first and second plots 2902, 2904 is greatest near the top of the container (i.e., on the right of the x-axis) due to there being greater displacement between the centerline CL of the container and the vertical axis VA of the sensor assembly 712 at the top of the container for the second plot 2904. The third plot 2904' substantially corresponds with the first plot 2902 illustrating mitigation of the mechanical positioning errors present in the second plot 2904 by the method 2400 causing the sensor assembly 712 to take measurements along the centerline CL of the container by moving the sensor assembly 712 in two dimensions (e.g., in a vertical dimension along the length L of the container and a horizontal dimension along the outer diameter D of the container).

Figure 30:
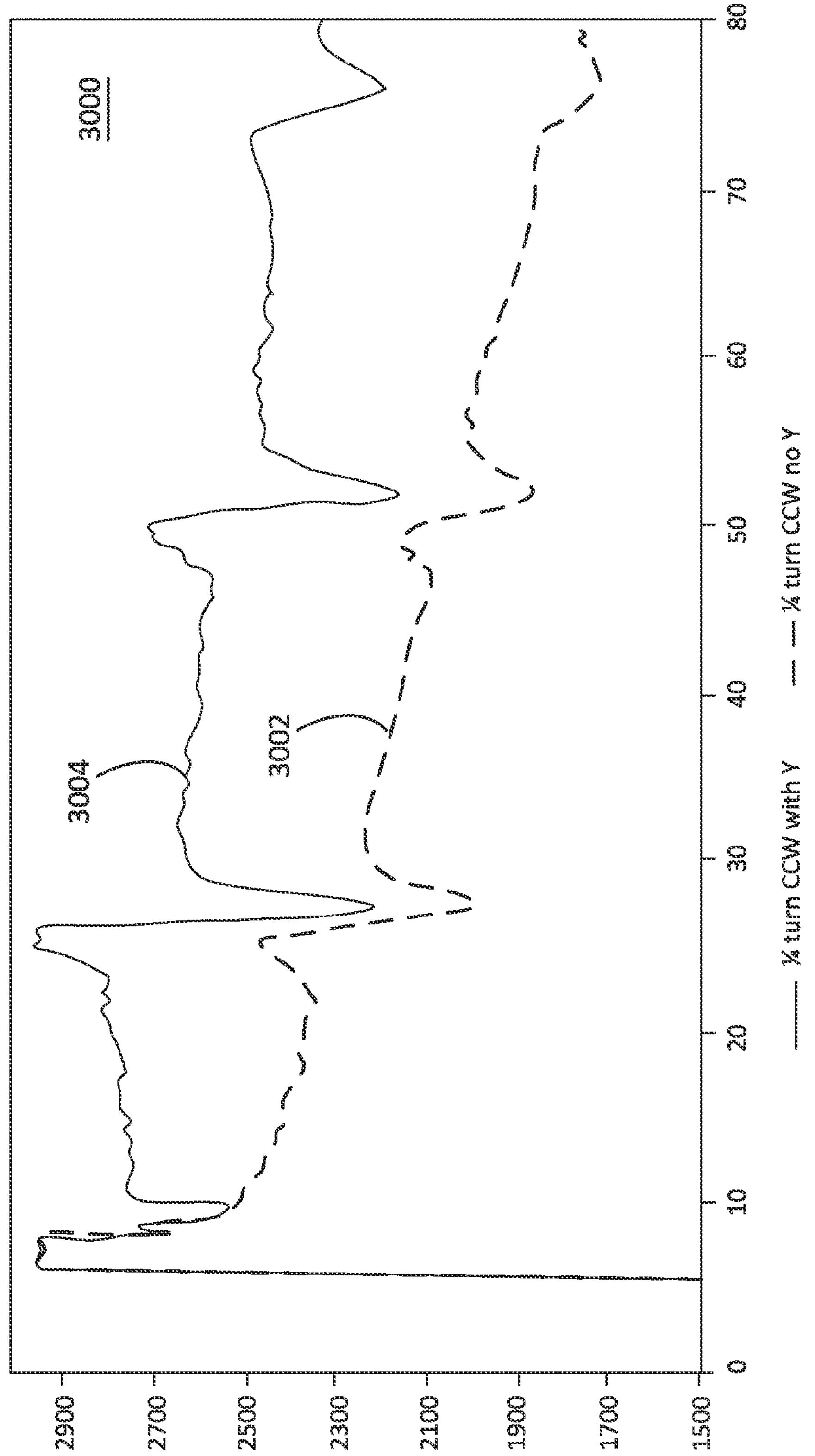
FIG. 30 graphically illustrates another example of a chart showing mitigation of mechanical positioning errors in accordance with the method of FIG. 24.

FIG. 30 graphically illustrates another example of a chart 3000 showing mitigation of mechanical positioning errors in accordance with the method 2400. In this illustrative example, first and second plots 3002, 3004 of voltages (y-axis) and container length (x-axis). Each of the first and second plots 3002, 3004 are measured for a 5%, 15%, 25%, and 35% sucrose step gradient in a container made of PETG material having a diameter of 9/16 inches. In the first plot 3002, the container is tilted in the y-axis such that each of the steps in the first plot 3002 have a significant downward slope along the container length (x-axis). In the second plot 3004, container is tilted in the y-axis (like in the first plot 3002). However, the second plot 3004 is generated by the method 2400, which causes the sensor assembly 712 to take the voltage measurements along the centerline CL of the container. As shown in FIG. 30, the slope of each of the steps in the second plot 3004 are much more linear (e.g., flat) than the steps in the first plot 3002. Thus, FIG. 30 further shows the method 2400 mitigates mechanical positioning errors.

At any given position along the length L of a container in which a density gradient is dispensed, measurements recorded by the sensor assembly 712 should be the same regardless of the rotation of the container. However, in some instances, the container is deformed such that the walls of the container do not have a uniform thickness around a circumference of the container.

Figure 31:
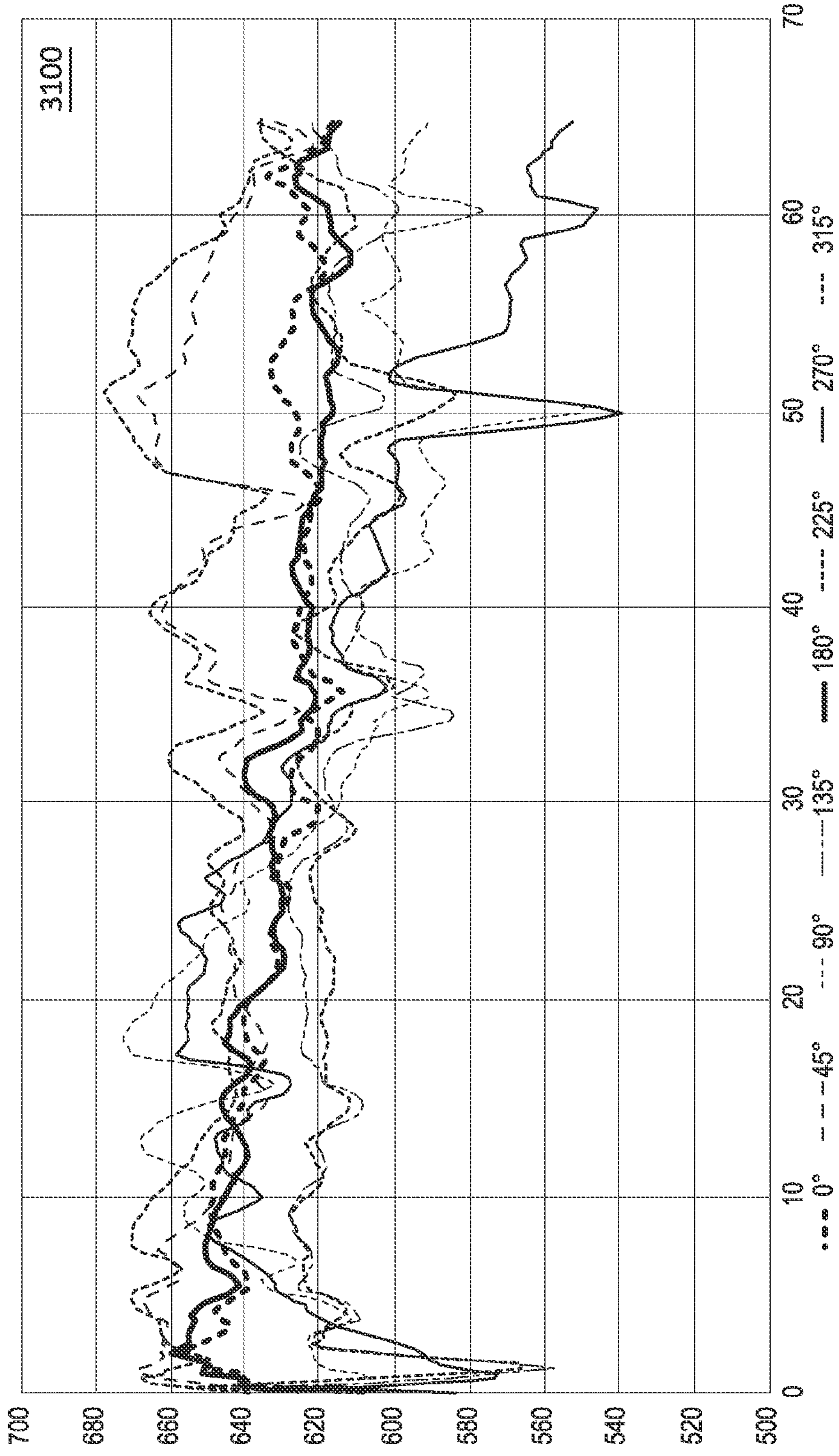
FIG. 31 graphically illustrates a chart where voltage measurements are taken at 45 degrees of rotation along a length of the container of FIG. 23.

FIG. 31 graphically illustrates a chart 3100 where voltage measurements (y-axis) are taken at 45 degrees of rotation along a length of a container (x-axis). The variation of the voltage measurements along the length of the container for the different degrees of rotation shown in FIG. 31 (i.e., 0 degrees, 45 degrees, 90 degrees, 135 degrees, 180 degrees, 225 degrees, 270 degrees, and 315 degrees) can create density gradient measurement errors, especially when it is desirable to only measure the container in one rotational orientation. Also, rotating the container during a density gradient measurement can add complexity to the measurement apparatus 700.

Figure 32:
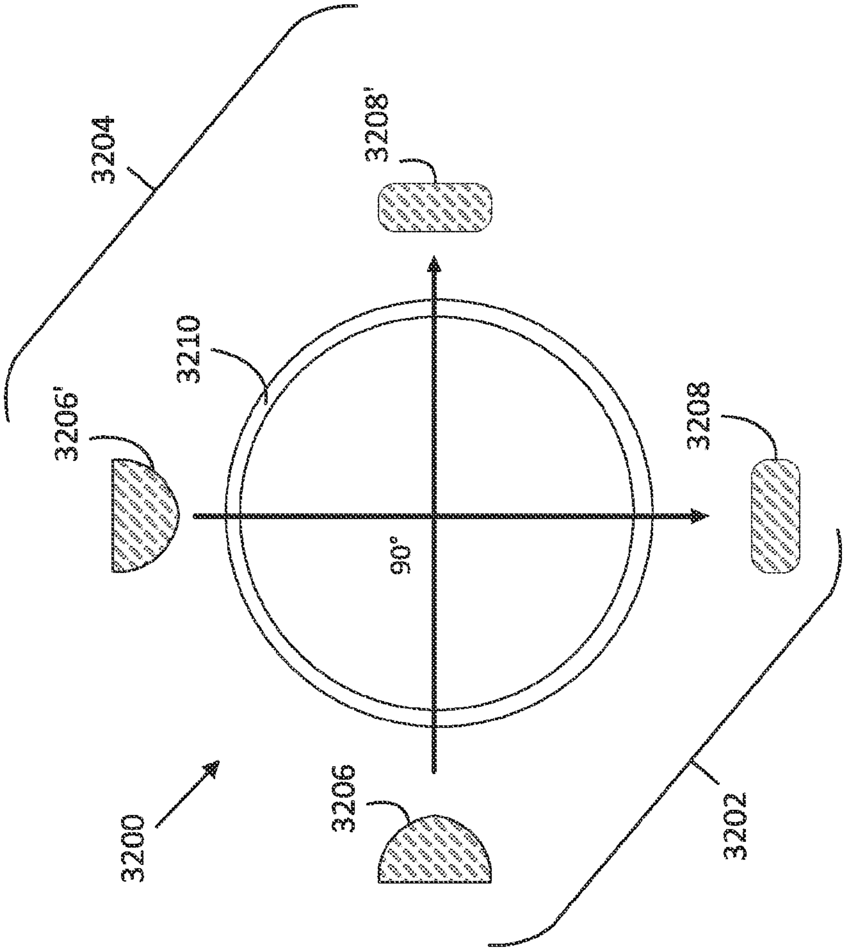
FIG. 32 schematically illustrates another example embodiment of a measurement apparatus that can mitigate errors from when the walls of the container of FIG. 23 do not have a uniform thickness around the circumference of the container.

FIG. 32 schematically illustrates another example of a measurement apparatus 3200 that can mitigate errors from when the walls of a container 3210 do not have a uniform thickness around the circumference of the container. In this example embodiment, the measurement apparatus 3200 includes a first pair 3202 of an emitter 3206 and a detector 3208, and a second pair 3204 of an emitter 3206' and a detector 3208'. The emitters 3206, 3206' and the detectors 3208, 3208' are positioned at 90 degrees of separation with respect to one another. The emitters 3206, 3206' are similar to the emitter 714, and the detectors 3208, 3208' are similar to the detector 716 of the measurement apparatus 700. For example, the emitters 3206, 3206' can emit light (e.g., infrared), and the detectors 3208, 3208' can include photodiodes that measure a voltage of the light transmitted through the container 110 from the emitters 3206, 3206' for measuring a density gradient dispensed in the container 3210.

In some examples, the first and second pairs 3202, 3204 of emitters and detectors are mounted on a carriage such as the carriage 708 shown in FIGS. 7-9. The emitters 3206, 3206' and the detectors 3208, 3208' are fixed in relationship to each other when mounted on the carriage, which allows these components to be moved up and down the rails 706 together. The motor 710 can be used to move the first and second pairs 3202, 3204 up and down the length of the container 3210 by moving the carriage along rails 706 of the measurement apparatus 700.

Figure 33:
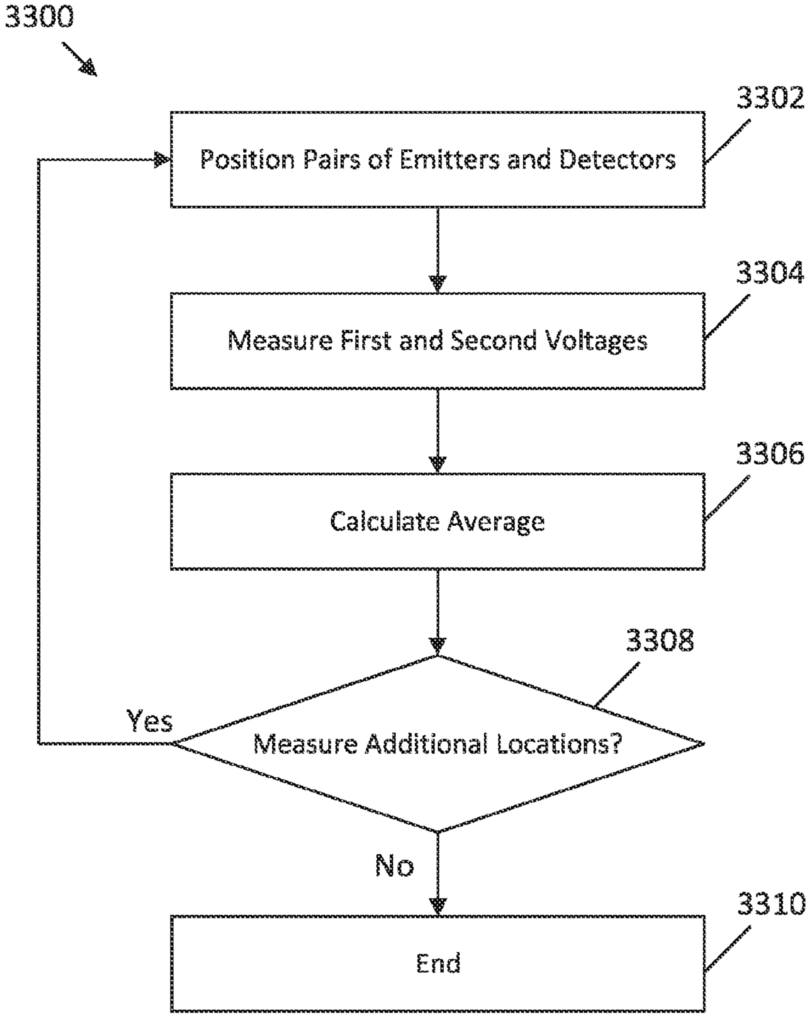
FIG. 33 schematically illustrates an example of a method of mitigating wall thickness variation around a perimeter of a container by the measurement apparatus of FIG. 32.

FIG. 33 schematically illustrates an example of a method 3300 of mitigating wall thickness variation around a perimeter of the container 3210 when measuring a density gradient dispensed in the container. In some examples, the perimeter includes a diameter or a circumference of the container 3210. In some examples, the method 3300 forms part of the operation 1112 in the method 1100. The method 3300 can be performed by the system 100.

The method 3300 includes an operation 3302 of positioning the first and second pairs 3202, 3204 at a predetermined location along the length of the container 3210. In some examples, the predetermined location is at a distal end of the container 3210. Operation 3302 can include using a motor to move the first and second pairs 3202, 3204 while the container 3210 remains fixed for positioning the first and second pairs 3202, 3204 relative to the container 3210.

Next, the method 3300 includes an operation 3304 of using the first pair 3202 to measure a first voltage from a transmission of light emitted by the emitter 3206 and received by the detector 3208, and using the second pair 3204 to measure a second voltage from a transmission of light emitted by the emitter 3206' and received by the detector 3208'. In some examples, the first and second voltages are measured simultaneously in operation 3304. In other examples, the first and second voltages are not measured simultaneously in operation 3304.

The method 3300 includes an operation 3306 of calculating an average from the first and second voltages measured in operation 3304. The wall thickness of the container 3210 may be thicker on one location, but it is less likely to also be thicker at a location that is 90-degrees apart such that an average of the first and second voltages is effective to mitigate errors on density gradient measurements that can result from wall thickness variation around a perimeter of the container 3210. Also, the container 3210 may have a blemish or scratch on one location, but it is less likely to also have a blemish or scratch at a location that is 90-degrees apart such that an average of the first and second voltages is effective to mitigate errors on density gradient measurements from blemishes, scratches, cracks, smudges, dirt, and the like.

Next, the method 3300 includes an operation 3308 of determining whether additional density gradient measurements are required along the length of the container 3210. When additional density gradients are required (i.e., "Yes" in operation 3308), the method 3300 can repeat the operations 3302-3306 for measuring a density gradient at another location along the length of the container 3210. Otherwise, when no additional density gradients are required (i.e., "No" in operation 3308), the method 3300 terminates at operation 3310.

Figure 34:
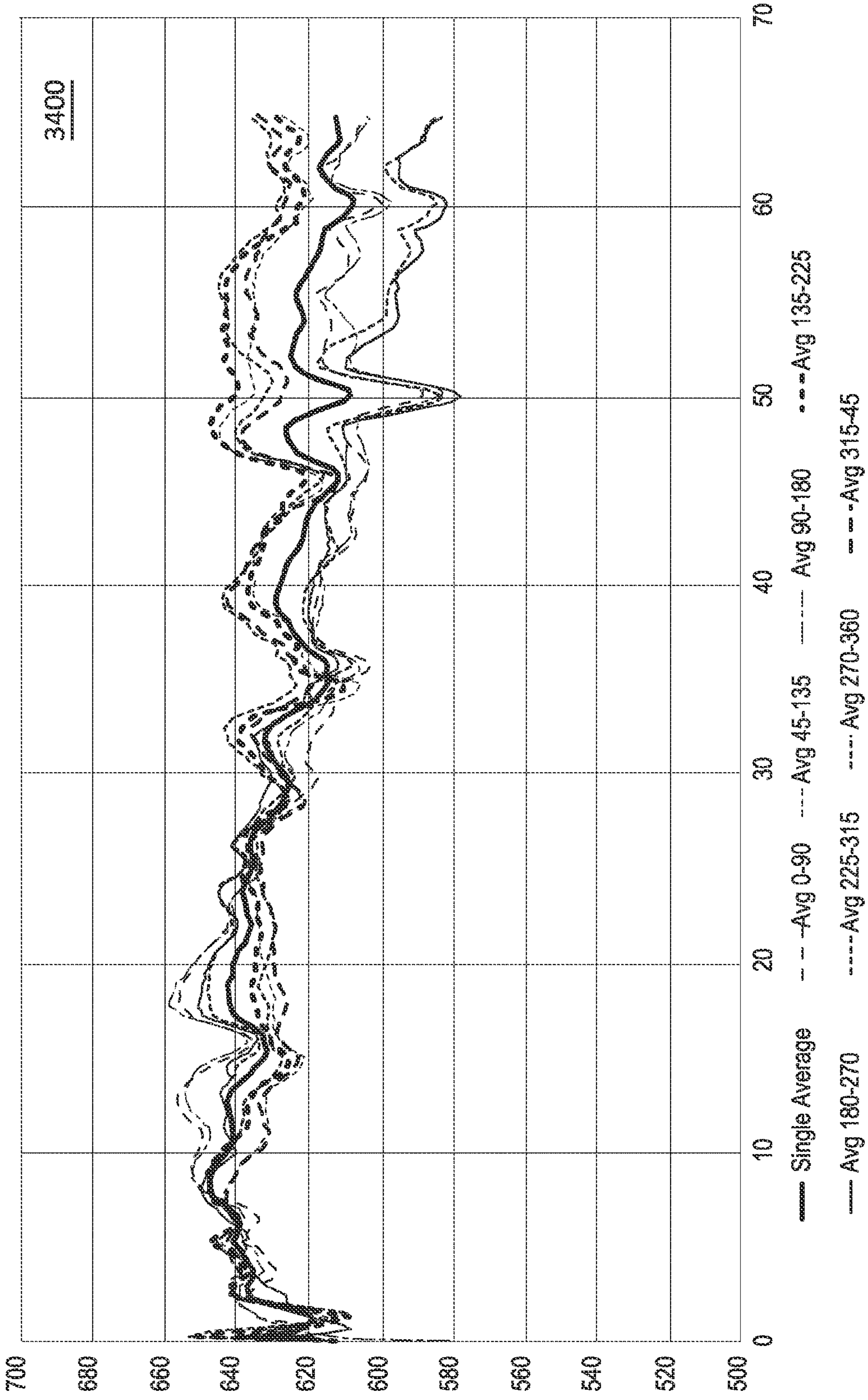
FIG. 34 graphically illustrates a chart showing mitigation of wall thickness variation around a perimeter of a container by performance of the method of FIG. 33.

FIG. 34 graphically illustrates a chart 3400 showing mitigation of wall thickness variation around a perimeter of the container 3210 by the method 3300. As discussed above, in some examples the perimeter includes a diameter or a circumference of the container 3210. The chart 3400 includes plots of voltage measurement averages (y-axis) taken at 45 degrees of rotation along the length of the container 3210 (x-axis). For example, an average voltage between the first and second pairs 3202, 3204 of the emitters 3206 and the detectors 3208 spaced apart by 90 degrees is taken at positions 0-90 degrees, 45-135 degrees, 90-180 degrees, 135-225 degrees, 180-270 degrees, 225-315 degrees, 270-360 degrees, and 315-45 degrees. In FIG. 34, the variation of the voltage measurements along the length of the container 3210 is shown as significantly reduced in the chart 3400 in comparison to the chart 3100 of FIG. 31. In some examples, the variation of the voltage measurements is reduced by about 56.6%.

Figure 35:
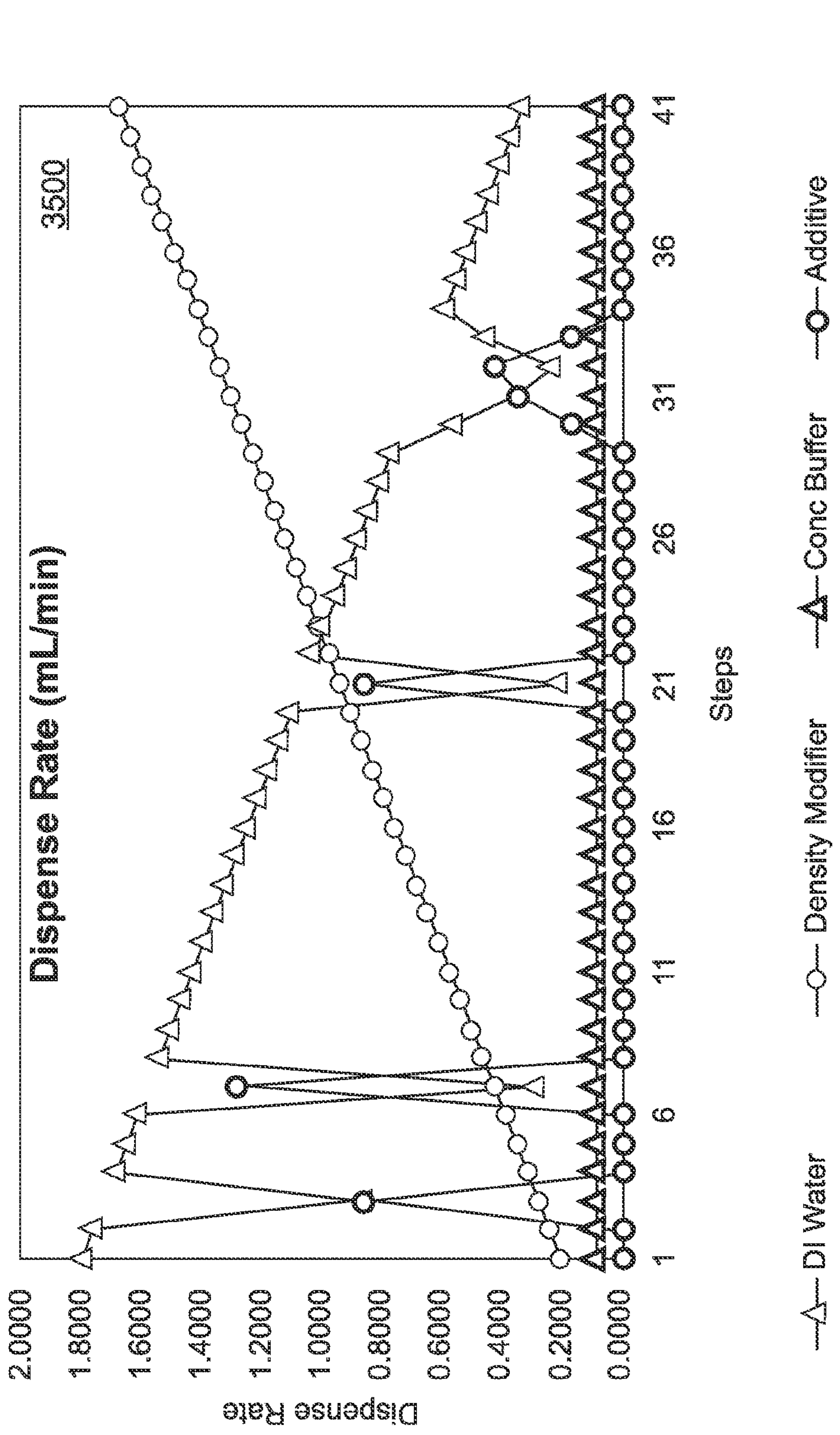
FIG. 35 graphically illustrates an example of a density gradient dispensed into the container by the system of FIG. 1.

FIG. 35 graphically illustrates an example of a density gradient 3500 dispensed into the container 110 by the system 100. The density gradient 3500 includes dispense rates (y-axis) for DI water, a density modifier, a concentrated buffer, and an additive for each step along a length of the container 110 (x-axis). In this illustrative example, the density gradient 3500 is a continuous gradient that includes 41 steps along its length, forming a 5-40% continuous gradient with a 10 mM buffer and four steps that include the additive (e.g., steps 3, 7, 21, and 30-33).

The density modifier has a concentration greater than the highest concentration of the density gradient 3500. In this illustrative example, a 50% concentration of the density modifier is used to support a 40% maximum concentration. When the dispense rate of the density modifier increases, the density of a given step in the density gradient increases. When the dispense rate of the density modifier remains constant, the densities of the steps dispensed in the container remain constant along the length of the container. When the dispense rate of the density modifier decreases, the density of a given step in the density gradient decreases.

Figure 36:
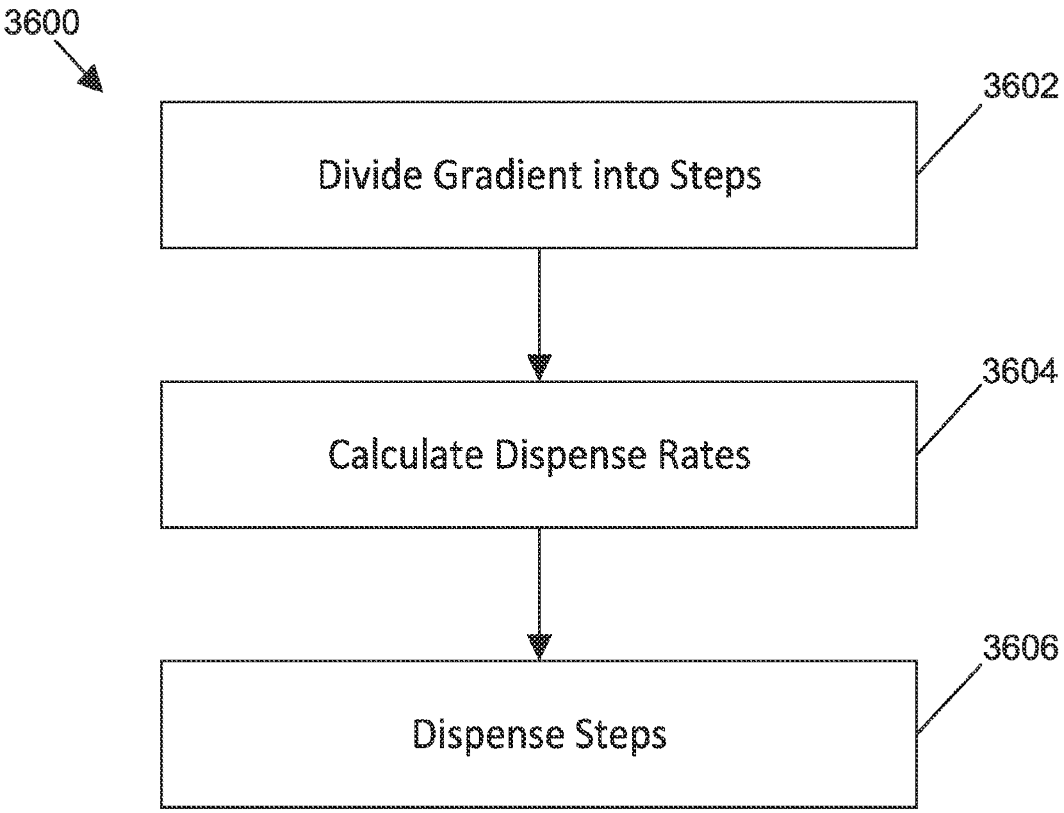
FIG. 36 schematically illustrates a method of generating the density gradient shown in FIG. 35.

FIG. 36 schematically illustrates a method 3600 of generating the density gradient 3500 shown in FIG. 35. The method 3600 includes an operation 3602 of dividing the density gradient 3500 into a number of steps. In the illustrative example shown in FIG. 35, the density gradient 3500 is a continuous gradient that is divided into 41 separate steps. The number of steps can be increased or decreased depending on a desired shape and size for density gradient.

Next, the method 3600 includes an operation 3604 of calculating dispense rates for the components in each step of the density gradient 3500. As shown in FIG. 35, the DI water and the density modifier make up a majority of the volume in each step of the density gradient 3500. The dispense rate of the DI water decreases proportionally to increases of the dispense rate of the density modifier to maintain a constant volume for each step of the density gradient 3500, and simultaneously, maintain a continuous gradient profile.

In the illustrative example shown in FIG. 35, the dispense rate of the concentrated buffer is low, and remains constant along the length of the density gradient 3500. Whenever the additive is dispensed (e.g., steps 3, 7, 21, and 30-33), the volume of the additive is subtracted from the DI water to maintain a constant volume for the steps in the density gradient 3500, and simultaneously, maintain a continuous gradient profile.

The method 3600 includes an operation 3606 of dispensing each step based on the volumes and dispense rates calculated for the components in each step in operation 3604. Operation 3606 can follow the method 500 described above, such that the distal end 112 of the probe 108 is lowered toward the bottom of the interior volume of the container 110, and successively denser steps are dispensed by the probe 108 to form the density gradient 3500.

In FIG. 35, the steps of the density gradient 3500 are dispensed from left to right along the x-axis, starting with a first step having a lightest density (e.g., a highest concentration of DI water and the lowest concentration of density modifier). The first step gets pushed up the container 110 as subsequent steps having heavier densities are dispensed into the container. The last step is the heaviest step (e.g., a lowest concentration of DI water and the highest concentration of density modifier). The density gradient 3500 is a 5-40% continuous gradient such that the first step has 5% density modifier, and the last step has 40% density modifier.

In addition to the density gradient 3500 shown in FIG. 35, which is provided by way of illustrative example, the method 3600 can be performed to generate various types of density gradients having various volumes, gradients, and/or shapes. For example, the method 3600 can be performed to generate a 10-25% density gradient, such as by dividing the gradient (operation 3602) into a fewer number of steps than the 41 steps shown for the density gradient 3500, calculating volumes and dispense rates for the components in each step (operation 3604), and dispensing the steps to form the 10-25% density gradient (operation 3606). Like in the example described above, the lightest step (i.e., 10% density modifier) is dispensed first, followed by successively denser steps, until the heaviest step is dispensed (i.e., 25% density modifier). In further examples, the method 3600 can be performed to generate more complex density gradients such as exponential gradients, s-shaped gradients, and other desired shapes.

Figure 37:
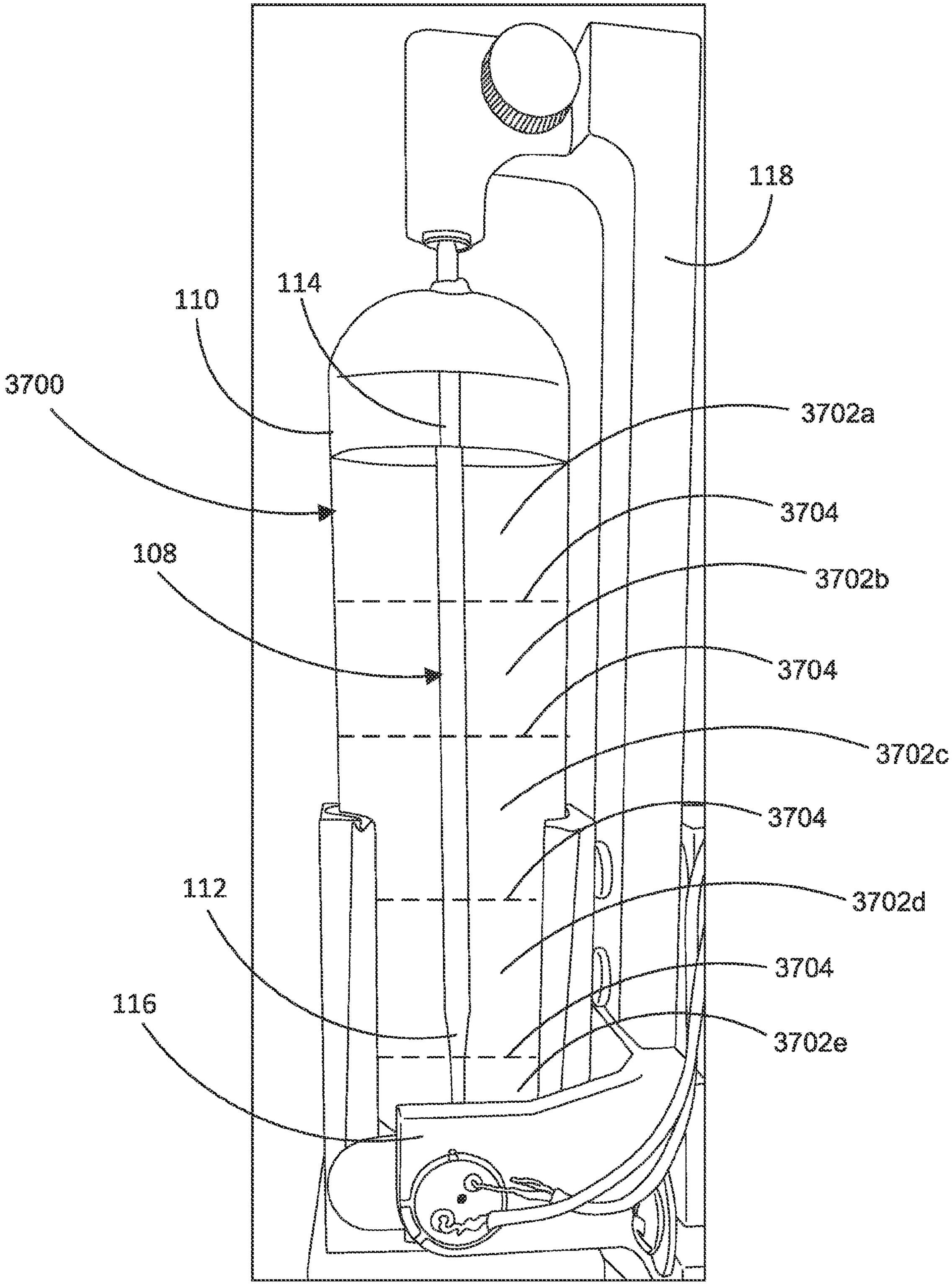
FIG. 37 illustrates an example of a density gradient dispensed into a container by the system of FIG. 1.

FIG. 37 illustrates an example of a density gradient 3700 dispensed into the container 110 by the system 100. In this illustrative example, the density gradient 3700 is a step gradient that includes five distinct steps 3702*a*-3702*e* separated by interfaces 3704. The density gradient 3700 can be formed following the operations of the method 3600. The interfaces 3704 between the steps 3702*a*-3702*e* are visible as slightly darker lines. It can be desirable for each of the steps 3702*a*-3702*e* to have uniform densities, and for the interfaces 3704 between the steps 3702*a*-3702*e* to be as narrow as possible. It can also be desirable to dispense the density gradient 3700 as quickly as possible to maximize the throughput of the system 100, while mitigating mixing between the steps 3702*a*-3702*e* in the container.

Figure 38:
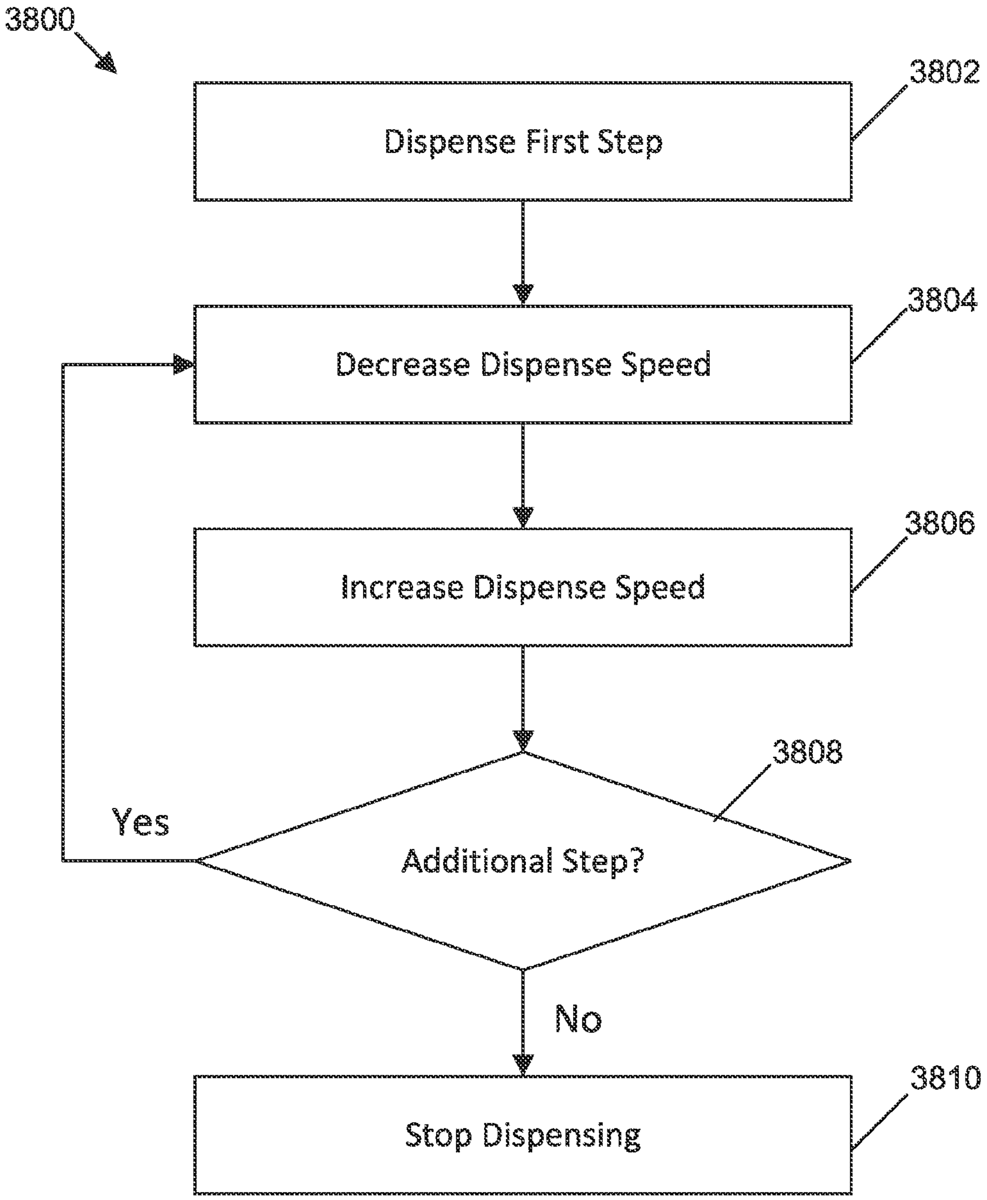
FIG. 38 schematically illustrates an example of a method of generating a density gradient, such as the density gradient shown in FIG. 37.

FIG. 38 schematically illustrates an example of a method 3800 of generating a density gradient. The system 100 can perform the method 3800 to generate a step gradient, such as the density gradient 3700 shown in FIG. 37. The method 3800 reduces the time for the system 100 to generate the density gradient 3700, while minimizing mixing at the interfaces 3704 between the steps 3702 of the gradient. In further examples, the system 100 can perform the method 3800 to generate a continuous gradient, such as the density gradient 3500 shown in FIG. 35.

Figure 39:
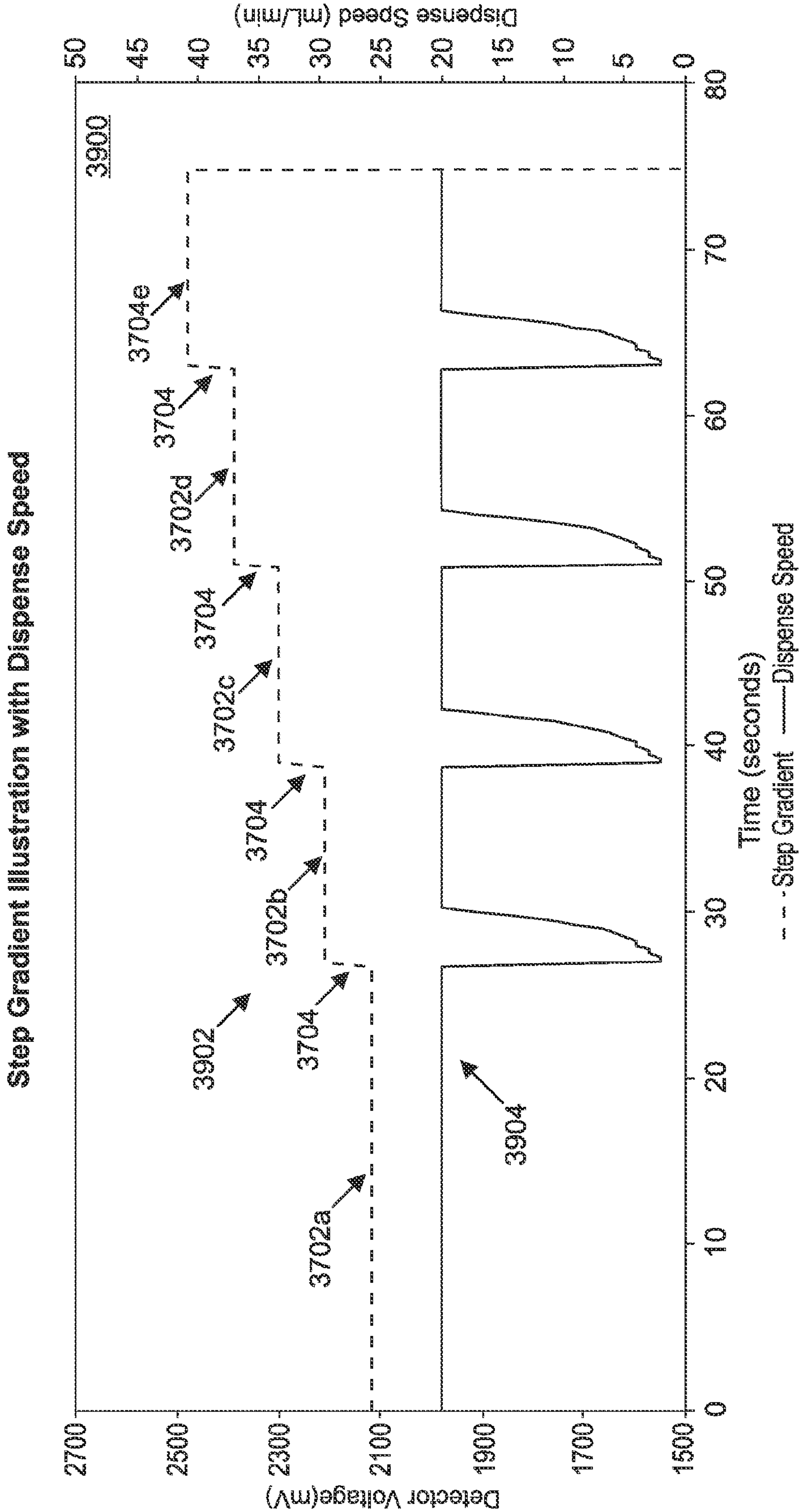
FIG. 39 graphically illustrates an example of a chart showing an implementation of the method of FIG. 38 by the system of FIG. 1.

FIG. 39 graphically illustrates an example of a chart 3900 showing an implementation of the method 3800 by the system 100. As shown in FIG. 39, the chart 3900 includes a first plot 3902 of voltage measurements (left y-axis) over time (x-axis), and a second plot 3904 of dispense speed (right y-axis) over time (x-axis) for the density gradient 3700.

Referring now to FIGS. 37-39, the method 3800 includes an operation 3802 of dispensing a first step 3702*a* for the density gradient 3700. The first step 3702*a* has a lightest density (e.g., a highest concentration of DI water and the lowest concentration of density modifier) such that the first step 3702*a* will get pushed up the container 110 when subsequent steps having heavier densities are dispensed into the container 110. As shown in FIG. 39, the first step 3702*a* is dispensed at a maximum speed until an interface 3704 with a second step 3702*b* is reached (e.g., at about a time of 27 seconds). In this illustrative example, the maximum speed is about 20 mL/minute. The first step 3702*a* is dispensed at the maximum speed because there is no risk of mixing with other steps.

The method 3800 includes an operation 3804 of decreasing the dispense speed at the interface 3704 between the first and second steps 3702*a*, 3702*b*. FIG. 39 shows the maximum speed is decreased to a minimum speed. In this illustrative example, the minimum speed is about 2 mL/minute. As shown in FIG. 39, the dispense speed exhibits a dramatic decrease at the interface 3704 between the first and second steps 3702*a*, 3702*b*. For example, the maximum speed is lowered to the minimum speed within a short period of time of about 1 second.

Next, the method 3800 includes an operation 3806 of increasing the dispense speed of the second step 3702*b* from the minimum speed until the maximum speed is reached. In the illustrative example shown in FIG. 39, the dispense speed exponentially increases until the maximum speed is reached at about 30 seconds. This is shown by the exponential curve in the second plot 3904 of FIG. 39 when dispensing the second step 3702*b*. Additional shapes for increasing the dispense speed from the minimum speed to the maximum speed are possible, such that the exponential curve shown in FIG. 39 is provided by way of illustrative example.

The adjustments of the dispense speed in operations 3804 and 3806 (e.g., decreasing the dispense speed from the maximum speed to the minimum speed, increasing the dispense speed from the minimum speed to the maximum speed) is carried out by the pumps 104 adjusting the flow rate for pumping the components from the reservoirs 102 into the manifold and mixing chamber 106. Alternative examples for adjusting the dispense speed are possible.

Next, the method 3800 includes an operation 3808 of determining whether the density gradient includes another step. When the density gradient includes another step (i.e., "Yes" in operation 3808), the method 3800 repeats the operations 3804, 3806 to dispense additional steps. In the illustrative example shown in FIGS. 37 and 39, the density gradient 3700 includes five separate steps, with interfaces 3704 occurring at about 27, 39, 51, and 63 seconds. Operations 3804, 3806 can be repeated to generate each of the steps 3702 in the density gradient 3700.

When the density gradient does not include an additional step (i.e., "No" in operation 3808), the method 3800 stops dispensing at operation 3810. The method 3800 reduces the time for generating a density gradient while also mitigating mixing between the steps of the density gradient by adjusting the dispense speed when the interfaces are created. For example, the method 3800 mitigates mixing by dispensing slowly (e.g., at the minimum speed) when starting a new step at an interface. Afterwards, by increasing the dispense speed until the maximum speed is reached, the method 3800 can reduce the overall time for dispensing the density gradient. The method 3800 allows the system 100 to generate sharp interfaces between the steps of a density gradient, while dispensing the density gradient in a minimal amount time.

As will now be described, the process of manually making a set of identical density gradients can be difficult due to there often being a large, inherent amount of variation between manually made density gradients. For example, sources of variation can include the concentrations of the mixed components, and the rate of dispensing the mixed components, which can cause day-to-day and user-to-user variations in manually made density gradients. As will now be described in more detail, the following methods and techniques can be implemented on the system 100 to replicate density gradients that closely match prior density gradients.

Figure 40:
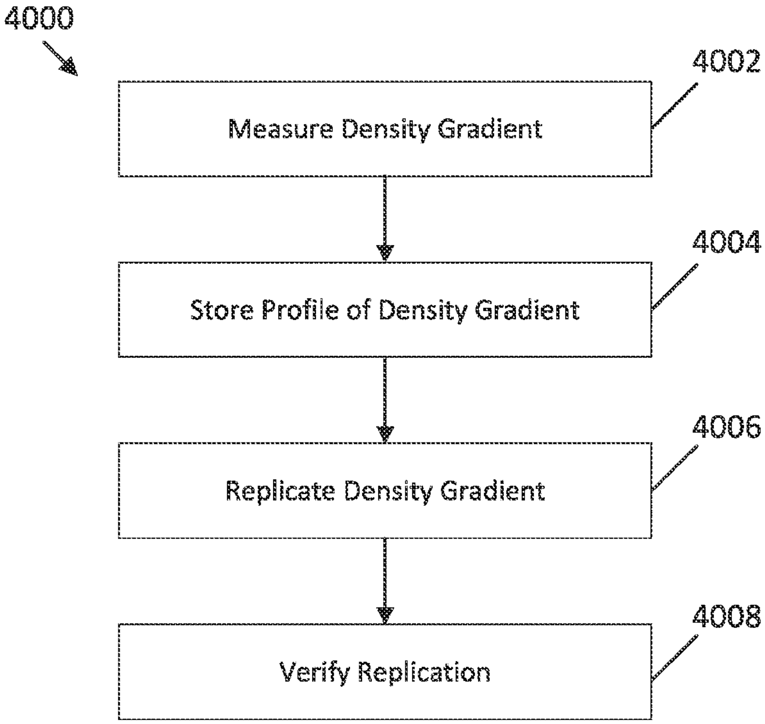
FIG. 40 schematically illustrates an example of a method of replicating a density gradient that can be performed on the system of FIG. 1.

FIG. 40 schematically illustrates an example of a method 4000 of replicating a density gradient that can be performed on the system 100. The method 4000 can be repeated to replicate as many density gradients as desired.

As shown in FIG. 40, the method 4000 includes an operation 4002 of measuring a density gradient selected for replication. In some examples, the density gradient is generated by the system 100, such as in accordance with the operations of the method 500 described above. In other examples, the density gradient is generated by another system. Additionally, the density gradient can be generated by the same user of the system 100, or by a different user.

Operation 4002 can include scanning the container 110 using the sensor assembly 712 to detect light transmission through the container for measuring a voltage that corresponds to a density. The measurements can be used to create a profile of the density gradient. The profile can include correlations between voltage measurements and positions along the length L of the container 110. As an example, the system 100 can measure voltages at about 320 points along a length of about 80 mm of the container 110 to create the profile of the density gradient.

Next, the method 4000 includes an operation 4004 of storing the profile of the density gradient on a non-volatile memory device. The profile of the density gradient can be stored on a non-volatile memory of the system 100. In other examples, the profile of the density gradient can be stored on a non-volatile memory of an external storage device. In some examples, the external storage device can include portable devices such as USB flash drives and similar data storage devices that can plug into or otherwise connect to the system 100. In further examples, the external storage device can be included on a remote server that can connect to the system 100 via a connection through a communications network 5220, such as the one shown in FIG. 52.

The profile stored in operation 4004 can be used at any time by the system 100 to replicate the density gradient. The profile of the density gradient can be stored as a "favorite" density gradient profile that can be selected for replication using the display 132 of the system 100. The system 100 can store multiple favorite density gradient profiles.

Next, the method 4000 includes an operation 4006 of replicating the density gradient. Operation 4006 includes retrieving the profile stored for the density gradient, and then controlling the pumps 104 to pump a replication of the density gradient into the container 110 based on the profile. The replication of the density gradient in operation 4006 can be performed in accordance with the operations of the method 500, described above.

The method 4000 can further include an operation 4008 of verifying the quality of the replicated density gradient from operation 4006. Operation 4008 can include measuring the replicated density gradient in a similar fashion as the measuring of the original density gradient in operation 4002. For example, operation 4008 can include measuring the replicated density gradient at the same points measured for the original density gradient. The measurements and/or profile of the replicated density gradient are compared with the measurements and/or profile of the original density gradient to determine whether they are within a predetermined tolerance.

When the measurements and/or profile are within the predetermined tolerance, the replicated density gradient is approved. Otherwise, when the measurements and/or profile are outside of the predetermined tolerance, the replicated density gradient is rejected.

In some examples, operation 4008 can further include displaying the profiles of the density gradient and the replicated density gradient side-by-side displayed on the display 132 of the system 100. This allows the user of the system 100 to view and/or confirm the similarities between the replicated density gradient and the original density gradient.

When replicating a density gradient based on a profile of a prior density gradient, the measurements used to generate the profile should be processed to remove noise that can interfere with the precision and fidelity of the replicated density gradient. For example, measurements obtained from scanning a container with a density gradient dispensed therein can include noise from optical effects that can interfere with the density calculations. This can be especially true for step density gradients that have large steps in density that cause large differences in refractive index between the steps, causing noise in the density measurements near the interfaces between the steps. The noise should be removed from the profiles of density gradients because otherwise the noise will cause errors when new density gradients are replicated based on the profiles.

Figure 41:
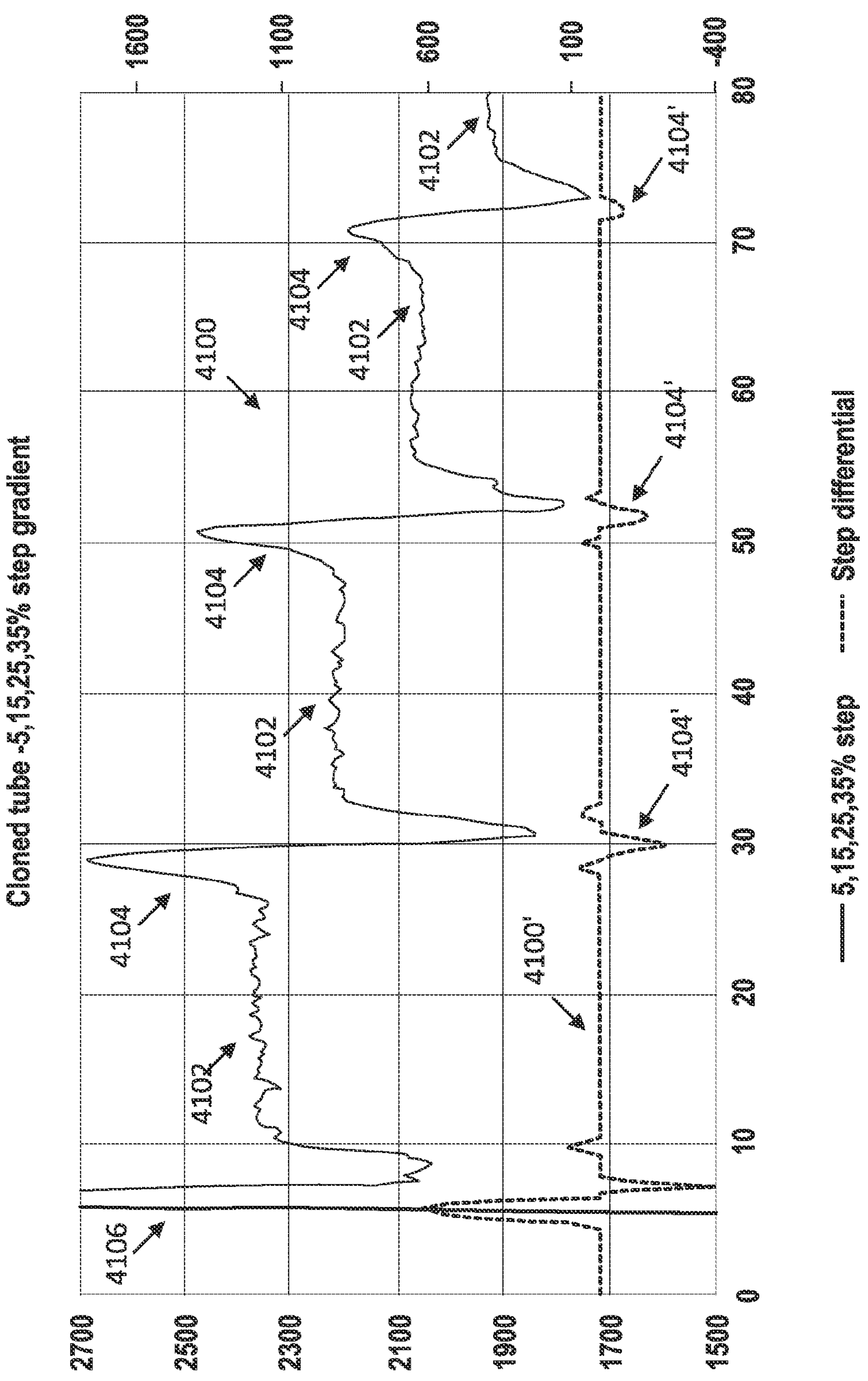
FIG. 41 graphically illustrates an example of a density gradient profile prior to being processed by the system of FIG. 1.

FIG. 41 graphically illustrates an example of a density gradient profile 4100 prior to being processed by the system 100. The density gradient profile 4100 includes noise that can potentially interfere with the replication of the density gradient profile 4100 by the system 100. In FIG. 41, the density gradient profile 4100 includes voltage measurements (y-axis) indicative of density along a length of a container (x-axis) for a step density gradient having steps of 5%, 15%, 25%, and 35% dispensed in a container having a diameter of 9/16 inches.

The flat portions 4102 in the density gradient profile 4100 represent the steps in the step density gradient. The density gradient profile 4100 further includes measurement swings 4104 near lengths of about 30 mm, 52 mm, and 73 mm, which is noise due to optical effects at the interfaces between the steps of the density gradient. The measurement swings 4104 are caused by large differences in refractive index between the steps of the density gradient.

It can be desirable to remove and/or replace the measurement swings 4104 before the density gradient profile 4100 is used to replicate the density gradient. Otherwise, the measurement swings 4104 can cause errors and loss of fidelity when the density gradient is replicated by the system 100, such as in accordance with the operations of the method 4000.

As shown in FIG. 41, the density gradient profile 4100 includes measurement values 4106 from the bottom of the container (e.g., below 10 mm). The curvature of the bottom portion 304 of the container can optically interfere with the measurements of the density gradient such that dramatic measurement swings are produced. It is further desirable to remove and/or replace the measurement values 4106 from the bottom portion 304 when replicating the density gradient.

Figure 42:
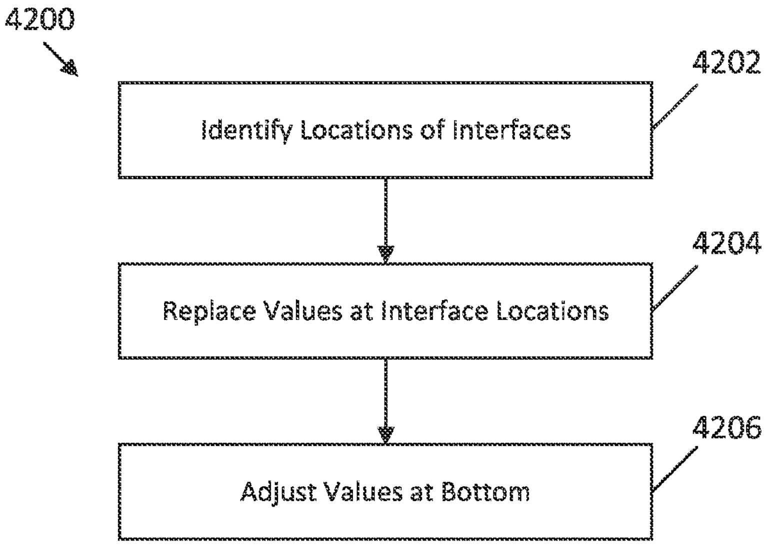
FIG. 42 schematically illustrates an example of a method of processing the density gradient profile of FIG. 41 to remove noise and defects that can interfere with replicating the density gradient profile by the system of FIG. 1.

FIG. 42 schematically illustrates an example of a method 4200 of processing the density gradient profile 4100 to remove noise and defects that can interfere with replicating the density gradient profile by the system 100. In some examples, the method 4200 forms part of the operation 4002 in the method 4000 such that the profile of the density gradient is processed in accordance with the method 4200 before it is stored in operation 4004.

The method 4200 includes an operation 4202 of identifying locations of the interfaces between the steps in the density gradient. Operation 4202 can include using mathematical differentiation techniques on the density gradient profile 4100 to produce a second plot 4100' shown in FIG. 41. The negative peaks 4104' in the second plot 4100' identify the locations of the interfaces between the steps of the density gradient. In this illustrative example, the interfaces are located at about distances of 30 mm, 52 mm, and 73 mm along the length of the container.

Next, the method 4200 includes an operation 4204 of replacing measurement values at the locations of the interfaces identified in operation 4202. Operation 4204 includes calculating a first average measurement value from a set of measurement values before the locations of the interfaces, calculating a second average measurement value from a set of measurement values after the locations of the interfaces, and replacing the measurement values at the locations of the interfaces with the first and second average measurement values.

Figure 43:
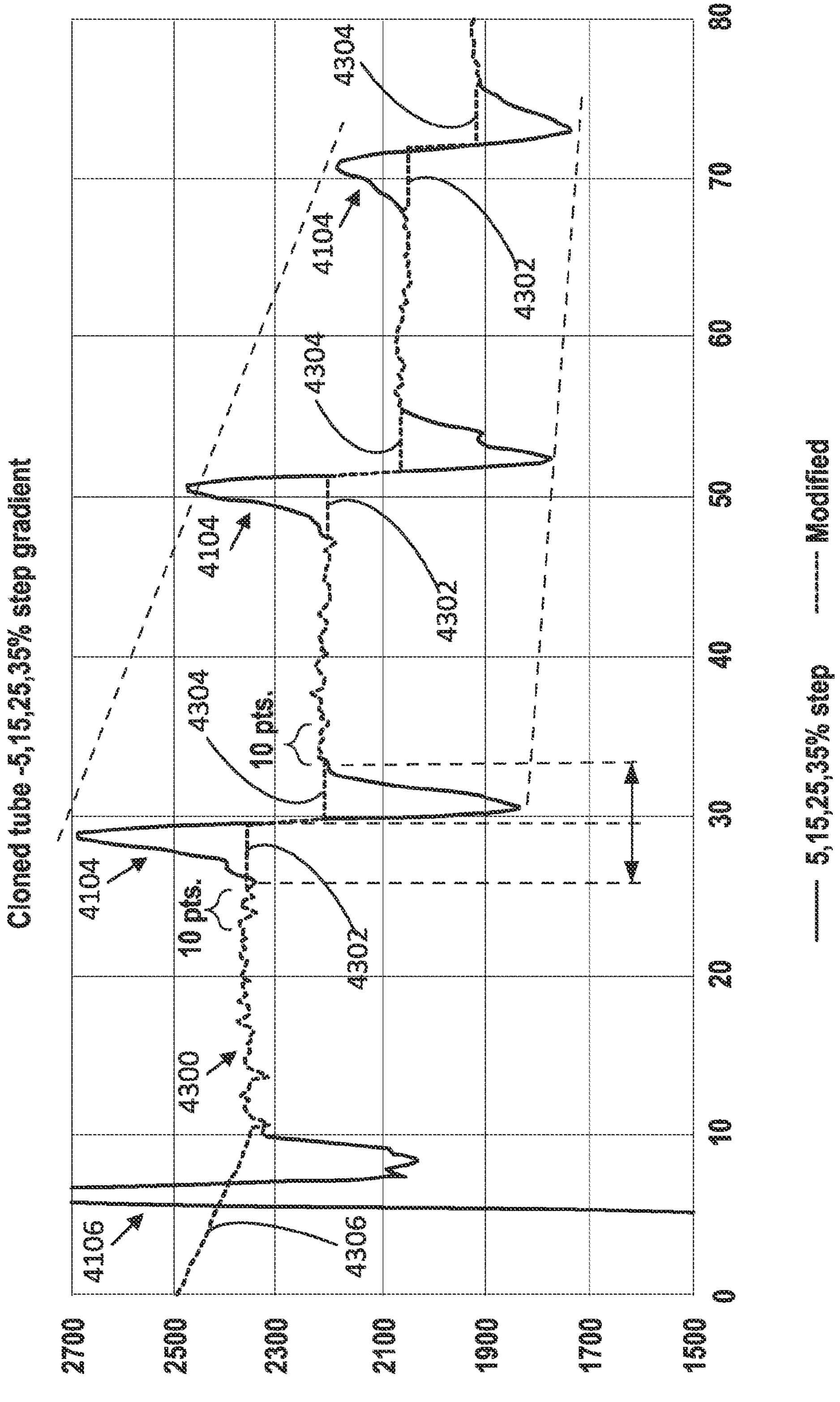
FIG. 43 graphically illustrates an example of a modified density gradient profile generated in accordance with the method of FIG. 42 for replacing the density gradient profile.

FIG. 43 graphically illustrates an example of a modified density gradient profile 4300 generated in accordance with the operations of the method 4200 for replacing the density gradient profile 4100. FIG. 43 shows the calculation of the first and second average measurement values in the operation 4204. In this illustrative example, the interfaces between the steps of the density gradient each have a total length of about 8 mm, with about 4 mm belonging to a prior step, and with about 4 mm belonging to a next step. The first average measurement value is calculated from a set of 10 measurement values before the start of each interface, and the second average measurement value is calculated from a set of 10 measurement values after each interface. In other examples, the first and second average measurement values can be calculated from more or fewer than 10 measurement values before and after each interface.

As shown in FIG. 43, the measurement swings 4104 are each replaced with a first area 4302 that is based on the first average measurement value, and with a second area 4304 that is based on the second average measurement value. By replacing the measurement swings 4104 with the first and second areas 4302, 4304, the modified density gradient profile 4300 is smoother than the density gradient profile 4100 because the measurement swings 4104 detected at the interfaces between the steps of the step density gradient are eliminated. This can improve the precision and fidelity of replicating the step density gradient by the system 100.

Referring back to FIG. 42, the method 4200 can further includes an operation 4206 of adjusting the measurement values 4106 at the bottom of the container (e.g., below 10 mm), which is where the bottom portion of the container produces dramatic measurement swings in the density gradient profile 4100. The modified density gradient profile 4300 replaces the measurement values 4106 with a linear ramp 4306 of increasing density dispensed below 10 mm. This can provide a cushion of very heavy density material for dispensing at the bottom of the container. The linear ramp 4306 prevents the creation of a sharp interface at the bottom of the container, which can improve the replication of the step density gradient by the system 100.

Figure 44:
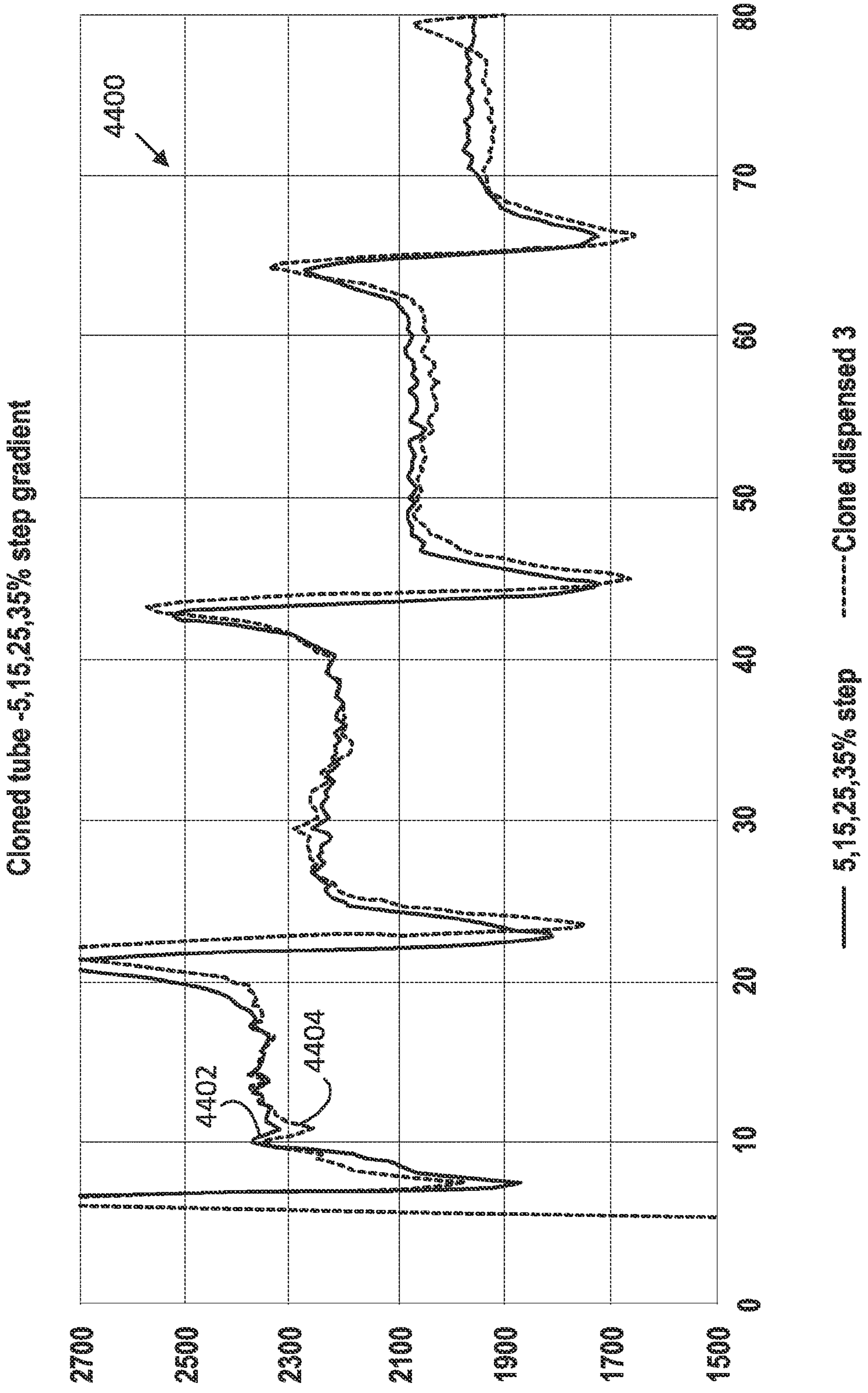
FIG. 44 graphically illustrates an example of a chart showing a comparison of a first density gradient and a second density gradient that is replicated from the first density gradient by the system of FIG. 1.

FIG. 44 graphically illustrates an example of a chart 4400 showing a comparison of a first density gradient 4402, and a second density gradient 4404 that is replicated from the first density gradient by the system 100. In this illustrative example, the first and second density gradients 4402, 4404 are closely aligned with one another, such that the second density gradient 4404 has good fidelity with respect to the first density gradient 4402.

Figure 45:
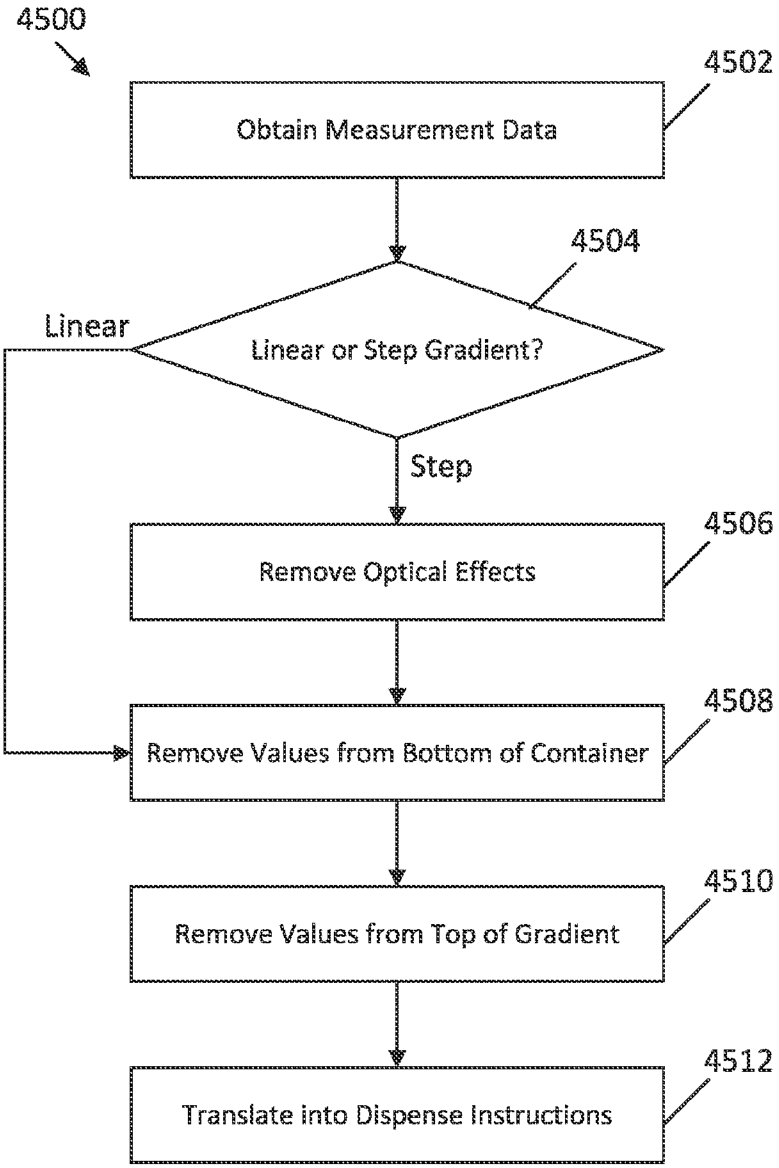
FIG. 45 schematically illustrates another example of a method of processing a density gradient profile for replication by the system of FIG. 1.

FIG. 45 schematically illustrates another example of a method 4500 of processing a density gradient profile for replication by the system 100. The method 4500 includes an operation 4502 of obtaining the density gradient profile. The density gradient profile includes voltage measurements that can be detected by a sensor of the system 100 that scans a container in which the density gradient is dispensed. The sensor can scan the container from bottom to top or top to bottom in one pass. The voltage measurements correlate with density.

As an example, the density gradient profile can include voltage measurements that are detected for every 0.25 mm of length of the container. In some examples, the density gradient profile includes about 320 voltage measurements along the length of the container.

The method 4500 includes an operation 4504 of determining whether the density gradient profile is from a step density gradient or a linear density gradient. The determination can be based on characteristics of the voltage measurements in the density gradient profile obtained in operation 4502. For example, the voltage measurements can indicate a linear density gradient when the voltage measurements incrementally decrease in small amounts along the length of the container. As another example, the voltage measurements can indicate a step density gradient when the voltage measurements remain constant and then decrease by a large amount.

When the density gradient is determined by a linear density gradient (i.e., "linear" in operation 4504), the method 4500 can skip certain processing operations and proceed to an operation 4508, described in more detail below. When the density gradient is determined by a step density gradient (i.e., "step" in operation 4504), the method 4500 proceeds to an operation 4506 of removing optical anomalies that can occur due to large changes in refractive index caused by the different densities at the interfaces between the steps of the step density gradient. In some examples, the optical anomalies removed in operation 4506 include Gouy phase shifts.

Figure 46:
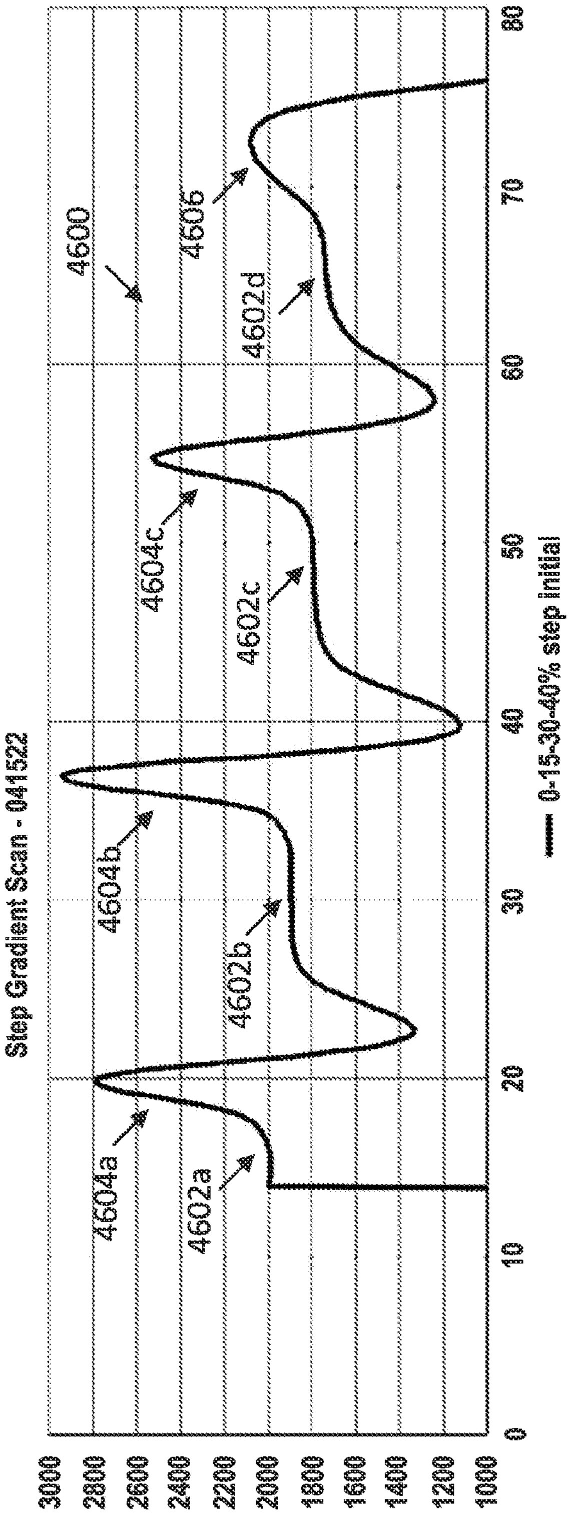
FIG. 46 graphically illustrates an example of a density gradient profile prior to being processed by the method of FIG. 45.

FIG. 46 graphically illustrates an example of a density gradient profile 4600 prior to being processed by the method 4500. The density gradient profile 4600 includes voltage measurements (y-axis) measured across a length of a container (x-axis) having a density gradient dispensed therein. The bottom of the container is on the left side of the density gradient profile 4600 (e.g., 0 mm), and the top of the container is on the right side of the density gradient profile 4600 (e.g., 80 mm). In this illustrative example, the density gradient profile 4600 is for a step density gradient having steps of 0%, 15%, 30%, and 40% of a sucrose density modifier.

In FIG. 46, the density gradient profile 4600 starts at a length of about 14 mm of the container, and ends at a length of about 76 mm. The density gradient profile 4600 includes a first step 4602*a* (e.g., 40% sucrose) that is short because most of the first step 4602*a* is in the bottom of the container, which is removed from the profile. In this example, the first step 4602*a* has a constant voltage measurement of about 2000 mV, representing a level of 40% sucrose.

The density gradient profile 4600 exhibits a large measurement swing at an interface 4604*a* starting at a length of about 16 mm and ending at a length of about 25 mm. The large measurement swing is a Gouy phase shift at the interface 4604*a* between the first and second steps 4602*a*, 4602*b*, due to these steps having different densities that create a fringe effect that affects the transmission of light through the step density gradient.

The second step 4602*b* (e.g., 30% sucrose) of the density gradient profile 4600 starts at a length of about 25 mm and ends at a length of about 34 mm. In this illustrative example, the second step 4602*b* has a constant voltage measurement of about 1890 mV, representing a level of 30% sucrose. The steps 4602 and the interfaces 4604 alternate in the density gradient profile 4600 along the length of the container, until a meniscus 4606 of the density gradient is reached.

In operation 4506, optical anomalies such as Gouy phase shifts are removed. In some examples, the Gouy phase shifts are removed using similar operations as the ones in the method 4200, described above. For example, the Gouy phase shifts can be removed by determining the locations of the interfaces 4604 on the density gradient profile 4600. This can be accomplished by using mathematical differentiation techniques on the density gradient profile 4600.

Figure 47:
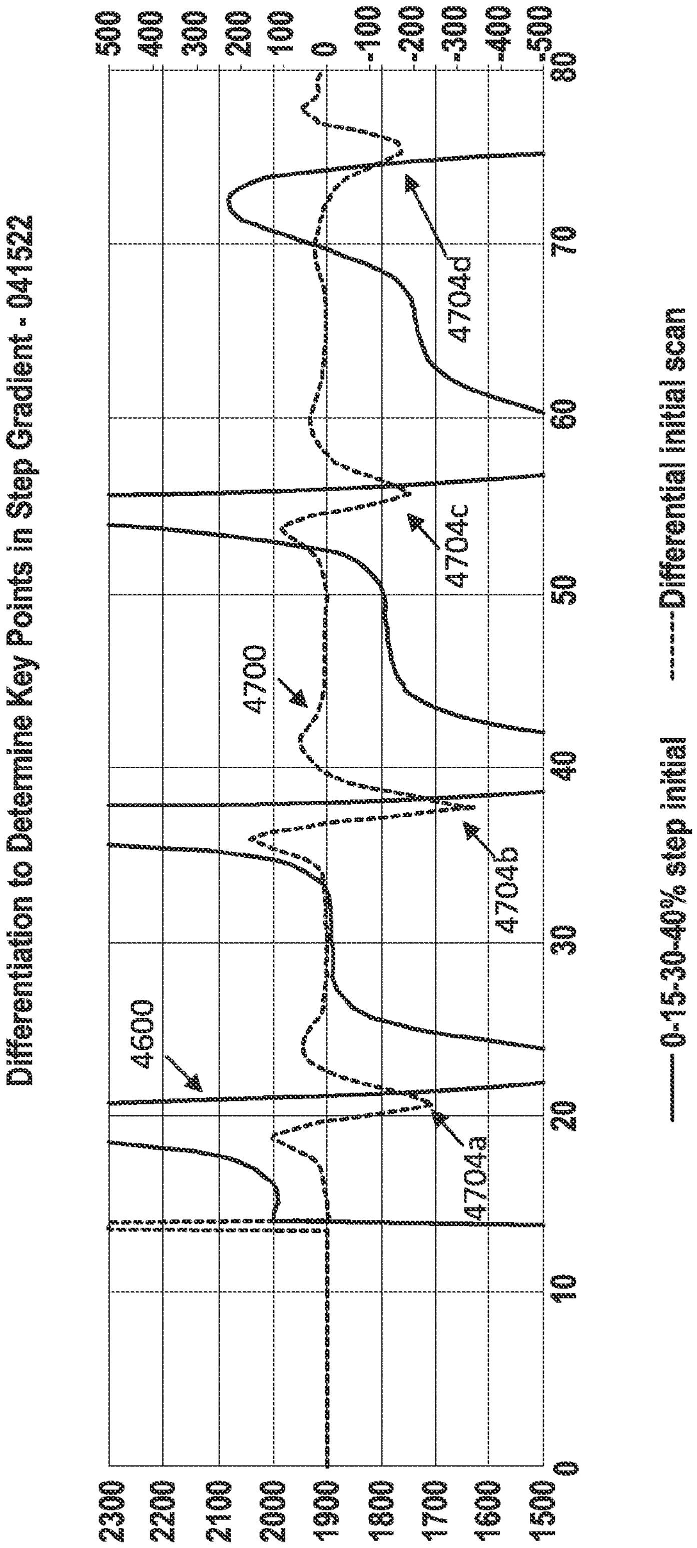
FIG. 47 graphically illustrates an example of a differential plot after the density gradient profile of FIG. 46 is mathematically differentiated.

FIG. 47 graphically illustrates an example of a differential plot 4700 after the density gradient profile 4600 is mathematically differentiated. In this illustrative example, the negative peaks 4704*a*-4740*c* at distances of about 21 mm, 38 mm, and 56 mm identify locations of the interfaces 4604 between the steps 4602 of the density gradient, while the negative peak 4704*d* identifies a location of the meniscus 4606 of the density gradient.

Figure 48:
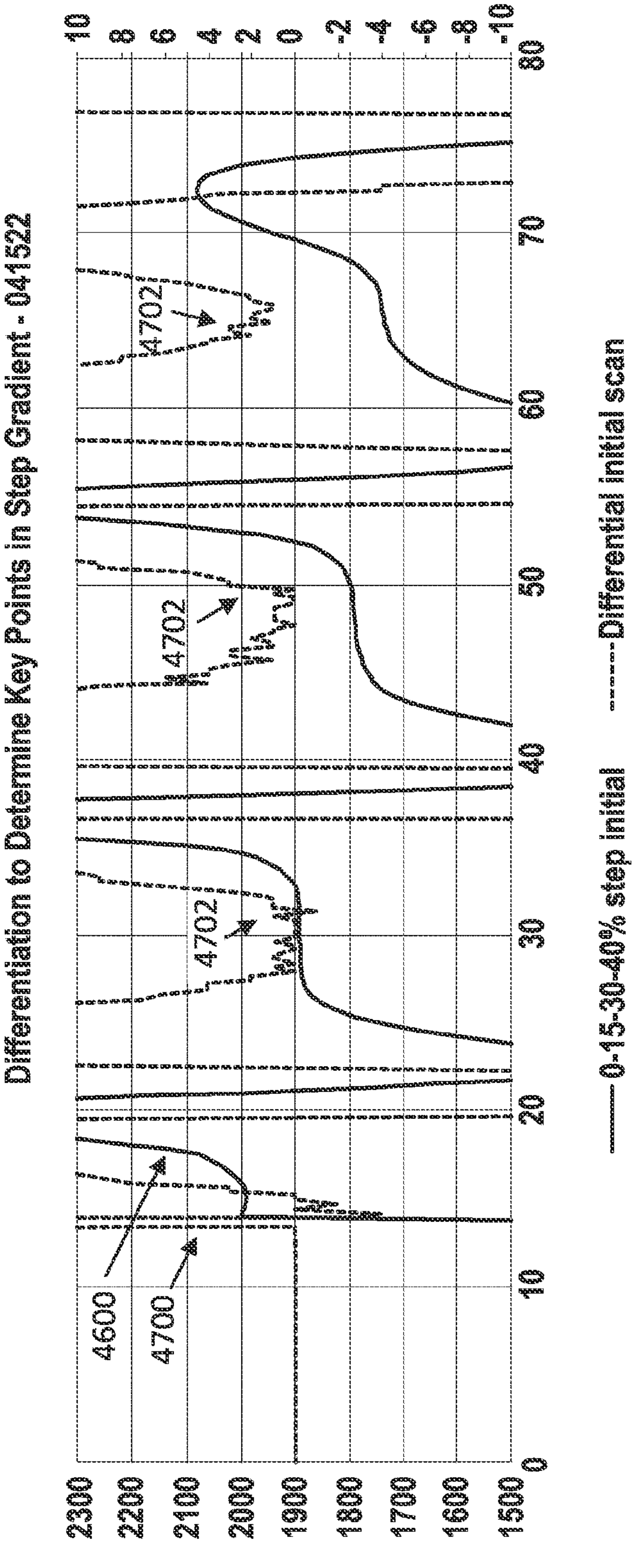
FIG. 48 is a zoomed-in view of the differential plot of FIG. 47.

FIG. 48 is a zoomed-in view of the differential plot 4700. In operation 4506, the measurement values influenced by the Gouy phase shifts at the interfaces 4604 are replaced by values 4702 determined from the differential plot 4700. For example, a measurement value having a differential of zero or a positive minimum, such that it is the flattest point on a particular step, can be selected for use across the entire step including replacing the measurement values influenced by the Gouy phase shifts at the interfaces 4604. Negative slope values should not be used. In further examples, the first and second average measurement values calculated in the method 4200 (see the modified density gradient profile 4300 of FIG. 43) can be used to replace the measurement values influenced by the Gouy phase shifts at the interfaces 4604.

Figure 49:
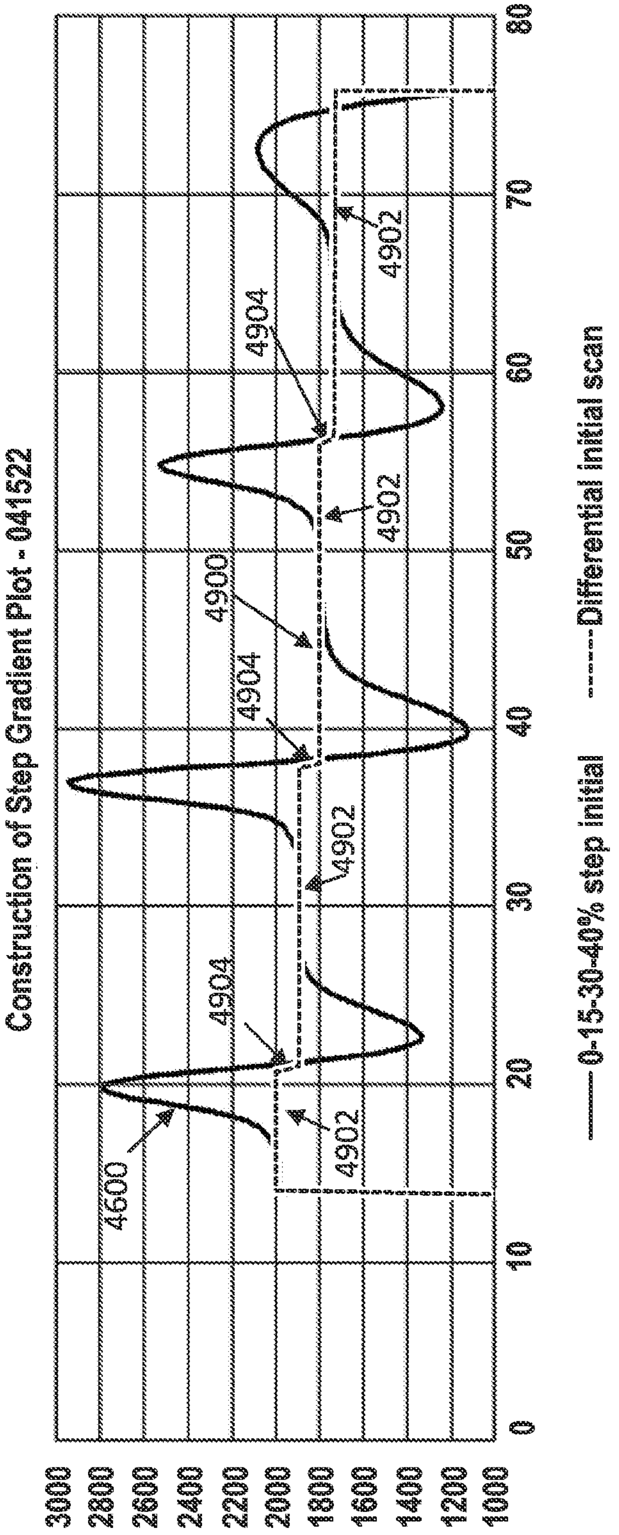
FIG. 49 graphically illustrates an example of a comparison of the density gradient profile of FIG. 46 with an adjusted density gradient profile after measurement values influenced by optical effects such as Gouy phase shifts are replaced by values determined from the differential plot of FIG. 47.
Figure 50:
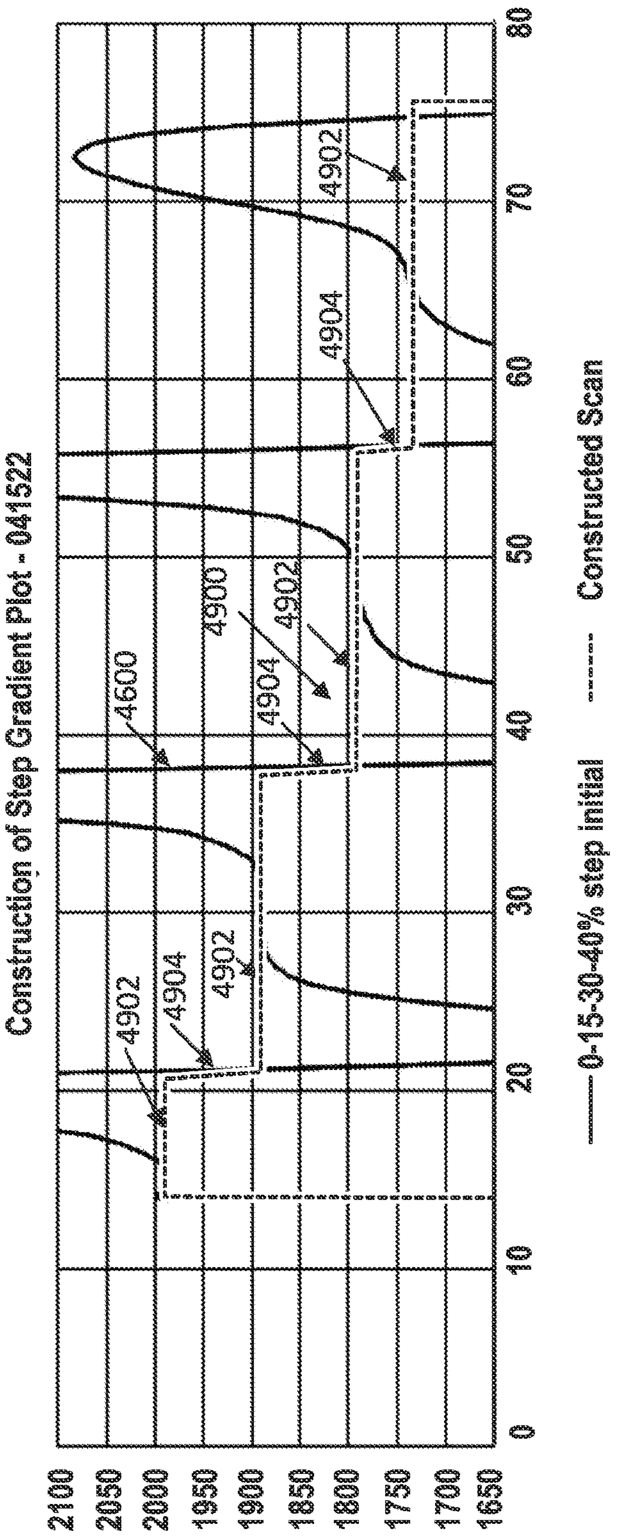
FIG. 50 is a zoomed-in view of the adjusted density gradient profile of FIG. 49.

FIG. 49 graphically illustrates an example of a comparison of the density gradient profile 4600 of FIG. 46 with an adjusted density gradient profile 4900 after the measurement values influenced by optical effects such as Gouy phase shifts are replaced by values determined from the differential plot 4700. FIG. 50 is a zoomed-in view of the adjusted density gradient profile 4900. As shown in FIGS. 49 and 50, the adjusted density gradient profile 4900 has sharp interfaces 4904 between the steps 4902, such that the optical effects from the Gouy phase shifts are removed from the adjusted density gradient profile 4900.

Referring back to FIG. 45, the method 4500 includes an operation 4508 of removing and/or replacing measurement values obtained from the bottom of the container. As described above, the curvature on the bottom portion of the container can interfere with the transmission of light for measuring the density gradient. The measurement values from the bottom portion are not useful because they can include large measurement swings in the density gradient profile. As an example, measurement values from lengths below 14 mm of the container are removed in operation 4508. This is shown on the left side of the adjusted density gradient profile 4900.

In some examples, the measurement values from the bottom of the container are replaced with values that are heavier than or equal to the heaviest density below 14 mm of the container length. In some examples, the measurement values from the bottom of the container are replaced with the linear ramp 4306 of increasing density, as shown in FIG. 43.

Next, the method 4500 includes an operation 4510 of removing and/or replacing the measurement values where the meniscus 4606 is located. As described above, the location of the meniscus 4606 can be identified using the differential plot 4700 shown in FIG. 47. For example, the negative peak that is furthest to the right (i.e., negative peak 4704*d*) identifies the location of the meniscus 4606 of the density gradient. Like the interfaces 4604 between the steps 4602 of the density gradient profile 4600, the meniscus 4606 can cause optical effects due to a large change in refractive index caused by a difference in density between the last step of the density gradient (i.e., step 4602*d*), and the volume of air above the density gradient in the container. In some examples, the optical properties of the meniscus 4606 can also cause a Gouy phase shift. The removal and/or replacement of the measurement values where the meniscus 4606 is located is shown on the left side of the adjusted density gradient profile 4900 of FIGS. 49 and 50.

Still referring to FIG. 45, the method 4500 can further include an operation 4512 of translating the adjusted density gradient profile 4900 shown in FIGS. 49 and 50 into computer readable dispense instructions that are usable by the system 100 to replicate the density gradient. Operation 4512 is performed regardless of whether the density gradient is a linear or step gradient. In some examples, the computer readable dispense instructions from the adjusted density gradient profile 4900 is stored in a text file.

FIG. 51 shows an example of a text file 5100 that is executable by a processing device of the system 100 to dispense a density gradient into the container 110. As an example, the text file 5100 is a text translation of the adjusted density gradient profile 4900 shown in FIGS. 49 and 50. In this illustrative example, the text file 5100 includes a first column 5102 of positions along the length L of the container 110 (e.g., the x-axis in FIGS. 49 and 50). In this example, the positions along the length L of the container range from 80 mm to 0 mm. The text file 5100 includes a second column 5104 of voltage values (e.g., the y-axis in FIGS. 49 and 50).

The voltage values in the second column 5104 are representative of a refractive index that corresponds with a density of a mixture of the components from the reservoirs 102*a*-102*d*. The system 100 can use the text file 5100 to calculate the dispense rates for the DI water and density modifier (e.g., 40% sucrose) based on the voltage values in the second column 5104 for each position in the first column 5102 along the length L of the container 110. The system 100 independently controls the pumps 104*a*-104*d* to control the dispense rates of the components into the container 110, with the least dense step dispensed first, followed by successively denser steps. This is shown on the right side of the adjusted density gradient profile 4900 of FIGS. 49 and 50, where the least dense step is shown. When the text file 5100 is executed by the system 100, a density gradient is generated by the system 100 as a clone of an original density gradient.

Figure 52:
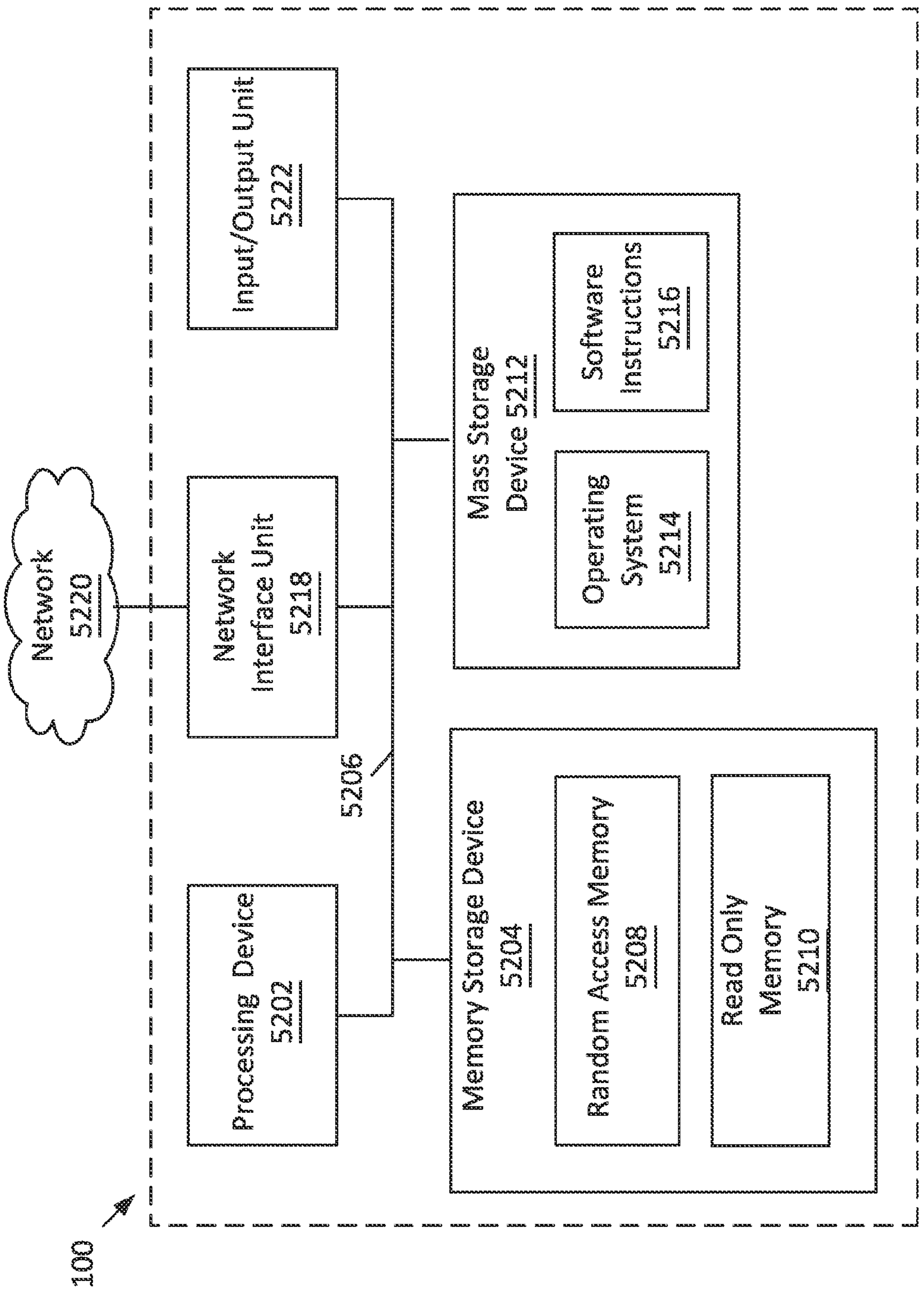
FIG. 52 illustrates example computing hardware of the system of FIG. 1.

FIG. 52 schematically illustrates an example of computing hardware of the system 100 for implementing aspects of the present disclosure. The computing hardware includes a processing circuitry having a memory for storing instructions which, when executed by the processing circuitry, cause the processing circuitry to perform the functions described herein.

As shown in the example provided in FIG. 52, the system 100 includes one or more processing devices 5202, a memory storage device 5204, and a system bus 5206 that couples the memory storage device 5204 to the one or more processing devices 5202. The one or more processing devices 5202 can include central processing units (CPU).

As further shown in FIG. 52, the memory storage device 5204 can include a random-access memory ("RAM") 5208 and a read-only memory ("ROM") 5210. Basic input and output logic having basic routines that help to transfer information between elements within the system 100, such as during startup, can be stored in the ROM 5210.

The system 100 can also include a mass storage device 5212 that can include an operating system 5214 and store software instructions 5216 and data. The mass storage device 5212 is connected to the processing device 5202 through the system bus 5206. The mass storage device 5212 and associated computer-readable data storage media provide non-volatile, non-transitory storage for the system 100.

Although the description of computer-readable data storage media contained herein refers to the mass storage device 5212, it should be appreciated by those skilled in the art that computer-readable data storage media can be any available non-transitory, physical device or article of manufacture from which the system 100 can read data and/or instructions. The computer-readable storage media can be comprised of entirely non-transitory media. The mass storage device 5212 is an example of a computer-readable storage device.

Computer-readable data storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid-state memory technology, or any other medium which can be used to store information, and which can be accessed by the device.

The system 100 can operate in a networked environment using logical connections to the other devices through the communications network 5220. The system 100 connects to the communications network 5220 through a network interface unit 5218 connected to the system bus 5206. The network interface unit 5218 can connect to additional types of communications networks and devices, including through Bluetooth, Wi-Fi, and cellular telecommunications networks including 4G and 5G networks. The network interface unit 5218 can connect the system 100 to additional networks, systems, and devices. The system 100 also includes an input/output unit 5222 for receiving and processing inputs and outputs from peripheral devices.

The mass storage device 5212 and the RAM 5208 can store software instructions and data. The software instructions can include an operating system 5214 for operating the system 100. The mass storage device 5212 and/or the RAM 5208 can also store software instructions 5216, which when executed by the processing device 5202, provide the functionality of the system 100 discussed herein. The mass storage device 5212 and/or the RAM 5208 can store the profile of the density gradient measured by the measurement apparatus 700, as described above.

The various embodiments described above are provided by way of illustration only and should not be construed to be limiting in any way. Various modifications can be made to the embodiments described above without departing from the true spirit and scope of the disclosure.

Embodiments of the disclosure can be described with reference to the following numbered clauses, with preferred features laid out in the dependent clauses:

1. A system for non-destructively measuring a density gradient of components for use in centrifugation, the system comprising:
   - a measurement apparatus including:
     - a sensor assembly;
     - a motor coupled to the sensor assembly; and
   - a processing circuitry having a memory for storing instructions which, when executed by the processing circuitry, cause the processing circuitry to:
     - move the sensor assembly along a length of the density gradient of components using the motor;
     - obtain measurements from the sensor assembly while the sensor assembly is moved along the length of the density gradient of components; and generate a profile of the density gradient of components based on the measurements.

2. The system of clause 1, wherein the instructions, when executed by the processing circuitry, further cause the processing circuitry to:

adjust the profile by removing measurements from a bottom portion of a container in which the density gradient of components is contained.

3. The system of clause 1, wherein the instructions, when executed by the processing circuitry, further cause the processing circuitry to:

identify a location of a meniscus of the density gradient of components; and adjust the profile to remove measurements from the location of the meniscus.

4. The system of clause 3, wherein the location of the meniscus is identified by identifying a first derivative minimum of the measurements.

5. The system of clause 1, wherein the instructions, when executed by the processing circuitry, further cause the processing circuitry to:

standardize the measurements based on at least one of a material and a size of a container in which the density gradient of components is contained.

6. The system of clause 5, wherein the instructions, when executed by the processing circuitry, further cause the processing circuitry to:

obtain measurements from the sensor assembly along a length of the container before the density gradient of components is dispensed therein;

compare the measurements from the container before the density gradient of components is dispensed therein with expected measurement ranges for containers of predetermined materials and sizes; and determine at least one of the material and the size of the container based on the comparison with the expected measurement ranges.

7. The system of clause 1, wherein the instructions, when executed by the processing circuitry, further cause the processing circuitry to:

mitigate effects on the profile of the density gradient caused by defects and wall thickness variation on a container in which the density gradient of components is contained.

8. The system of clause 7, wherein the instructions, when executed by the processing circuitry, further cause the processing circuitry to:

obtain measurements from the sensor assembly along a length of the container when empty;

calculate an average of the measurements along the length of the container when empty;

generate differential values between the average of the measurements and the measurements along the length of the container when empty; and adjust the profile of the density gradient of components by adding the differential values.

9. The system of clause 1, wherein the instructions, when executed by the processing circuitry, further cause the processing circuitry to:

mitigate positioning errors on the profile of the density gradient of components caused by misalignment of a container in which the density gradient of components is dispensed.

10. The system of clause 9, wherein the instructions, when executed by the processing circuitry, further cause the processing circuitry to:

generate a centerline for the container; and move the sensor assembly in at least two dimensions along the centerline of the container to obtain the measurements used to generate the profile of the density gradient of components.

11. The system of clause 10, wherein the instructions, when executed by the processing circuitry, further cause the processing circuitry to:

position the sensor assembly near a proximal end of the container;

scan a cross-section of the container near the proximal end;

determine a first location of the centerline near the proximal end of the container;

position the sensor assembly near a distal end of the container;

scan the diameter of the container near the distal end;

determine a second location of the centerline near the distal end of the container; and generate the centerline for the container by linearly connecting the first location of the centerline near the proximal end to the second location of the centerline near the distal end.

12. The system of clause 1, wherein the sensor assembly includes a first pair of emitter and detector mounted on a carriage, and a second pair of emitter and detector mounted on the carriage, the first and second pairs having 90-degrees of separation on the carriage.

13. The system of clause 12, wherein the instructions, when executed by the processing circuitry, further cause the processing circuitry to:

position the first and second pairs of emitter and detector at a location along a length of a container in which the density gradient of components is dispensed using the motor to move the carriage;

obtain a first measurement with the first pair of emitter and detector;

obtain a second measurement with the second pair of emitter and detector;

calculate an average measurement from the first and second measurements; and generate the profile of the density gradient of components using the average measurement to mitigate errors from wall thickness variation around a perimeter of the container.

14. The system of clause 1, wherein the sensor assembly includes:

an emitter emitting an illumination signal, and a detector measuring an intensity of the illumination signal after transmission through the density gradient of components.

15. The system of clause 1, wherein the instructions, when executed by the processing circuitry, further cause the processing circuitry to:

obtain multiple measurements at each point along the length of the density gradient of components, and the profile of the density gradient of components is generated using an average of the multiple measurements calculated for each point along the length of the density gradient of components.

16. The system of clause 1, wherein the profile is generated for a step density gradient of components or a continuous density gradient of components.

17. A system for measuring a density gradient of components for use in centrifugation dispensed in a container, the system comprising:

a processing circuitry having memory for storing instructions which, when executed by the processing circuitry, cause the processing circuitry to:
obtain measurements at points along a length of the density gradient of components;
generate a profile of the density gradient of components based on the measurements; and
store the profile of the density gradient of components.

18. The system of clause 17, wherein the instructions, when executed by the processing circuitry, further cause the processing circuitry to:
adjust the profile by removing measurements from a bottom portion of the container.

19. The system of clause 17, wherein the instructions, when executed by the processing circuitry, further cause the processing circuitry to:
identify a location of a meniscus of the density gradient of components; and
adjust the profile to remove measurements from the location of the meniscus.

20. The system of clause 19, wherein the location of the meniscus is identified by identifying a first derivative minimum of the measurements.

21. The system of clause 17, wherein the instructions, when executed by the processing circuitry, further cause the processing circuitry to:
obtain measurements from the container before the density gradient of components is dispensed therein;
compare the measurements from the container with expected measurement ranges for containers of predetermined materials and sizes;
determine at least one of a material and a size of the container based on the comparison with the expected measurement ranges; and
standardize the measurements for at least one of the material and the size of the container.

22. The system of clause 17, wherein the instructions, when executed by the processing circuitry, further cause the processing circuitry to:
obtain measurements from the sensor assembly along a length of the container when empty;
calculate an average of the measurements along the length of the container when empty;
generate differential values between the average of the measurements and the measurements along the length of the container when empty; and
adjust the profile of the density gradient of components by adding the differential values to mitigate effects caused by defects and wall thickness variation on the container.

23. The system of clause 17, wherein the instructions, when executed by the processing circuitry, further cause the processing circuitry to:
generate a centerline for the container; and
obtain the measurements in at least two dimensions along the centerline of the container to mitigate position errors of the container on the profile generated for the density gradient of components.

24. The system of clause 17, wherein multiple measurements are obtained at each point along the length of the density gradient of components, and averages of the multiple measurements calculated for each point along the length of the density gradient of components are used to generate the profile.

25. The system of clause 17, wherein the profile is generated for a step density gradient of components or a continuous density gradient of components.

26. A method for non-destructively measuring a density gradient of components, the method comprising:
obtaining measurements at points along a length of the density gradient of components;
generating a profile of the density gradient of components based on the measurements; and
storing the profile of the density gradient of components.

27. The method of clause 26, further comprising:
adjusting the profile by removing measurements from a bottom portion of a container in which the density gradient of components is contained.

28. The method of clause 26, further comprising:
identifying a location of a meniscus of the density gradient of components; and adjusting the profile to remove measurements from the location of the meniscus.

29. The method of clause 28, wherein the location of the meniscus is identified by identifying a first derivative minimum of the measurements.

30. The method of clause 26, further comprising:
obtaining measurements from a container before the density gradient of components is dispensed therein;
comparing the measurements from the container with expected measurement ranges for containers of predetermined materials and sizes;
determining at least one of a material and a size of the container based on the comparison with the expected measurement ranges; and
standardizing the measurements for at least one of the material and the size of the container.

31. The method of clause 26, further comprising:
obtaining measurements along a length of a container when empty;
calculating an average of the measurements along the length of the container when empty;
generating differential values between the average of the measurements and the measurements along the length of the container when empty; and
adjusting the profile of the density gradient of components by adding the differential values to mitigate effects caused by defects and wall thickness variation on the container.

32. The method of clause 26, further comprising:
generating a centerline for a container in which the density gradient of components is dispensed therein; and
obtaining the measurements in at least two dimensions along the centerline of the container to mitigate position errors of the container on the profile generated for the density gradient of components.

33. The method of clause 26, further comprising:
obtaining multiple measurements for each of the points along the length of the density gradient of components; and
generating the profile of the density gradient of components using an average of the multiple measurements for each of the points along the length of the density gradient of components.

34. The method of clause 26, wherein the profile is generated for a step density gradient of components or a continuous density gradient of components.

35. A system for automatically dispensing a density gradient of components for use in centrifugation, the system comprising:
a processing circuitry having a memory for storing instructions which, when executed by the processing circuitry, cause the processing circuitry to:
insert a distal end of a probe into a container;

pump separate components into a mixing chamber connected to a proximal end of the probe, the mixing chamber generating a mixture of the separate components;

dispense a plurality of steps into the container, each step of the plurality of steps having a density based on relative concentrations of the separate components in the mixture generated by the mixing chamber, and each step of the plurality of steps pushing a previously dispensed step away from the distal end of the probe; and remove the probe from the container without disturbing the plurality of steps.

36. The system of clause 35, wherein the separate components include deionized water, a density modifier, a buffer solution, and additives.

37. The system of clause 36, wherein the instructions, when executed by the processing circuitry, further cause the processing circuitry to:

calculate a dispense rate for each of the separate components in each step of the plurality of steps, the dispense rate determining the relative concentrations of the separate components in the mixture generated by the mixing chamber.

38. The system of clause 37, wherein the successively higher densities result from increasing a dispense rate of the density modifier.

39. The system of clause 38, wherein a dispense rate of the deionized water decreases proportionally to increasing the dispense rate of the density modifier.

40. The system of clause 37, wherein a dispense rate of the additive is subtracted from a dispense rate of the deionized water.

41. The system of clause 40, wherein the additive is dispensed in a fewer number of steps than the plurality of steps in the density gradient of components.

42. The system of clause 37, wherein a dispense rate of the buffer solution remains constant.

43. The system of clause 37, wherein the instructions, when executed by the processing circuitry, further cause the processing circuitry to:

independently control one or more pumps for adjusting the dispense rate of each of the separate components pumped into the mixing chamber.

44. The system of clause 35, wherein the instructions, when executed by the processing circuitry, further cause the processing circuitry to:

dispense a first step of the plurality of steps at a maximum dispense speed; and adjust a dispense speed for each step of the plurality of steps following the first step.

45. The system of clause 44, wherein adjusting the dispense speed includes decreasing the dispense speed from the maximum dispense speed to a minimum dispense speed, and then increasing the dispense speed from the minimum dispense speed to the maximum dispense speed.

46. The system of clause 45, wherein the dispense speed increases exponentially from the minimum dispense speed until the maximum dispense speed is reached.

47. The system of clause 35, wherein the mixing chamber includes a static mixer.

48. A system for dispensing a density gradient of components for use in centrifugation, the system comprising:

a processing circuitry having a memory for storing instructions which, when executed by the processing circuitry, cause the processing circuitry to:

insert a distal end of a probe into a container;

dispense a first step of a plurality of steps into the container, the first step being dispensed at a maximum dispense speed;

dispense additional steps of the plurality of steps into the container, each additional step being dispensed starting at a minimum dispense speed, and then increasing from the minimum dispense speed to the maximum dispense speed, each additional step of the plurality of steps having a density higher than densities of previously dispensed steps of the plurality of steps causing the previously dispensed steps of the plurality of steps to move away from the distal end of the probe; and remove the probe from the container without disturbing the plurality of steps.

49. The system of clause 48, wherein a dispense speed for each additional step increases exponentially from the minimum dispense speed until the maximum dispense speed is reached.

50. The system of clause 48, wherein each step of the plurality of steps includes a mixture of components including deionized water, a density modifier, a buffer solution, and additives.

51. The system of clause 50, wherein the instructions, when executed by the processing circuitry, further cause the processing circuitry to:

calculate a dispense rate for each of the components in each step of the plurality of steps, the dispense rate determining a concentration for each of the components in each step.

52. The system of clause 50, wherein the density of each step of the plurality of steps is based on a dispense rate of the density modifier.

53. The system of clause 50, wherein a dispense rate of the deionized water decreases proportionally to increasing a dispense rate of the density modifier.

54. The system of clause 50, wherein a dispense rate of the additive is subtracted from a dispense rate of the deionized water.

55. The system of clause 54, wherein the additive is dispensed in a fewer number of steps than the plurality of steps in the density gradient of components.

56. The system of clause 50, wherein a dispense rate of the buffer solution remains constant.

57. The system of clause 50, wherein the instructions, when executed by the processing circuitry, further cause the processing circuitry to:

independently control one or more pumps for adjusting the dispense rate of each of the components pumped into a mixing chamber for mixing the components together.

58. A method for automatically dispensing a density gradient of components for use in centrifugation, the method comprising:

inserting a distal end of a probe into a container;

dispensing a first step of a plurality of steps into the container, the first step being dispensed at a maximum dispense speed;

dispensing additional steps of the plurality of steps into the container, each additional step being dispensed starting at a minimum dispense speed, and then increasing from the minimum dispense speed to the maximum dispense speed, each additional step of the plurality of steps having a density higher than densities of previously dispensed steps of the plurality of steps causing the previously dispensed steps to move away from the distal end of the probe; and removing the probe from the container without disturbing the plurality of steps.

59. The method of clause 58, further comprising:

increasing the dispense speed for each additional step exponentially from the minimum dispense speed until the maximum dispense speed is reached.

60. The method of clause 58, further comprising:

mixing components including deionized water, a density modifier, a buffer solution, and additives for generating each step of the plurality of steps.

61. The method of clause 60, further comprising:

calculating a dispense rate for mixing each of the components, the dispense rate determining a concentration for each of the components in each step of the plurality of steps.

62. The method of clause 61, wherein the density of each step of the plurality of steps is based on a dispense rate of the density modifier.

63. The method of clause 61, further comprising:

decreasing a dispense rate of the deionized water proportionally to increasing a dispense rate of the density modifier.

64. The method of clause 61, further comprising:

subtracting a dispense rate of the additive from a dispense rate of the deionized water.

65. The method of clause 64, further comprising:

dispensing the additive in a fewer number of steps than the plurality of steps.

66. The method of clause 61, wherein a dispense rate of the buffer solution remains constant.

67. The method of clause 61, further comprising:

independently controlling one or more pumps for adjusting the dispense rate of each of the components pumped into a mixing chamber for mixing the components together.

68. A method of replicating a density gradient of components, the method comprising:

creating a first profile by obtaining measurement values of the density gradient of components dispensed in a first container;

creating a second profile by replacing measurement values of the first profile;

storing the second profile; and replicating the density gradient of components in a second container based on the second profile.

69. The method of clause 68, further comprising:

replacing the measurement values at an interface between a first step and a second step with a first average value from the first step before the interface, and with a second average value from the second step after the interface.

70. The method of clause 68, further comprising:

replacing the measurement values at an interface between a first step and a second step with a first measurement value having a zero or minimum positive differential from the first step before the interface, and with a second measurement value having a zero or minimum positive differential from the second step after the interface.

71. The method of clause 68, further comprising:

replacing the measurement values from the bottom portion of the first container with a linear ramp of the measurement values.

72. The method of clause 68, further comprising:

verifying a quality of the density gradient of components replicated in the second container by:

measuring the density gradient of components replicated in the second container; and determining whether differences between the density gradient of components replicated in the second container and the density gradient of components contained in the first container are within a predetermined tolerance.

73. The method of clause 68, further comprising:

processing the first profile of the density gradient of components by translating the first profile into a text file that includes positions along a length and corresponding measurement values.

74. A system for replicating a density gradient of components for use in centrifugation, the system comprising:

a first density gradient of components;

a sensor assembly;

a dispensing probe;

a processing circuitry having a memory for storing instructions which, when executed by the processing circuitry, cause the processing circuitry to:

obtain measurement values of the first density gradient of components contained in a first container with the sensor assembly;

store a first profile of the measurement values in the memory;

create a second profile based on the stored first profile; and replicate the first density gradient of components by dispensing with the dispensing probe into a second container a second density gradient of components based on the second profile.

75. The system of clause 74, wherein the instructions, when executed by the processing circuitry, further cause the processing circuitry to:

verify a quality of the second density gradient of components by determining whether differences between the second density gradient of components and the first density gradient of components are within a predetermined tolerance.

76. The system of clause 74, wherein the instructions, when executed by the processing circuitry, further cause the processing circuitry to:

create the second profile by replacing measurement values at interfaces between steps of the first profile.

77. The system of clause 76, wherein the measurement values at an interface between a first step and a second step are replaced with a first average value from the first step before the interface, and with a second average value from the second step after the interface.

78. The system of clause 76, wherein the measurement values at an interface between a first step and a second step are replaced with a measurement value having a zero or minimum positive differential from the first step before the interface, and with a measurement value having a zero or minimum positive differential from the second step after the interface.

79. The system of clause 74, wherein the instructions, when executed by the processing circuitry, further cause the processing circuitry to:

create the second profile by removing measurement values from a bottom portion of the first container.

80. The system of clause 74, wherein the instructions, when executed by the processing circuitry, further cause the processing circuitry to:

create the second profile by replacing measurement values from a bottom portion of the first container.

81. The system of clause 74, wherein the measurement values from the bottom portion of the first container are replaced with a linear ramp of the measurement values.

82. The system of clause 74, wherein the instructions, when executed by the processing circuitry, further cause the processing circuitry to:

create the second profile by removing measurement values from a location of a meniscus of the first density gradient of components.

83. The system of clause 74, wherein the instructions, when executed by the processing circuitry, further cause the processing circuitry to:

create the second profile by translating the first profile into a text file, the text file including positions along a length and corresponding measurement values.

84. A system for replicating a density gradient of components for use in centrifugation, the system comprising:

a processing circuitry having a memory for storing instructions which, when executed by the processing circuitry, cause the processing circuitry to:

obtain measurement values of the density gradient of components dispensed in a first container, the density gradient of components including a meniscus;

process the measurement values by:

replacing the measurement values at interfaces between steps of the density gradient of components;

replacing the measurement values from a location of a bottom portion of the first container; and replacing measurement values based on a location of the meniscus of the density gradient of components dispensed in the first container;

store a profile of the density gradient of components based on the processed measurement values; and use the profile to replicate the density gradient of components in a second container.

85. The system of clause 84, wherein the instructions, when executed by the processing circuitry, further cause the processing circuitry to:

replace the measurement values at an interface between a first step and a second step with a first average value from the first step before the interface, and with a second average value from the second step after the interface.

86. The system of clause 84, wherein the instructions, when executed by the processing circuitry, further cause the processing circuitry to:

replace the measurement values at an interface between a first step and a second step with a measurement value having a zero or minimum positive differential from the first step before the interface, and with a measurement value having a zero or minimum positive differential from the second step after the interface.

87. The system of clause 84, wherein the instructions, when executed by the processing circuitry, further cause the processing circuitry to:

replace the measurement values from the bottom portion of the first container with a linear ramp of the measurement values.

88. The system of clause 84, wherein the instructions, when executed by the processing circuitry, further cause the processing circuitry to:

verify a quality of the density gradient of components replicated in the second container by:

measuring the density gradient of components replicated in the second container; and determining whether differences between the density gradient of components replicated in the second container and the density gradient of components dispensed in the first container are within a predetermined tolerance.

89. The system of clause 84, wherein the instructions, when executed by the processing circuitry, further cause the processing circuitry to:

process the profile of the density gradient of components by translating the profile into a text file that includes positions along a length and corresponding measurement values.

What is claimed is:

1. A system for automatically dispensing a density gradient of a mixture including two or more components, the system comprising:

a processing circuitry having a memory for storing instructions which, when executed by the processing circuitry, cause the processing circuitry to control:

insertion of a distal end of a probe into a container;

separate pumping of two or more components into a mixing chamber connected to a proximal end of the probe, such that the mixing chamber generates a mixture by mixing the two or more components;

dispensing of a first liquid volume into the container at a first dispense speed;

dispensing of a plurality of sequentially dispensed liquid volumes defining a density gradient into the container at a second dispense speed, wherein each sequentially dispensed liquid volume has a density determined by relative concentrations of the two or more components in the mixture generated by the mixing chamber, and displaces, via dispensing of a subsequent liquid volume, an antecedent liquid volume away from the distal end of the probe; and removing the distal end of the probe from the container without substantially mixing adjacent liquid volumes of the density gradient.

2. The system of claim 1, wherein the two or more components comprise deionized water, a density modifier, a buffer solution, and an additive.

3. The system of claim 2, wherein the instructions, when executed by the processing circuitry, further cause the processing circuitry to:

calculate a dispense rate for each component of the two or more components in each sequentially dispensed volume such that the dispense rate defines the relative concentrations of the two or more components in the mixture generated by the mixing chamber.

4. The system of claim 3, wherein the instructions, when executed by the processing circuitry, further cause the processing circuitry to control a dispense rate of the density modifier such that successively higher densities of the density modifier are obtained in each sequentially dispensed liquid volume.

5. The system of claim 4, wherein the instructions, when executed by the processing circuitry, further cause the processing circuitry to control decreasing a dispense rate of deionized water in accordance with a predetermined relationship to increasing the dispense rate of the density modifier.

6. The system of claim 3, wherein the instructions, when executed by the processing circuitry, further cause the processing circuitry to control a dispense rate of the additive such that the dispense rate of the additive is reduced relative to a dispense rate of the deionized water.

7. The system of claim 3, further comprising two or more pumps for the separate pumping of two or more components into the mixing chamber.

8. The system of claim 1, wherein, for each of the plurality of sequentially dispensed liquid volumes, adjusting a dispense speed includes decreasing the dispense speed from the first dispense speed to the second dispense speed, and subsequently, increasing the dispense speed from the second dispense speed to the first dispense speed wherein the first dispense speed is higher than the second dispense speed.

9. The system of claim 1, further comprising:

a measurement apparatus including:

a sensor assembly;

a motor coupled to the sensor assembly; and wherein the instructions, when executed by the processing circuitry, further cause the processing circuitry to control:

the motor to move the sensor assembly along a length of the density gradient of components;

the sensor assembly to obtain a plurality of measurements while the sensor assembly moves along the length of the density gradient of components; and generate a profile of the density gradient of components based on the plurality of measurements.

10. The system of claim 1, wherein the instructions, when executed by the processing circuitry, further cause the processing circuitry to:

create a first profile by obtaining measurement values of the density gradient of components dispensed in the container;

create a second profile by replacing measurement values of the first profile;

store the second profile; and replicate the density gradient of components in a second container based on the second profile.

11. A method of automatically dispensing a density gradient of a mixture including two or more components, the method comprising:

inserting a distal end of a probe into a container;

dispensing a first liquid volume into the container, the at a first dispense speed;

dispensing, after dispensing the first liquid volume into the container, a plurality of sequentially dispensed liquid volumes into the container at a second dispense speed, and increasing from the second dispense speed to the first dispense speed, each sequentially dispensed liquid volume having a density higher compared to an immediately previously dispensed liquid volume and displacing, via dispensing of a subsequent sequentially dispensed liquid volume, an antecedent volume away from the distal end of the probe; and removing the probe from the container without substantially mixing adjacent liquid volumes of the density gradient.

12. The method of claim 11, further comprising:

increasing the dispense speed for each subsequent sequentially dispensed liquid volume from the second dispense speed in accordance with a predefined non-linear function until the first dispense speed is reached.

13. The method of claim 11, further comprising:

calculating a dispense rate for mixing each component of the two or more components, the dispense rate defining a concentration for each component of the two or more components in each sequentially dispensed liquid volume of the plurality of sequentially dispensed liquid volumes.

14. The method of claim 13, wherein the two or more components comprise a density modifier and the density of each sequentially dispensed liquid volume corresponds to a dispense rate of the density modifier.

15. The method of claim 13, wherein the two or more components comprise deionized water and a density modifier, the method further comprising:

increasing a dispense rate of a density modifier; and decreasing a dispense rate of deionized water by a predetermined relationship to the increasing of the dispense rate of the density modifier.

16. The method of claim 13, wherein the two or more components comprise deionized water and an additive, the method further comprising:

reducing a dispense rate of the additive relative to a dispense rate of the deionized water.

17. The method of claim 16, further comprising:

dispensing the additive in fewer fluid volumes than a total number of fluid volumes used for defining the density gradient.

18. The method of claim 13, further comprising dispensing a buffer solution at a constant rate across successive fluid volumes.

19. The method of claim 13, further comprising:

adjusting the dispense rate of each component of the two or more components into a mixing chamber by independently controlling two or more pumps.

* * * * *